US012656218B2

(12) United States Patent
Watanabe et al.

(10) Patent No.: US 12,656,218 B2
(45) Date of Patent: *Jun. 16, 2026

(54) DISPERSION MEASUREMENT DEVICE AND DISPERSION MEASUREMENT METHOD

(71) Applicant: HAMAMATSU PHOTONICS K.K., Hamamatsu (JP)

(72) Inventors: Koyo Watanabe, Hamamatsu (JP); Hisanari Takahashi, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 36 days.

This patent is subject to a terminal disclaimer.

(21) Appl. No.: 18/286,857

(22) PCT Filed: Mar. 14, 2022

(86) PCT No.: PCT/JP2022/011384
§ 371 (c)(1),
(2) Date: Oct. 13, 2023

(87) PCT Pub. No.: WO2022/249658
PCT Pub. Date: Dec. 1, 2022

(65) Prior Publication Data
US 2024/0210275 A1 Jun. 27, 2024

(30) Foreign Application Priority Data

May 24, 2021 (JP) ................................. 2021-087082

(51) Int. Cl.
*G01M 11/02* (2006.01)
(52) U.S. Cl.
CPC ............................... *G01M 11/0285* (2013.01)
(58) Field of Classification Search
CPC ...... G01N 21/39; G01N 21/27; G01N 21/314; G01N 2021/1789; G01N 2021/3166; G01N 2201/0697; G01N 21/636
(Continued)

(56) References Cited

U.S. PATENT DOCUMENTS

| | | | | | |
|---|---|---|---|---|---|
| 5,682,262 A | * | 10/1997 | Wefers | .................... | H01S 3/005 349/1 |
| 2005/0270616 A1 | * | 12/2005 | Weiner | ................ | G02F 1/13471 359/246 |
| 2006/0027021 A1 | * | 2/2006 | Choi | ...................... | G01N 29/11 73/579 |
| 2011/0026105 A1 | * | 2/2011 | Bayramian | ........... | H01S 3/0057 700/117 |
| 2011/0211600 A1 | * | 9/2011 | Dantus | .................. | H01S 3/0057 372/25 |

(Continued)

FOREIGN PATENT DOCUMENTS

| | | |
|---|---|---|
| JP | 2000-193558 A | 7/2000 |
| JP | 2000-321171 A | 11/2000 |

(Continued)

OTHER PUBLICATIONS

English-language translation of International Preliminary Report on Patentability (IPRP) dated Dec. 7, 2023 that issued in WO Patent Application No. PCT/JP2022/011384.

*Primary Examiner* — Isiaka O Akanbi
(74) *Attorney, Agent, or Firm* — Faegre Drinker Biddle & Reath LLP

(57) ABSTRACT

A dispersion measurement device includes a pulse forming unit, an optical detection unit, and an arithmetic operation unit. The pulse forming unit includes an SLM that presents a phase pattern giving a predetermined phase shift for each of wavelength to the first optical pulse, and forms an optical pulse train from the first optical pulse, the optical pulse train including a plurality of second optical pulses having a time difference from each other and having center wavelengths different from each other. The optical detection unit detects a temporal waveform of the optical pulse train. The arithmetic operation unit is electrically connected to the optical detection unit. An optical component is arranged on an optical path between the pulse forming unit and the optical detection unit. The arithmetic operation unit estimates a wavelength dispersion amount of the optical component based on a feature amount of the temporal waveform. The (Continued)

phase pattern of the SLM includes a pattern for giving a group delay dispersion having a sign opposite to the group delay dispersion of the optical component to the first optical pulse.

13 Claims, 39 Drawing Sheets

(58) Field of Classification Search
USPC ................................ 356/326, 303, 450, 484
See application file for complete search history.

(56) References Cited

U.S. PATENT DOCUMENTS

| | | | | | |
|---|---|---|---|---|---|
| 2014/0368809 | A1 | | 12/2014 | Chen et al. | |
| 2022/0107221 | A1 | * | 4/2022 | Watanabe | ............. G01J 3/2823 |
| 2022/0178752 | A1 | * | 6/2022 | Watanabe | ............. H01S 3/0057 |

FOREIGN PATENT DOCUMENTS

| | | | | | |
|---|---|---|---|---|---|
| JP | 2012-127898 | A | | 7/2012 | |
| JP | 2013-096765 | A | | 5/2013 | |
| JP | 2015-169847 | A | | 9/2015 | |
| JP | 2020169946 | A | * 10/2020 | ............. | G01J 11/00 |
| JP | 2022-180151 | A | | 12/2022 | |
| WO | WO-03/042652 | A1 | | 5/2003 | |

* cited by examiner (a)

(b)

(a)

(b)

(21)    $A_0(\omega)$, and $\Phi_0(\omega)$ $Target_0(t)$    $p_0(t)$

(22)    IFTA to find $\Phi_{IFTA}(\omega)$

(23)    IFTA to find $A_{IFTA}(\omega)$

(24)    $\sqrt{A_{IFTA}(\omega)}\exp\{i\,\Phi_{IFTA}(\omega)\}$

F.T.

(25)    $\sqrt{a_{IFTA}(t)}\exp\{i\,\phi_{IFTA}(t)\}$

S.G.

(26)    $SG_{IFTA}(\omega,t)$

(27)    $SG_{IFTA}(\omega,t)$ modification based on $p_0(t)$ $Target_0\,SG(\omega,t)$

1

DISPERSION MEASUREMENT DEVICE AND DISPERSION MEASUREMENT METHOD

TECHNICAL FIELD

The present disclosure relates to a dispersion measurement device and a dispersion measurement method.

BACKGROUND ART

Patent Literature 1 discloses a dispersion measurement device and a dispersion measurement method capable of measuring a wavelength dispersion amount of a pulsed laser light source. In such device and method, first, an optical pulse train including a plurality of optical pulses having a time difference and having center wavelengths different from each other is formed from an optical pulse to be measured output from the pulsed laser light source. Then, the optical pulse train enters into a correlation optical system. Then, correlated light including cross-correlation or autocorrelation of the optical pulse train is output from the correlation optical system. Finally, the temporal waveform of the correlated light is detected, and the wavelength dispersion amount of the pulsed laser light source is estimated from the feature amount of the temporal waveform of the detected correlated light. By inserting a measurement object such as an optical component into the optical system, it is also possible to measure the wavelength dispersion amount of the measurement object from the temporal waveform of the correlated light.

CITATION LIST

Patent Literature

Patent Literature 1: Japanese Unexamined Patent Publication No. 2020-169946

SUMMARY OF INVENTION

Technical Problem

When the wavelength dispersion amount of a measurement object is measured, a plurality of optical pulses having a time difference and having center wavelengths different from each other are transmitted through the measurement object. Thus, it is possible to estimate the wavelength dispersion amount of the measurement object based on the temporal waveforms (peak interval for example) of the plurality of optical pulses after being transmitted through the measurement object. However, when the optical pulse is transmitted through the measurement object, the pulse width of the optical pulse gradually increases and the peak intensities of the optical pulse gradually decrease due to the wavelength dispersion of the measurement object. As the pulse width of the optical pulse increases in the measurement object, the detection accuracy of the peak interval of the optical pulse is lowered. As the peak intensity of the optical pulse decreases in the measurement target, the detection accuracy of the temporal waveform of the optical pulse is lowered. When the peak intensity of the optical pulse falls below a detection threshold of the photodetector, it may not be possible to detect the optical pulse. Therefore, it may not be possible to accurately measure the wavelength dispersion amount of the measurement object.

An object of one aspect of the present disclosure is to provide a dispersion measurement device and a dispersion measurement method capable of accurately measuring a wavelength dispersion amount of a measurement object.

Solution to Problem

According to an aspect of the present disclosure, a dispersion measurement device is a device that measures a wavelength dispersion amount of the measurement object having positive or negative group delay dispersion. The dispersion measurement device includes a light source, a pulse forming unit, an optical detection unit, and an arithmetic operation unit. The light source outputs a first optical pulse. The pulse forming unit includes a spatial light modulator that presents a phase pattern for generating modulated light by applying a predetermined phase shift for each wavelength to the first optical pulse. The pulse forming unit forms an optical pulse train from the first optical pulse, and the optical pulse train is the modulated light including a plurality of second optical pulses having a time difference from each other and having center wavelengths different from each other. The optical detection unit detects a temporal waveform of the optical pulse train. The arithmetic operation unit is electrically connected to the optical detection unit. The measurement object is arranged on an optical path between the light source and the pulse forming unit, or an optical path between the pulse forming unit and the optical detection unit. The arithmetic operation unit estimates the wavelength dispersion amount of the measurement object based on a feature amount of the temporal waveform. The phase pattern includes a pattern for giving a group delay dispersion having a sign opposite to the group delay dispersion of the measurement object to the first optical pulse.

According to another aspect of the present disclosure, a dispersion measurement method is a method for measuring a wavelength dispersion amount of the measurement object having positive or negative group delay dispersion. The dispersion measurement method includes an output step, a pulse forming step, a detection step, and an arithmetic operation step. In the output step, a first optical pulse is output. In the pulse forming step, a spatial light modulator is used. The spatial light modulator presents a phase pattern for generating the modulated light by applying a predetermined phase shift for each wavelength to the first optical pulse. In the pulse forming step, an optical pulse train is formed from the first optical pulse by using a spatial light modulator, the optical pulse train being modulated light including a plurality of second optical pulses having a time difference from each other and having center wavelengths different from each other. In the detection step, a temporal waveform of the optical pulse train is detected. In the arithmetic operation step, the wavelength dispersion amount of the measurement object is estimated. The optical pulse train is formed from the first optical pulse transmitted through the measurement object in the pulse forming step, or the temporal waveform of the optical pulse train transmitted through the measurement object is detected in the detection step. In the arithmetic operation step, the wavelength dispersion amount of the measurement object is estimated based on a feature amount of the temporal waveform. The phase pattern includes a pattern for giving a group delay dispersion having a sign opposite to the group delay dispersion of the measurement object to the first optical pulse.

In these device and method, in the pulse forming unit (pulse forming step), the group delay dispersion having a sign opposite to that of the group delay dispersion of the measurement object is given to the first optical pulse. As a result, the peak intensities of the plurality of second optical pulses incident on the measurement object temporarily decrease, and the pulse widths of the plurality of second optical pulses incident on the measurement object temporarily increase. However, the peak intensity of each second optical pulse increases and the pulse width of each second optical pulse decreases, due to the group delay dispersion of the measurement object, during a period from when these second optical pulses incident on the measurement object to when they exit the measurement object. As described above, according to the above-described device and method, since the pulse widths of the second optical pulses emitted from the measurement object become small, it is possible to suppress a decrease in detection accuracy of the peak interval of the plurality of second optical pulses. In addition, since the peak intensities of the plurality of second optical pulses emitted from the measurement object increase, it is possible to suppress a decrease in the detection accuracy of the temporal waveform of the optical pulse train. Therefore, it is possible to accurately measure the wavelength dispersion amount of the measurement object.

In the above device, the optical detection unit may include a correlation optical system receiving the optical pulse train and outputting correlated light including cross-correlation or autocorrelation of the optical pulse train. The optical detection unit may detect a temporal waveform of the correlated light as the temporal waveform of the optical pulse train. The arithmetic operation unit may estimate the wavelength dispersion amount of the measurement object based on a feature amount of the temporal waveform of the correlated light. Similarly, in the above method, correlated light including cross-correlation or autocorrelation of the optical pulse train may be generated in the detection step, and a temporal waveform of the correlated light may be detected as the temporal waveform of the optical pulse train in the detection step. In the arithmetic operation step, the wavelength dispersion amount of the measurement object may be estimated based on a feature amount of the temporal waveform of the correlated light. According to these device and method, the temporal waveform of the optical pulse train can be measured even when the plurality of second optical pulses are ultrashort pulses on the order of femtoseconds, for example. Therefore, it is possible to more accurately measure the wavelength dispersion amount of the measurement object by using the ultrashort pulses.

In the above device and method, an absolute value of the group delay dispersion given to the first optical pulse by the phase pattern may be within a predicted range of an absolute value of the group delay dispersion of the measurement object. In this case, the absolute value of the group delay dispersion given to the first optical pulse by the phase pattern can be brought close to the absolute value of the group delay dispersion of the measurement object. Therefore, it is possible to further be small the pulse widths of the second light pulses in the measurement object, and it is possible to further suppress a decrease in the detection accuracy of the peak interval of the plurality of second light pulses. In addition, it is possible to further increase the peak intensities of the plurality of second optical pulses in the measurement object, and to further suppress a decrease in the detection accuracy of the temporal waveform of the optical pulse train.

In the above device and method, an absolute value of the group delay dispersion given to the first optical pulse by the phase pattern may be equal to an absolute value of the group delay dispersion on design of the measurement object. Also in this case, the absolute value of the group delay dispersion given to the first optical pulse by the phase pattern can be brought close to the absolute value of the group delay dispersion of the measurement object. Therefore, it is possible to further be small the pulse widths of the second light pulses in the measurement object, and it is possible to further suppress a decrease in the detection accuracy of the peak interval of the plurality of second light pulses. In addition, it is possible to further increase the peak intensities of the plurality of second optical pulses in the measurement object, and to further suppress a decrease in the detection accuracy of the temporal waveform of the optical pulse train.

In the above device, the measurement object may be arranged on the optical path between the pulse forming unit and the optical detection unit. In the detection step of the above method, the temporal waveform of the optical pulse train transmitted through the measurement object may be detected. According to the above-described device and method, it is possible to arrange the measurement object at an arbitrary position on the optical path, like this, for example. Therefore, since the degree of freedom in spatial design of the device is high, it is possible to design the device in order to reduce the size of the device and improve convenience such as ease of attaching and taking out the measurement object.

In the above device and method, a wavelength characteristic of a spectral phase given to the first optical pulse by the phase pattern may be symmetric with respect to a center wavelength of the first optical pulse, and may have a characteristic in which the spectral phase increases and then decreases with increasing distance from the center wavelength. For example, by presenting such a phase pattern to the spatial light modulator, a negative group delay dispersion can be suitably applied to the first light pulse.

In the above device and method, a wavelength characteristic of a spectral phase given to the first optical pulse by the phase pattern may be symmetric with respect to a center wavelength of the first optical pulse, and may have a characteristic in which the spectral phase decreases and then increases with increasing distance from the center wavelength. For example, by presenting such a phase pattern to the spatial light modulator, a positive group delay dispersion can be suitably applied to the first light pulse.

The above device may further comprise a control unit storing a first phase pattern that is the phase pattern for giving a positive group delay dispersion to the first optical pulse and a second phase pattern that is the phase pattern for giving a negative group delay dispersion to the first optical pulse, the control unit selectively outputting the first phase pattern and the second phase pattern to the spatial light modulator. In this case, the phase pattern can be easily switched between the case where the measurement object has a positive group delay dispersion and the case where the measurement object has a negative group delay dispersion.

Advantageous Effects of Invention

According to the dispersion measurement device and the dispersion measurement method according to the aspect of the present disclosure, it is possible to more accurately measure a wavelength dispersion amount of a measurement object.

Figure 21:
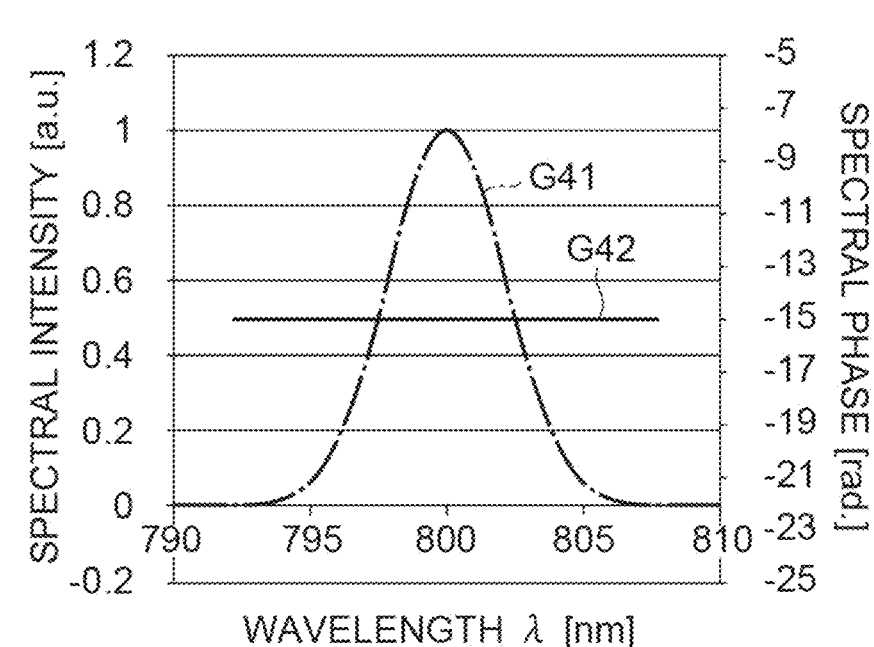
Figure 21:
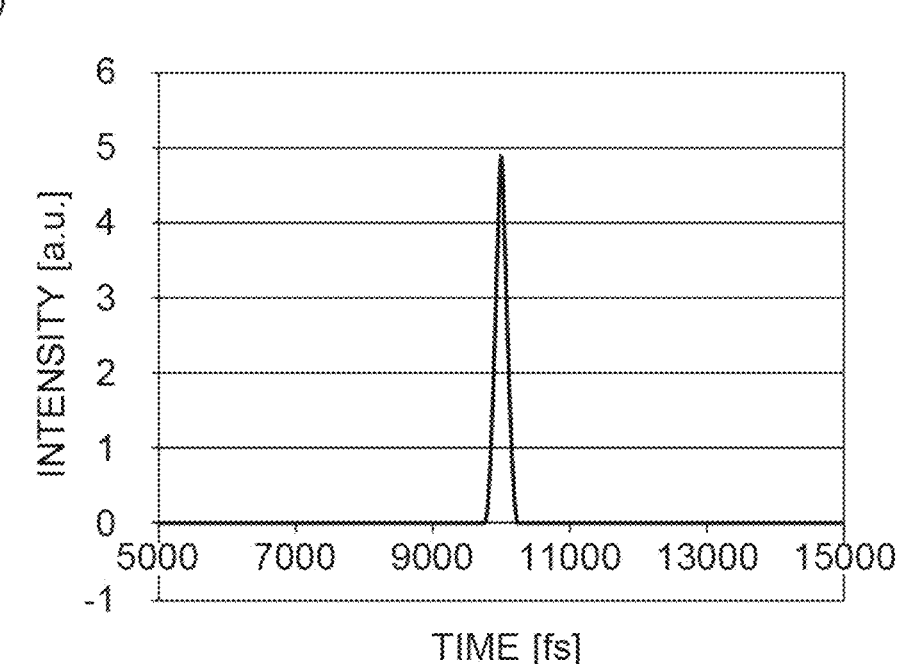

(a) of FIG. 21 is a diagram illustrating an example of a spectral waveform of an optical pulse having a single pulse shape. (b) of FIG. 21 is a diagram illustrating a temporal intensity waveform of the optical pulse.

Figure 22:
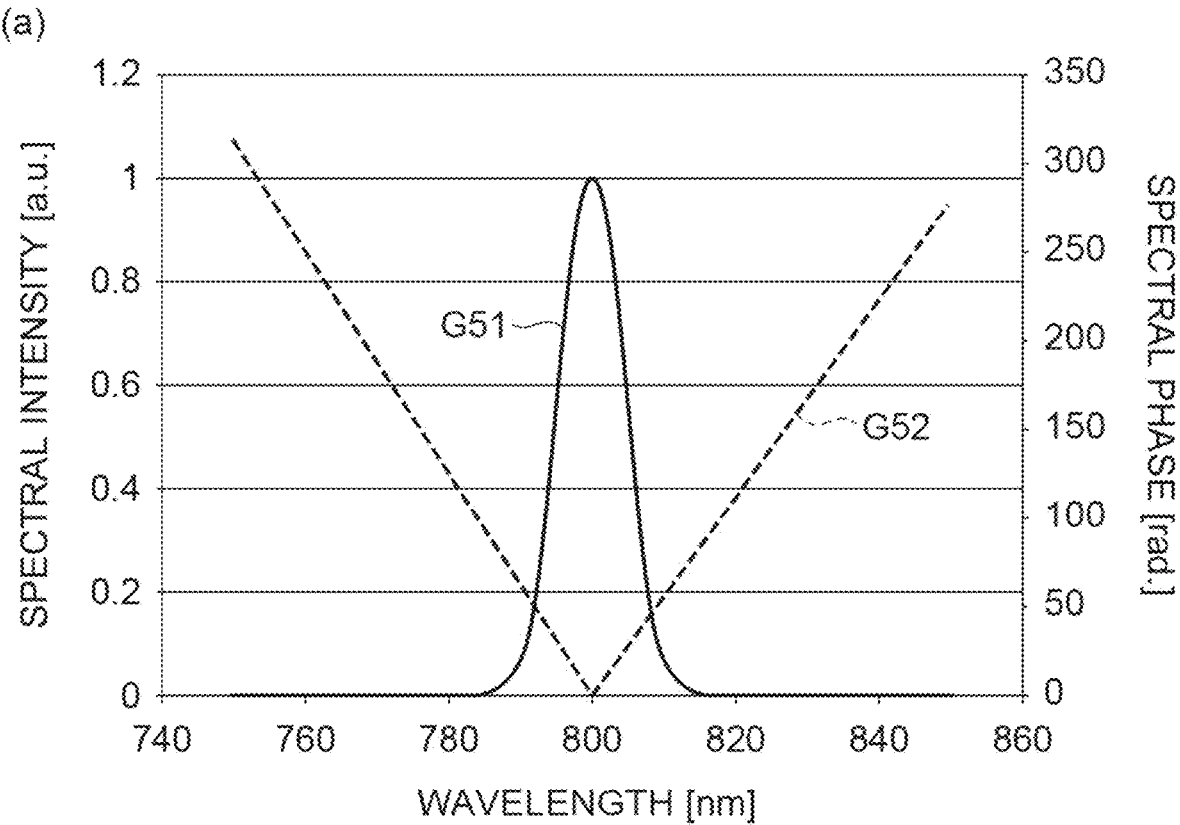
Figure 22:
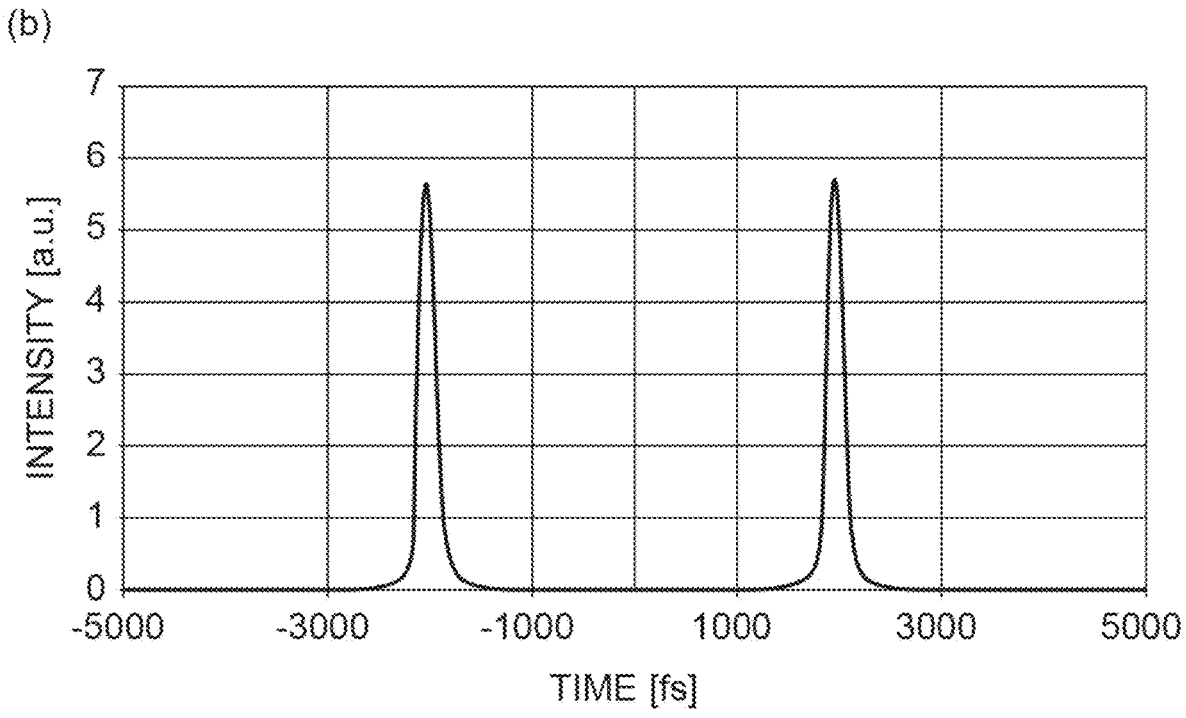

(a) of FIG. 22 is a diagram illustrating a spectral waveform of an output light from a pulse forming unit when a phase spectrum modulation of a rectangular waveform is applied by a spatial light modulator. (b) of FIG. 22 is a graph illustrating a temporal intensity waveform of the output light.

Figure 23:
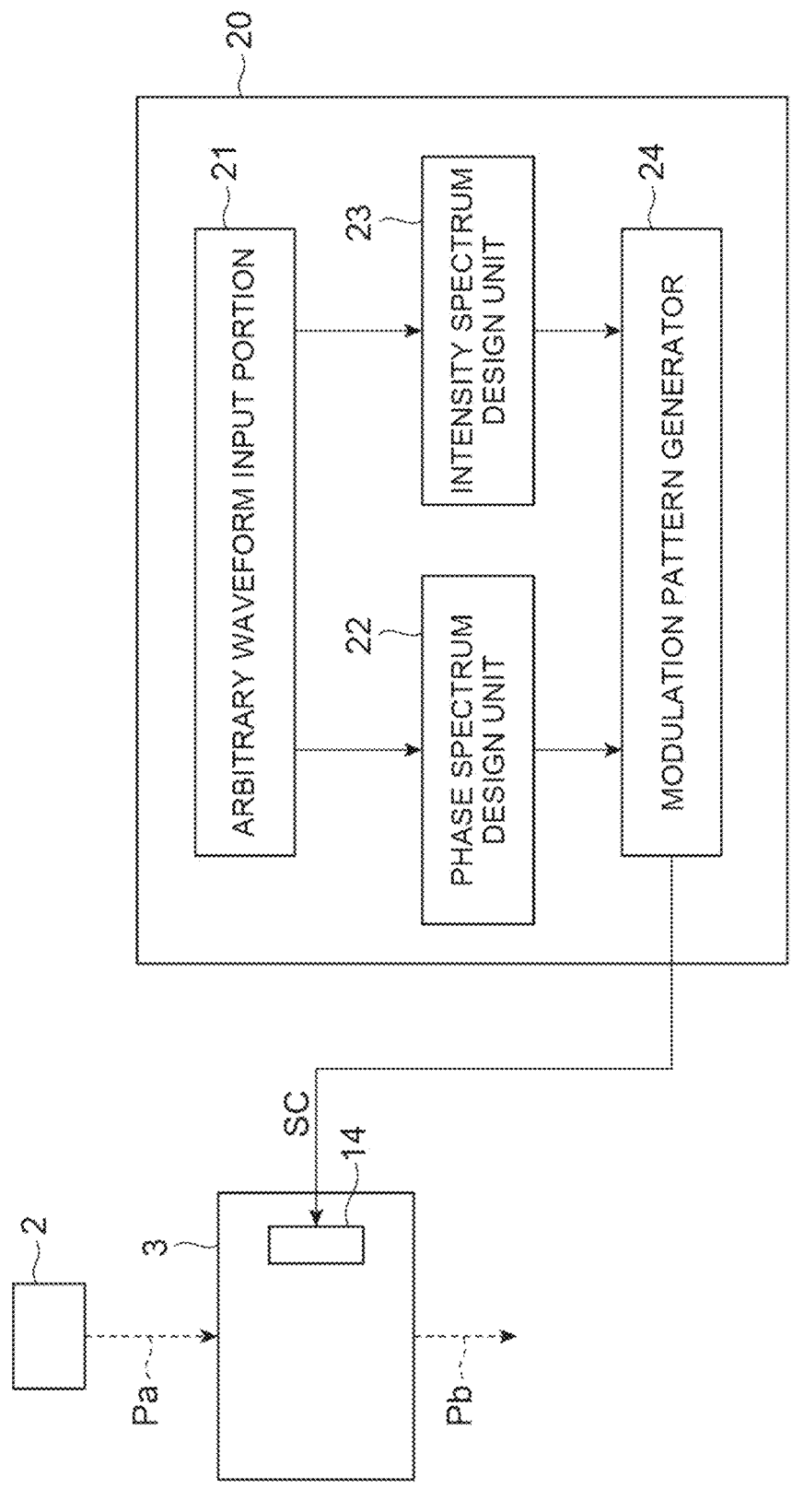

FIG. 23 is a diagram illustrating a configuration of a modulation pattern calculation apparatus for calculating the modulation pattern of the spatial light modulator.

Figure 24:
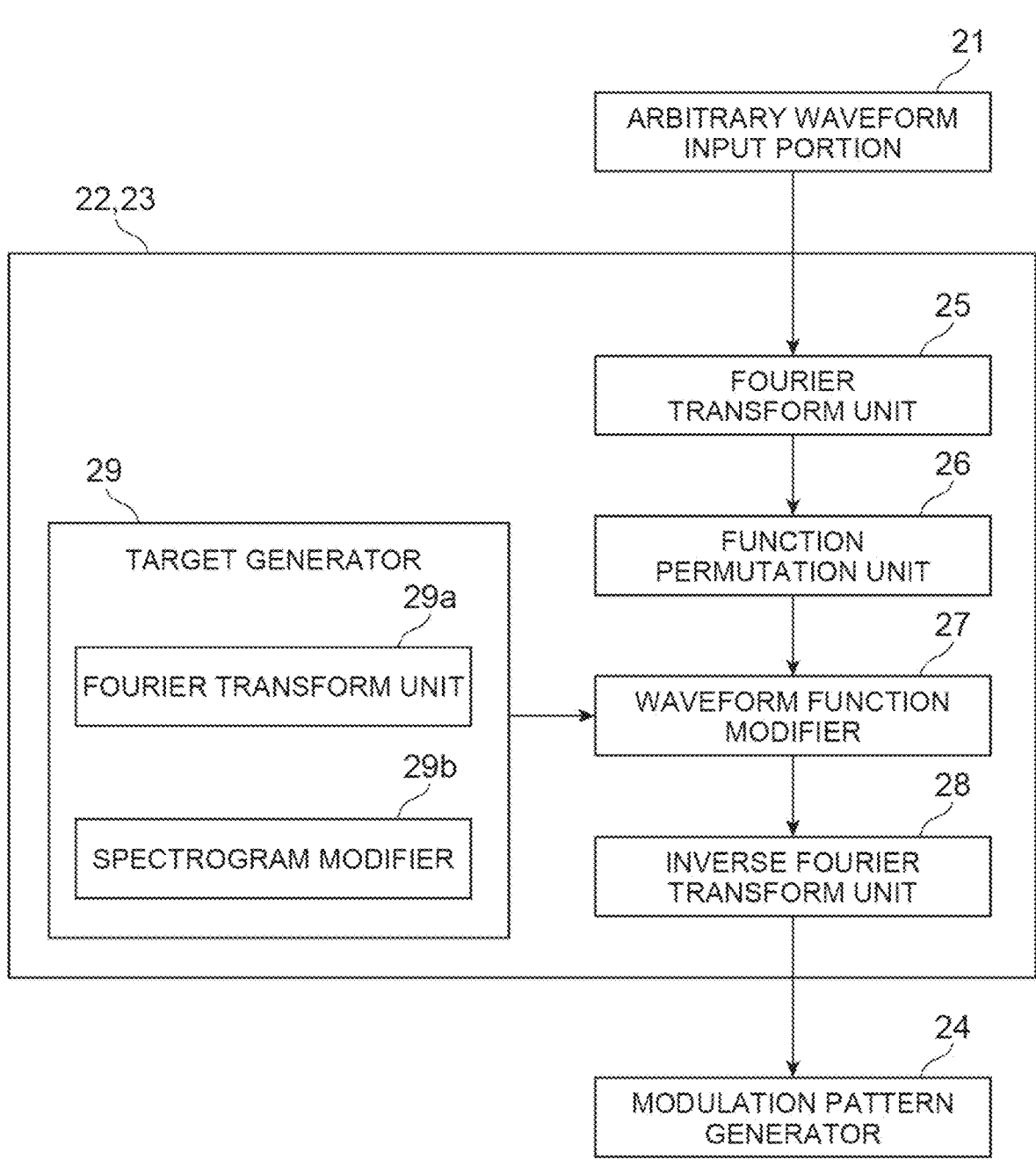

FIG. 24 is a block diagram illustrating an internal configuration of a phase spectrum design unit and an intensity spectrum design unit.

Figure 25:
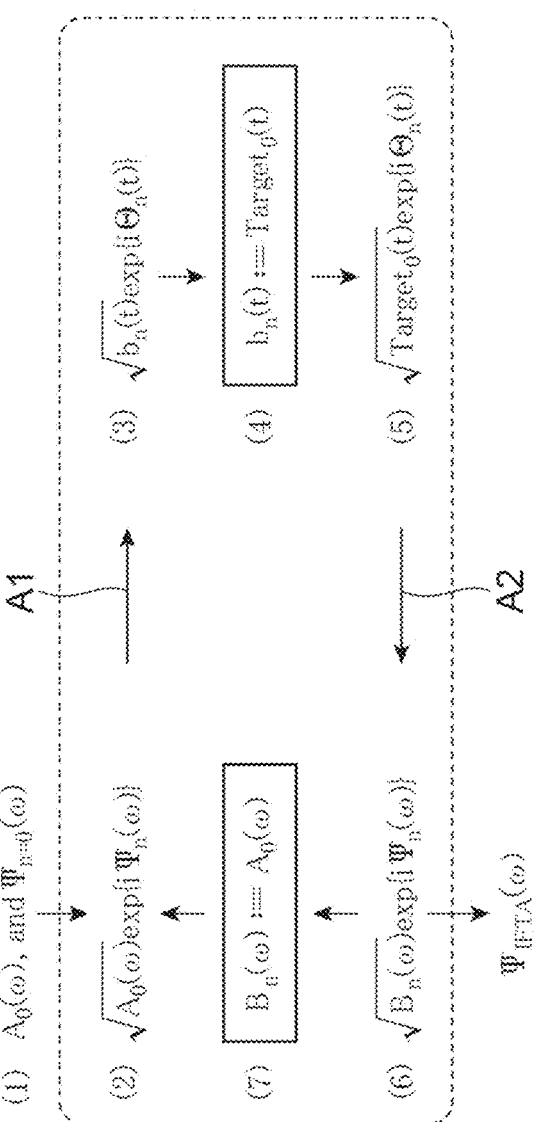

FIG. 25 is a diagram illustrating a procedure for calculating a phase spectrum by the iterative Fourier transform method.

Figure 26:
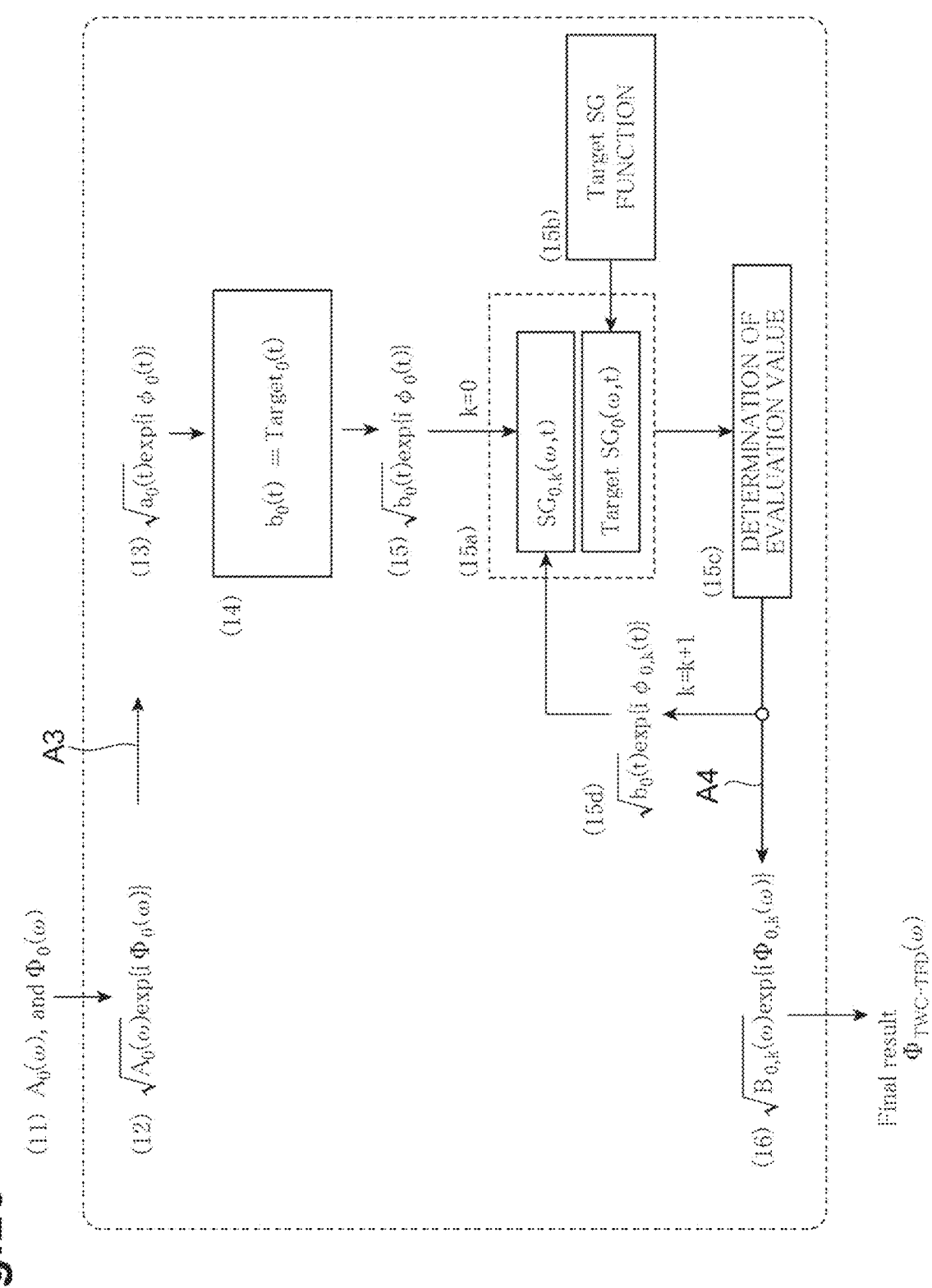

FIG. 26 is a diagram illustrating a procedure for calculating a phase spectrum function in a phase spectrum design section.

Figure 27:
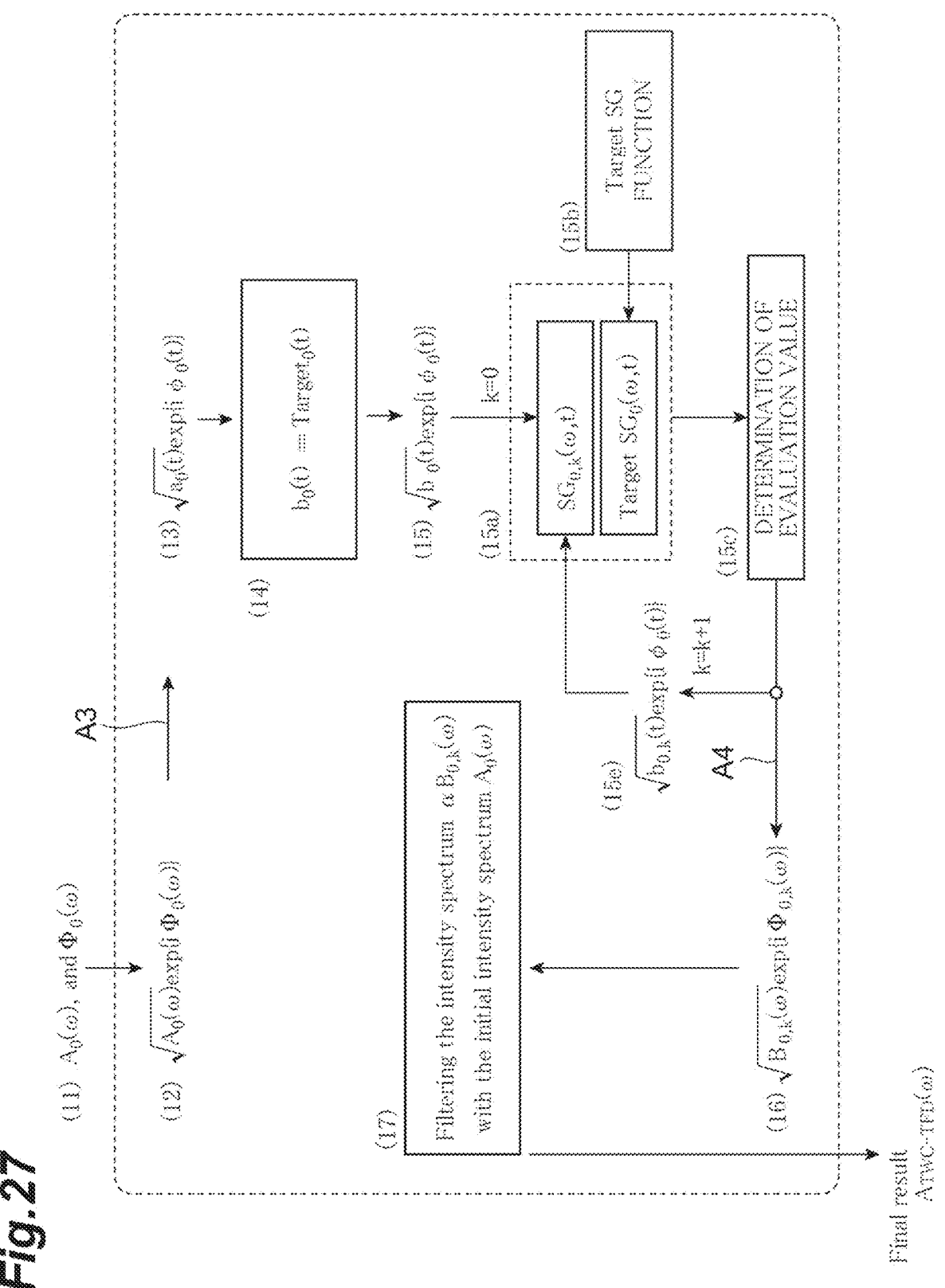

FIG. 27 is a diagram illustrating a calculation procedure of an intensity spectrum function in an intensity spectrum design section.

Figure 28:
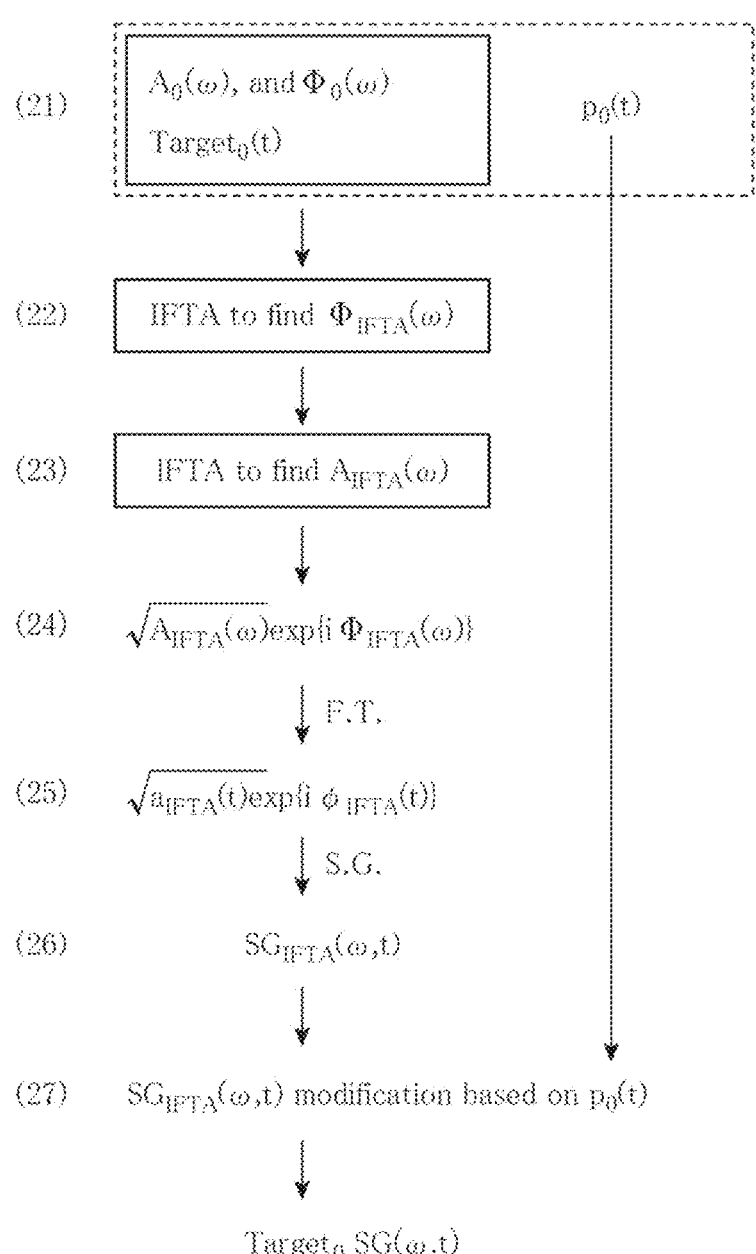

FIG. 28 is a diagram illustrating an example of a procedure for generating a target spectrogram in the target generation unit.

Figure 29:
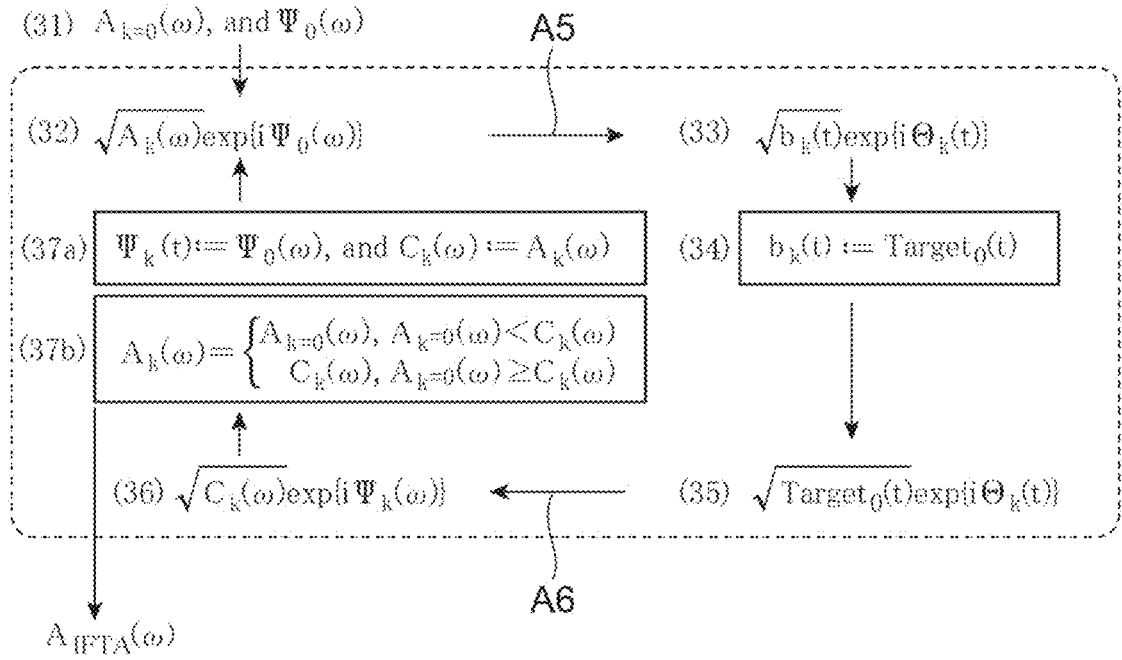

FIG. 29 is a diagram illustrating an example of a procedure for calculating an intensity spectrum function.

Figure 30:
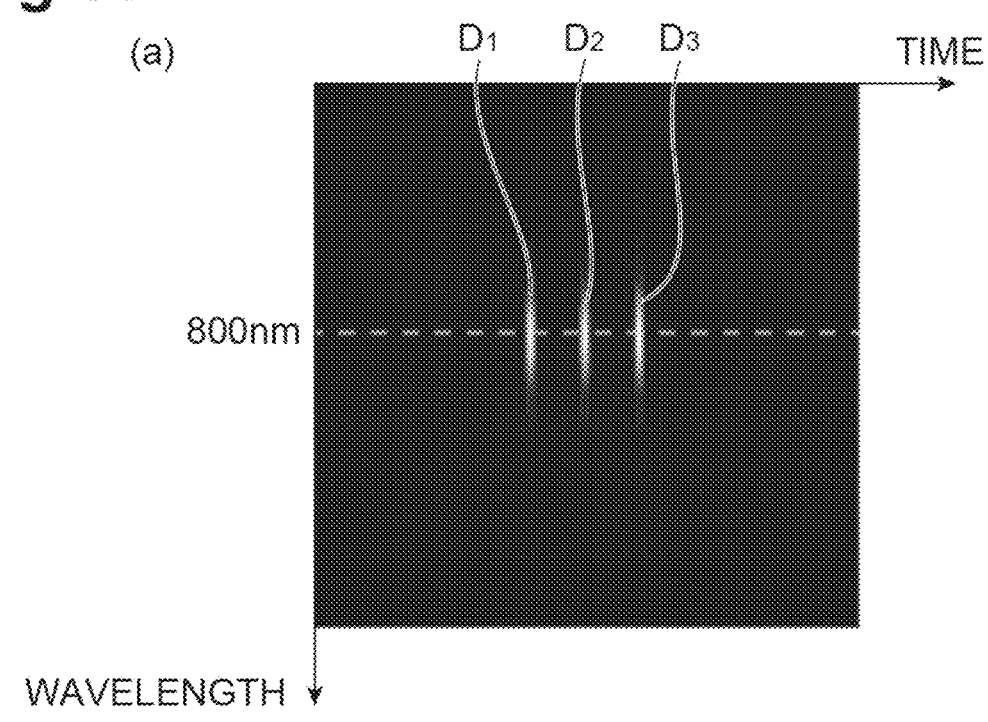
Figure 30:
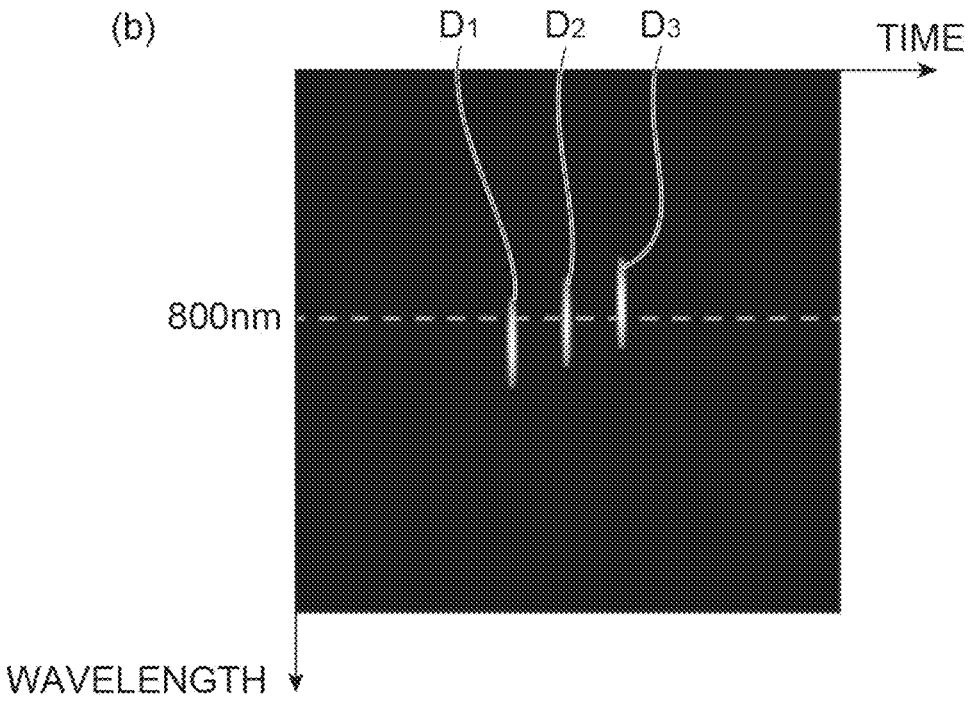

(a) of FIG. 30 is a diagram illustrating a spectrogram. (b) of FIG. 30 shows a target spectrogram in which the spectrogram has been changed.

Figure 31:
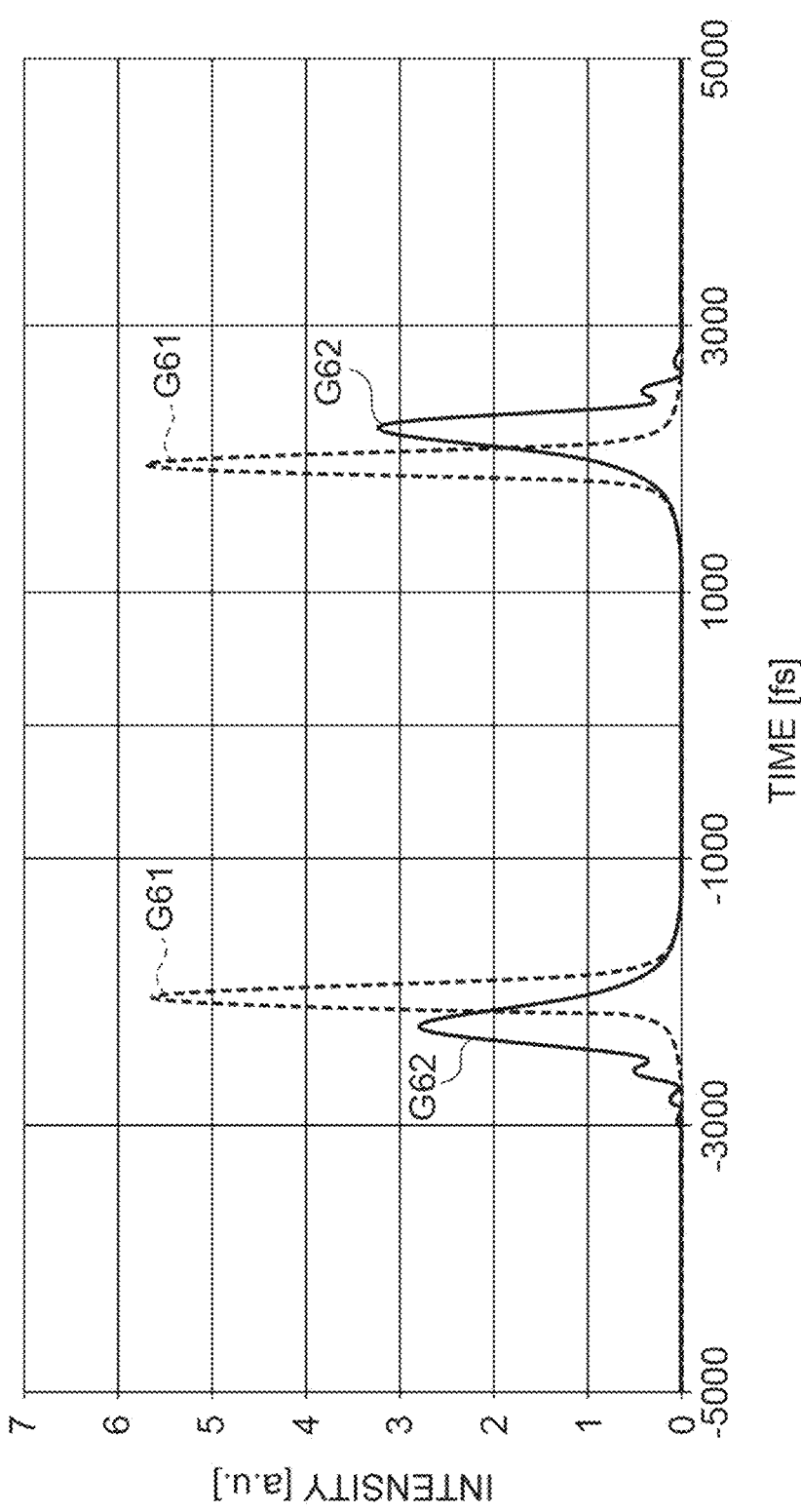

FIG. 31 shows a temporal waveform of an optical pulse before being incident on an optical component and a temporal waveform of the optical pulse transmitted through the optical component.

Figure 32:
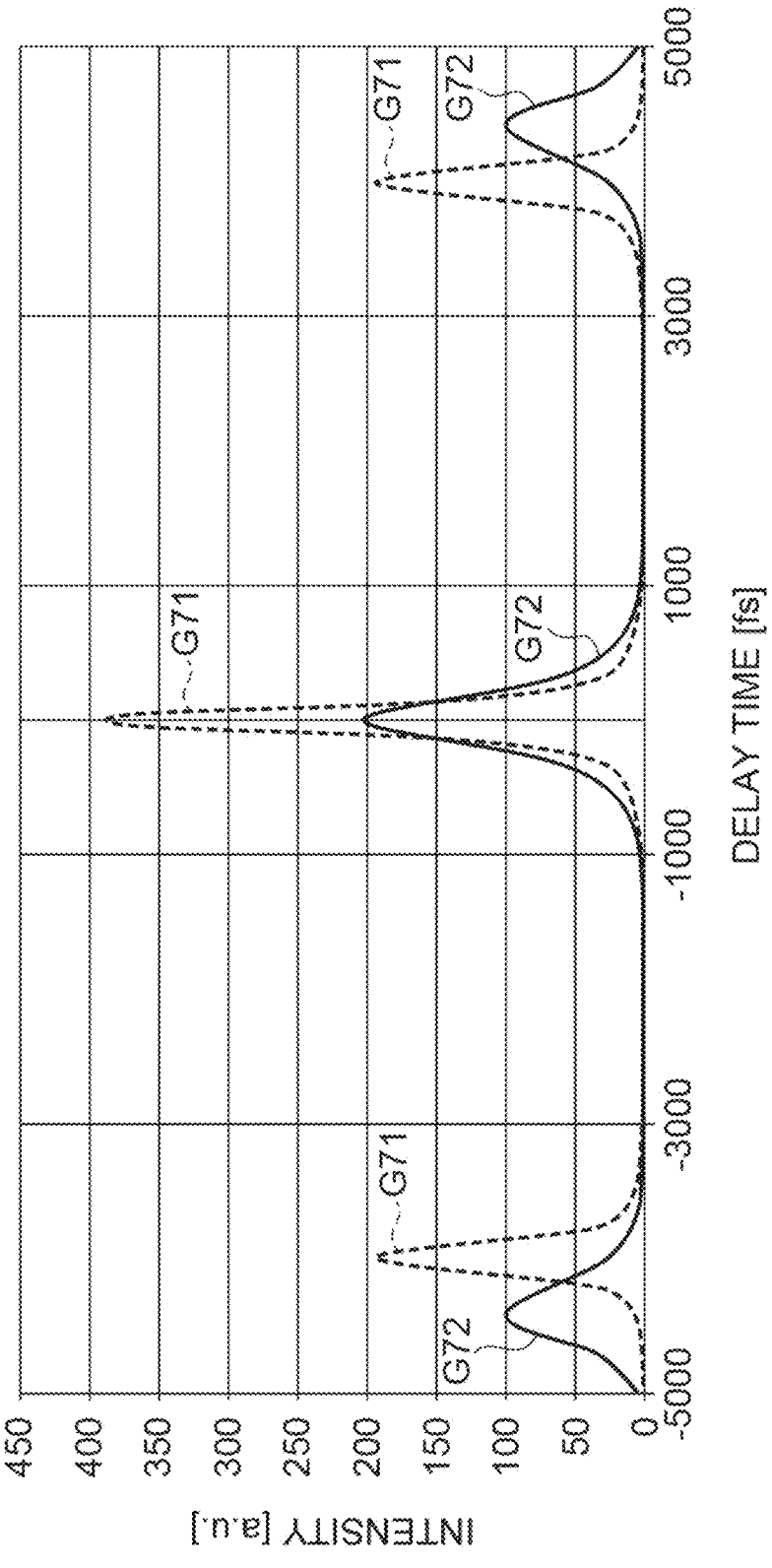

FIG. 32 is a diagram illustrating a temporal waveform of correlated light when no optical component is arranged and a temporal waveform of correlated light when the optical component is arranged.

Figure 33:
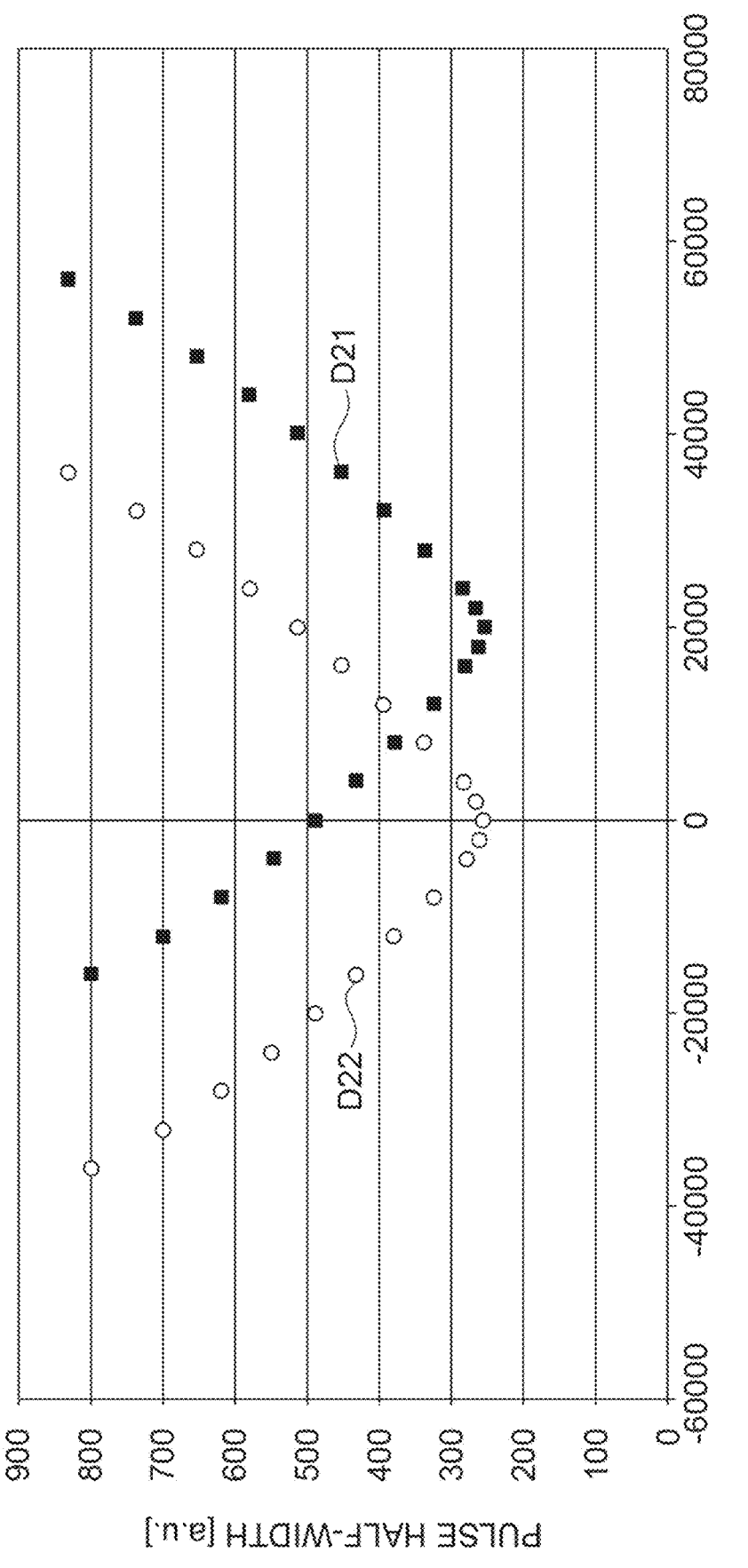

FIG. 33 is a graph illustrating an example of a relationship between the group delay dispersion of the optical component and the pulse width of the correlated light.

Figure 34:
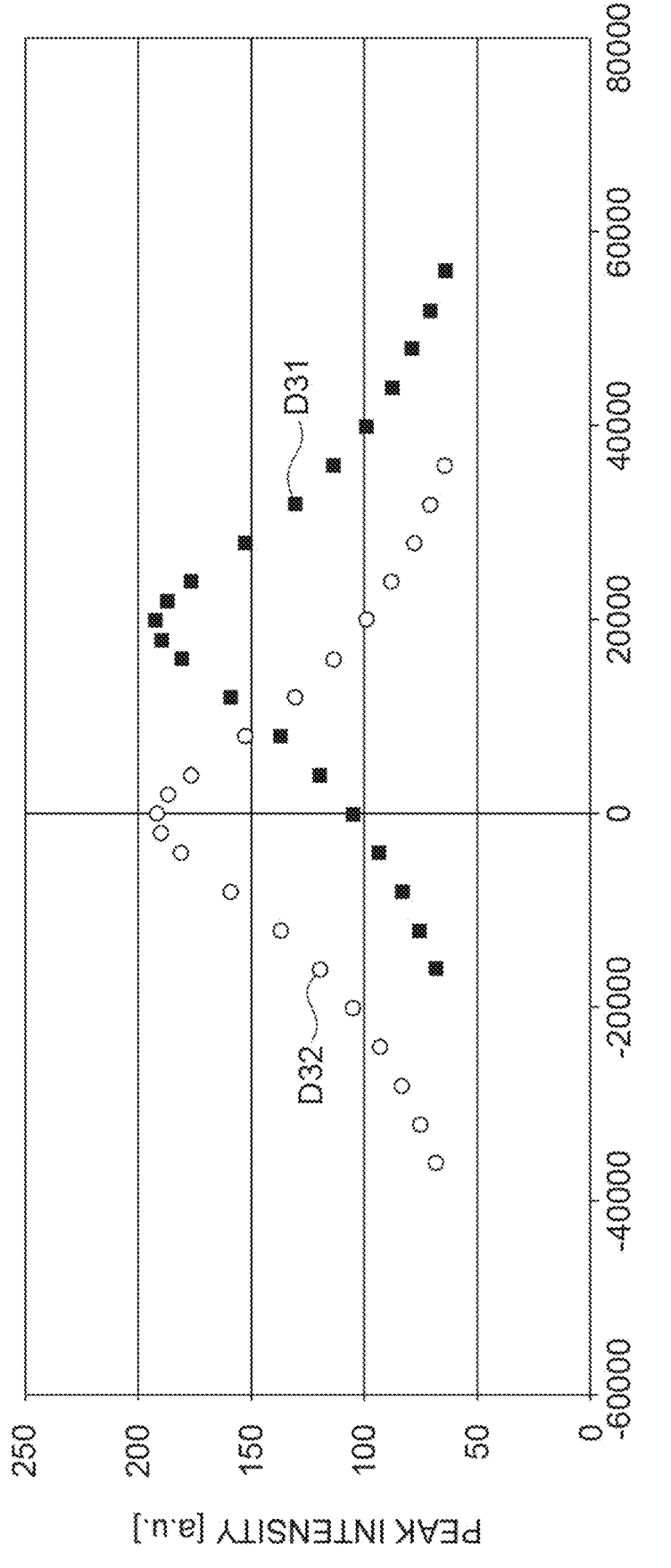

FIG. 34 is a graph illustrating an example of a relationship between the group delay dispersion of the optical component and the peak intensity of the correlated light.

Figure 35:
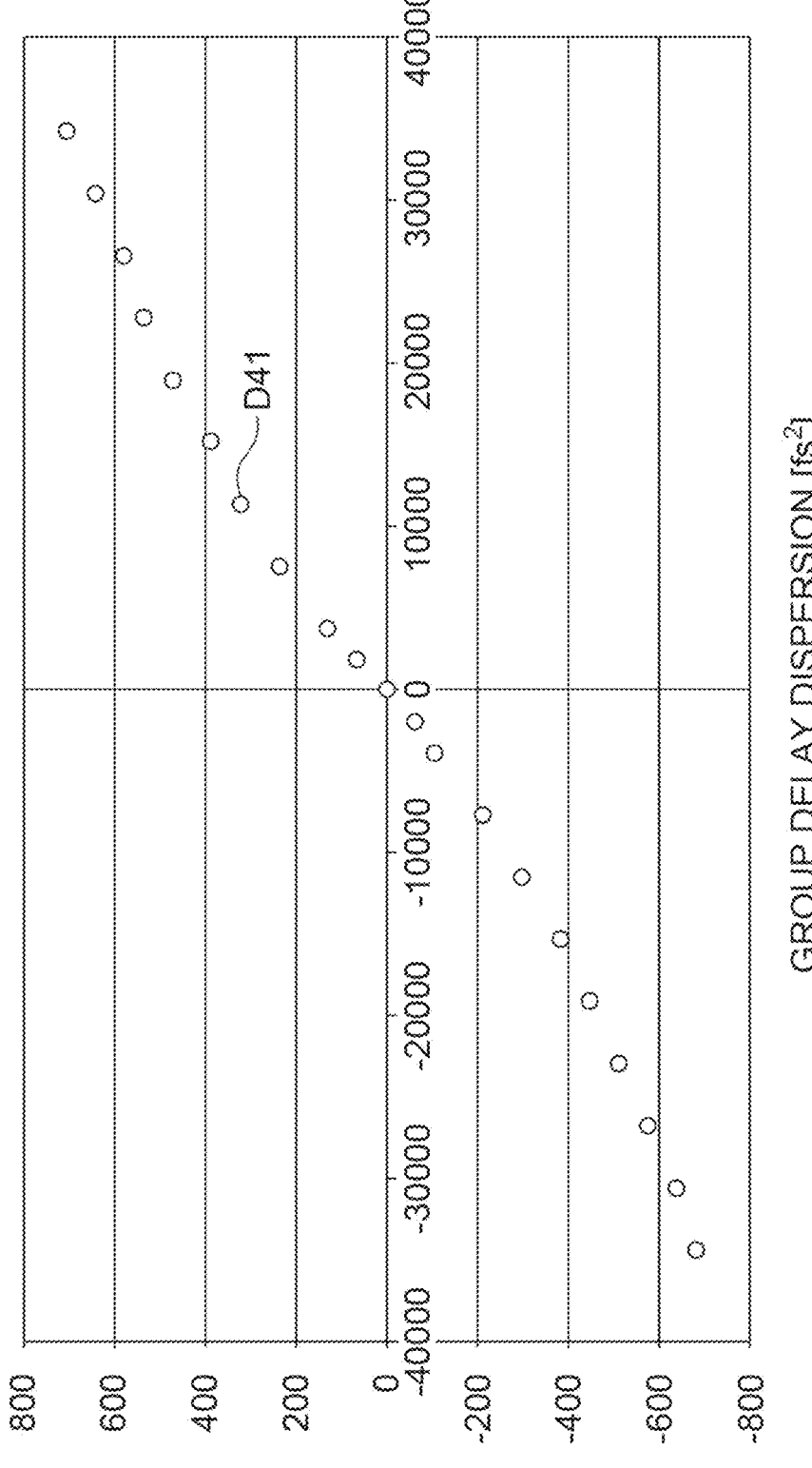

FIG. 35 is a diagram illustrating an example of a relationship between a group delay dispersion of the optical component and a change amount of a peak interval of the correlated light when an optical pulse, which does not have a group delay dispersion, incident on the optical component.

Figure 36:
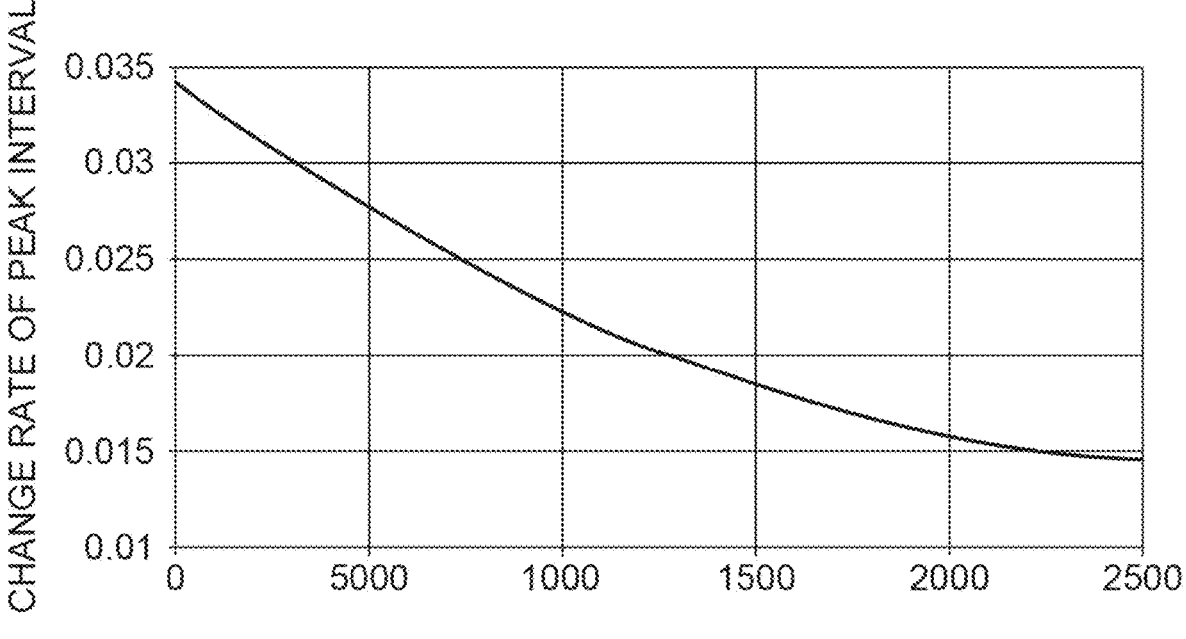

FIG. 36 is a graph illustrating a relationship between an absolute value of the group delay dispersion of the optical component and a change rate of the peak interval of the correlated light with respect to the group delay dispersion of the optical component.

Figure 37:
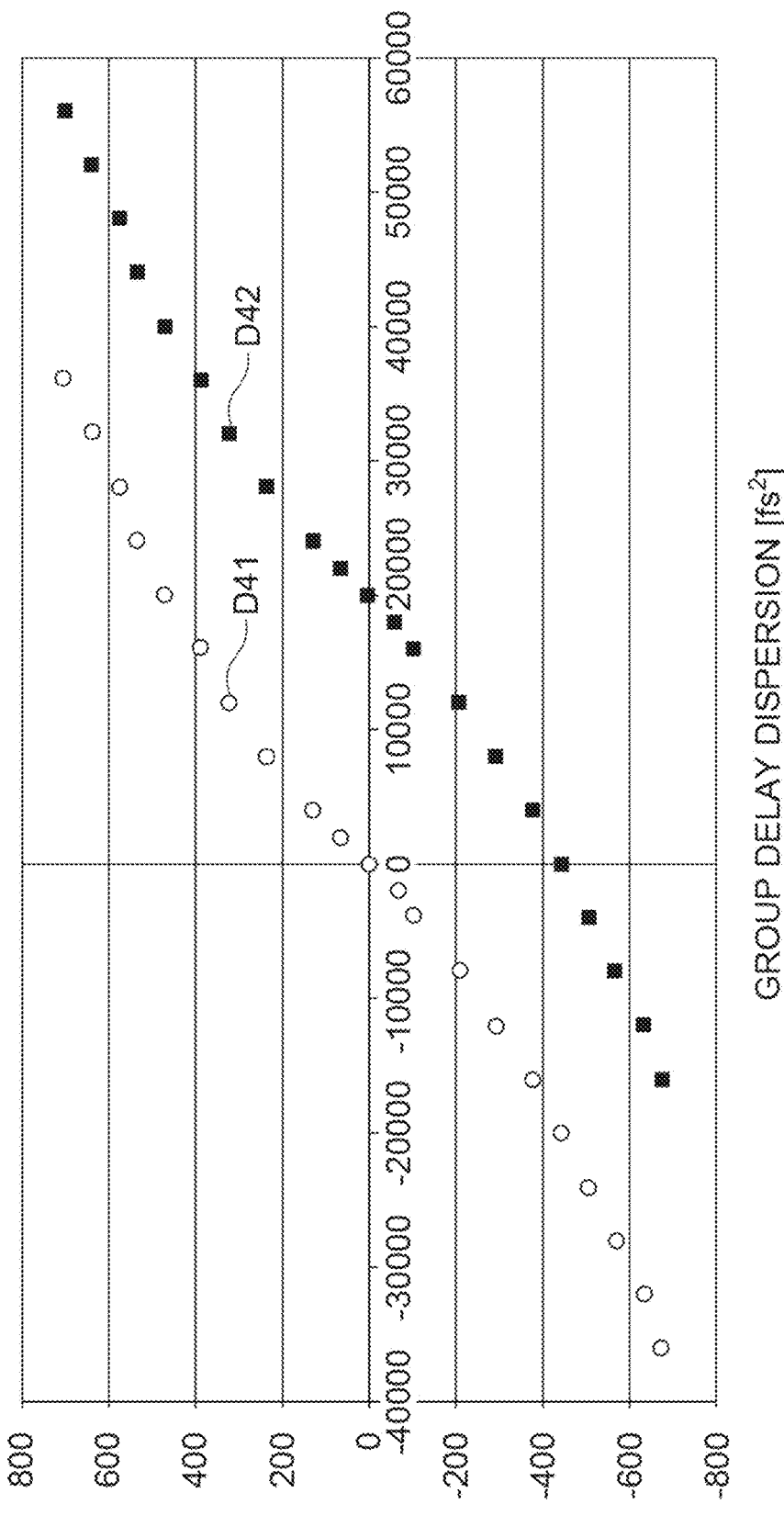

FIG. 37 is a diagram illustrating a state in which relationship between the group delay dispersion of the optical component and the change amount of the peak interval of the correlated light shifts.

Figure 38:
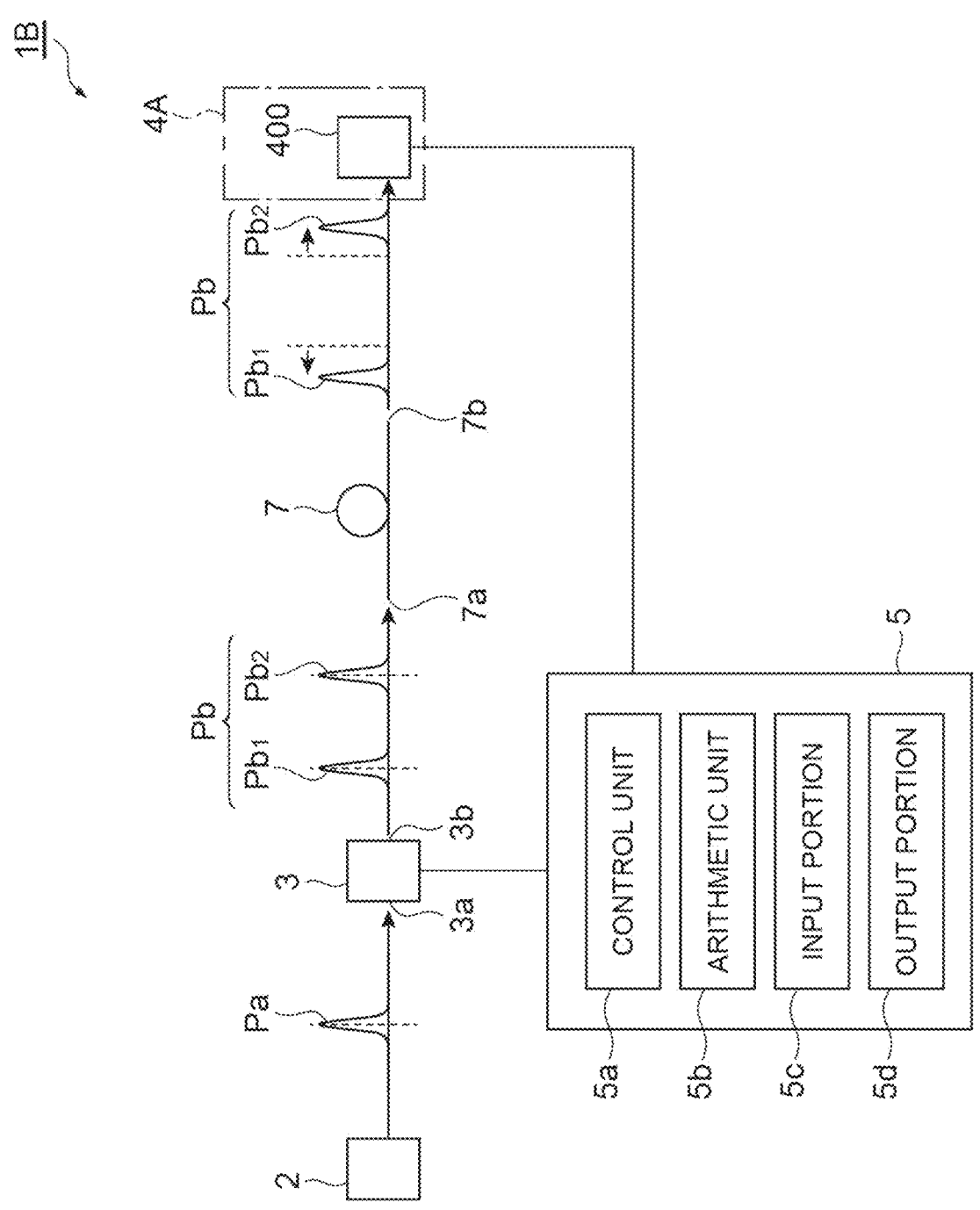

FIG. 38 is a diagram illustrating a configuration of a dispersion measurement device according to a first modified example.

Figure 39:
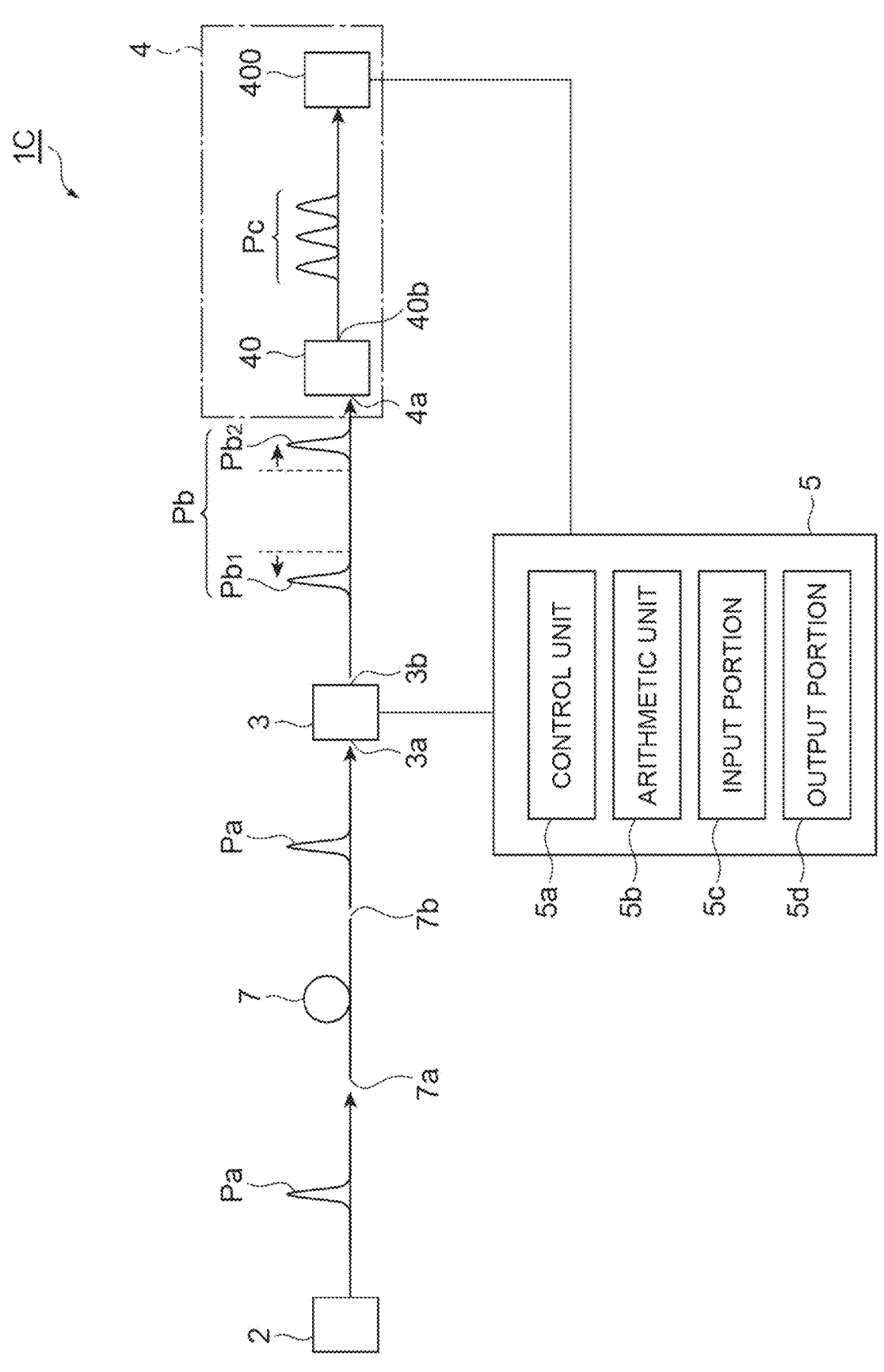

FIG. 39 is a diagram illustrating a configuration of a second modified example.

DESCRIPTION OF EMBODIMENTS

Hereinafter, embodiments of a dispersion measurement device and a dispersion measurement method according to the present disclosure will be described in detail with reference to the accompanying drawings. The same elements are denoted by the same reference signs in description of drawings, and the repetitive descriptions are omitted.

Figure 1:
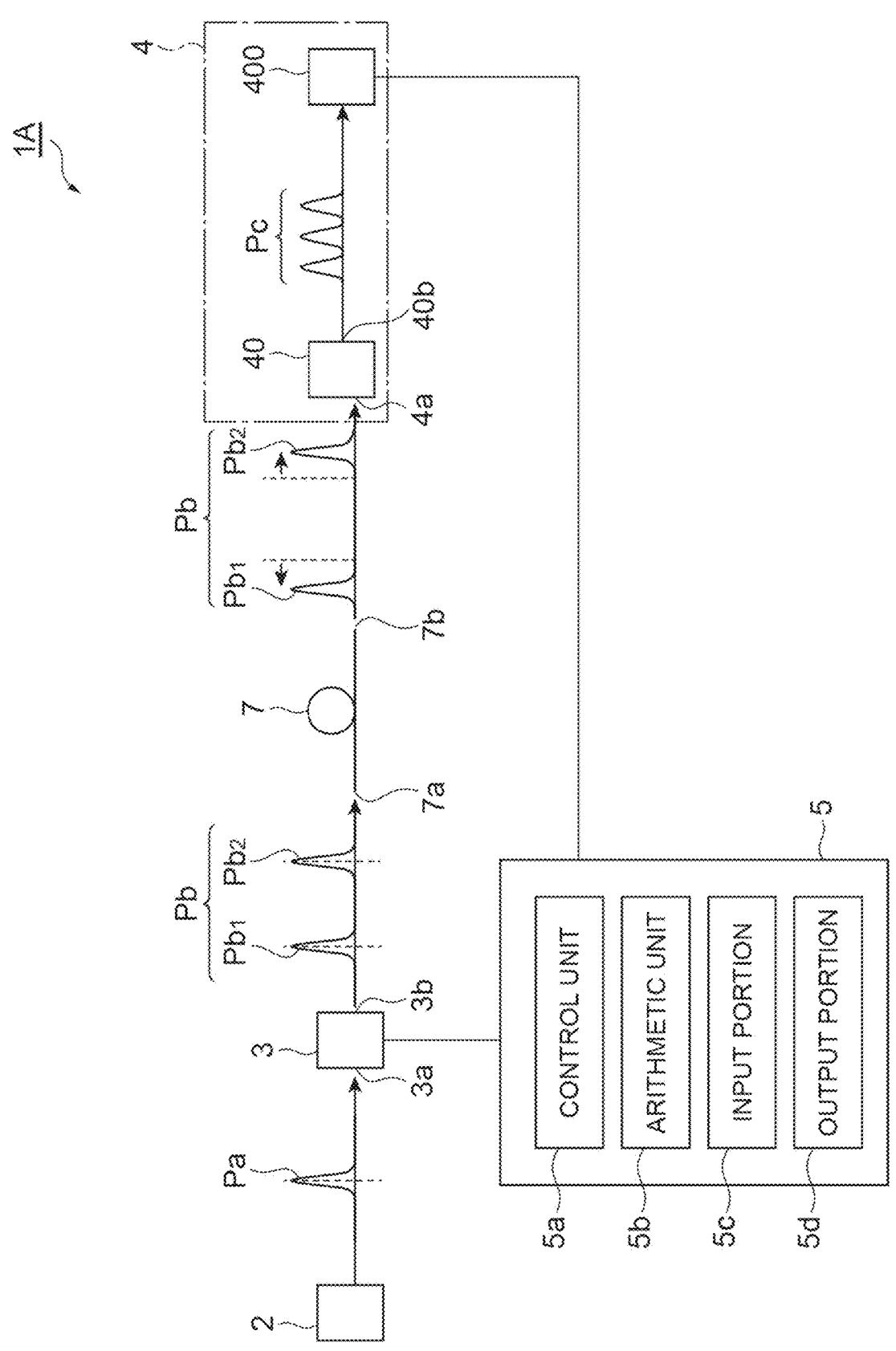
FIG. 1 is a schematic diagram illustrating a configuration of a dispersion measurement device according to an embodiment.

FIG. 1 is a schematic diagram illustrating a configuration of a dispersion measurement device 1A according to an embodiment of the present disclosure. The dispersion measurement device 1A is a device that measures a wavelength dispersion amount of an optical component 7 as a measurement object. The dispersion measurement device 1A includes a pulsed laser light source 2 (light source), a pulse forming unit 3, a light detection unit 4, and a control device 5. A light input end 3a of the pulse forming unit 3 is optically coupled to the pulsed laser light source 2 spatially or via an optical waveguide such as an optical fiber. An optical component 7 is arranged on an optical path between the pulse forming unit 3 and the light detection unit 4. A light input end 7a of the optical component 7 is optically coupled to a light output end 3b of the pulse forming unit 3 spatially or via an optical waveguide such as an optical fiber. A light input end 4a of the light detection unit 4 is optically coupled to a light output end 7b of the optical component 7 spatially or via an optical waveguide such as an optical fiber. The light detection unit 4 is a correlator and includes a correlation optical system 40 and a detector 400. The light input end of the correlation optical system 40 constitutes the light input end 4a of the light detection unit 4. A light output end 40b of the correlation optical system 40 is optically coupled to the detector 400 spatially or via an optical waveguide such as an optical fiber. The control device 5 is electrically connected to the pulse forming unit 3 and the detector 400. The control device 5 includes a control unit 5a, an arithmetic operation unit 5b, an input unit 5c, and an output unit 5d.

The pulsed laser light source 2 outputs a coherent optical pulse Pa (first optical pulse). The pulsed laser light source 2 is, for example, a femtosecond laser, and is a solid-state laser light source such as an LD direct excitation Yb:YAG pulsed laser in an example. The temporal waveform of the optical pulse Pa has, for example, a Gaussian function shape. The full width at half maximum (FWHM) of the optical pulse Pa is, for example, in the range of 10 fs to 10,000 fs, and is 100 fs in an example. The optical pulse Pa is an optical pulse having a certain bandwidth and includes a plurality of continuous wavelength components. In an example, the bandwidth of the optical pulse Pa is 10 nm and the center wavelength of the optical pulse Pa is 1030 nm.

The pulse forming unit 3 is a part that forms an optical pulse train Pb from the optical pulse Pa. The optical pulse train Pb includes a plurality of optical pulses $Pb_1$ and $Pb_2$ (plurality of second optical pulses) having a time difference from each other and having different center wavelengths from each other. The optical pulse train Pb is a single pulse group generated by dividing a spectrum constituting the optical pulse Pa into a plurality of wavelength bands and using each wavelength band. At boundaries among the plurality of wavelength bands, the plurality of wavelength bands may overlap each other. In the following description, the optical pulse train Pb may be referred to as a "band-controlled multi-pulse".

Figure 2:
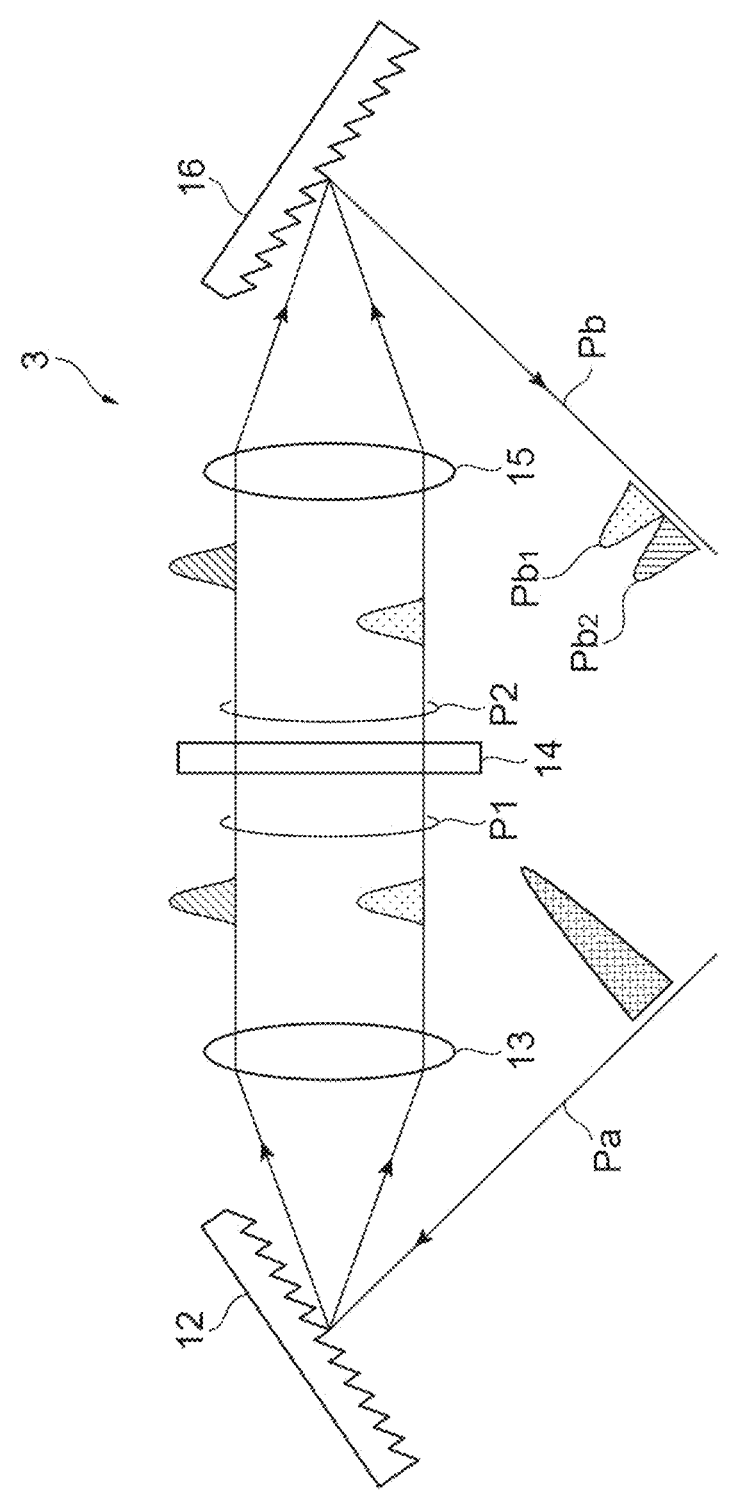
FIG. 2 is a diagram illustrating a configuration example of a pulse forming unit.

FIG. 2 is a diagram illustrating a configuration example of the pulse forming unit 3. The pulse forming unit 3 includes a diffraction grating 12, a lens 13, a spatial light modulator (SLM) 14, a lens 15, and a diffraction grating 16. The diffraction grating 12 is a spectroscopic element in the present embodiment, and is optically coupled to the pulsed laser light source 2. The SLM 14 is optically coupled to the diffraction grating 12 via the lens 13. The diffraction grating 12 spatially separates a plurality of wavelength components included in the optical pulse Pa from each other for each wavelength. As the spectroscopic element, another optical component such as a prism may be used instead of the diffraction grating 12. The optical pulse Pa obliquely enters to the diffraction grating 12 and is dispersed into a plurality of wavelength components. Light P1 including the plurality of wavelength components is focused by the lens 13 for each wavelength component, and an image is formed on the modulation surface of the SLM 14. The lens 13 may be a convex lens made of a light transmitting member or a concave mirror having a concave light reflection surface.

The SLM 14 applies a predetermined phase shift for each wavelength to the optical pulse Pa in order to convert the optical pulse Pa into the optical pulse train Pb (modulated light). Specifically, the SLM 14 receives a control signal from the control unit 5a (see FIG. 1) in order to generate the optical pulse train Pb by applying a phase shift to the optical pulse Pa. The SLM 14 presents a phase pattern by receiving the control signal output from the control unit 5a. The SLM 14 simultaneously performs phase modulation and intensity modulation of the light P1 by using the presented phase pattern. In this manner, the SLM 14 shifts the phases of the plurality of wavelength components output from the diffraction grating 12 from each other. The SLM 14 may perform only phase modulation or only intensity modulation. The SLM 14 is, for example, a phase modulation type. In an example, the SLM 14 is a liquid crystal on silicon (LCOS) type. Although the transmissive SLM 14 is illustrated in the drawings, the SLM 14 may be a reflective type.

Figure 3:
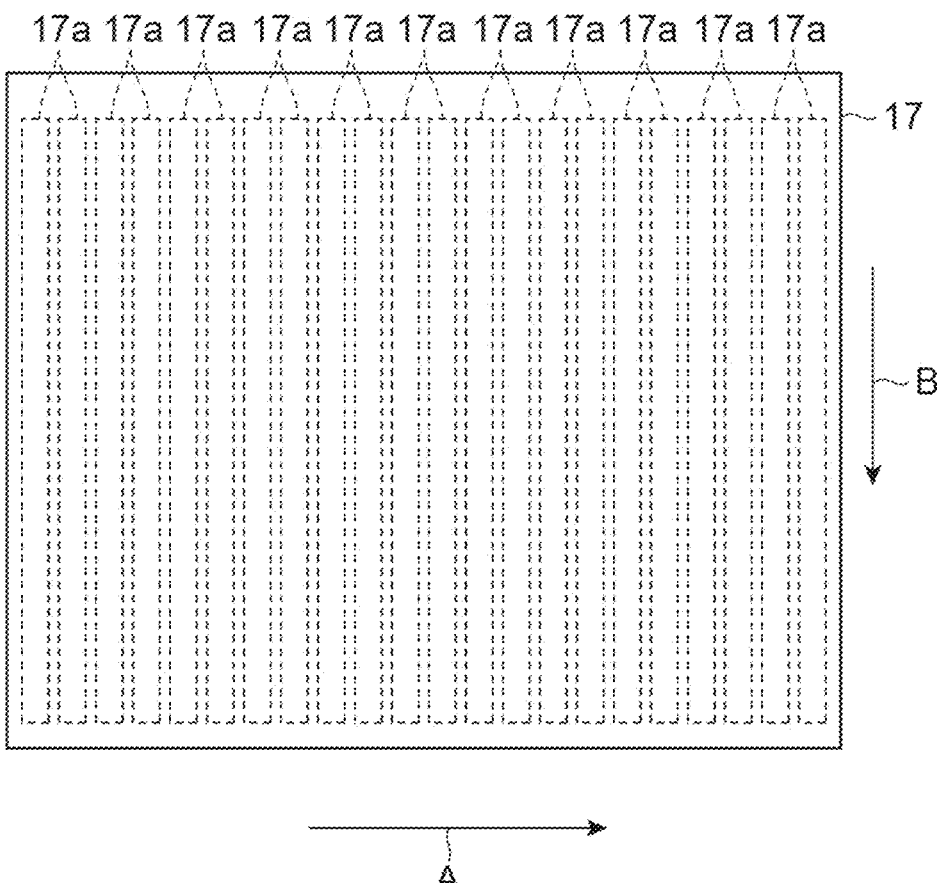
FIG. 3 is a diagram illustrating a modulation surface of a spatial light modulator.

FIG. 3 is a diagram illustrating the modulation surface 17 of the SLM 14. As illustrated in FIG. 3, on the modulation surface 17, a plurality of modulation regions 17a are arranged along a certain direction A, and each modulation region 17a extends in a direction B intersecting the direction A. The direction A is a spectral direction by the diffraction grating 12. The modulation surface 17 functions as a Fourier transform surface, and each corresponding wavelength component after being dispersed is incident on each of the plurality of modulation regions 17a. The SLM 14 modulates the phase and the intensity of each incident wavelength component independently from the other wavelength components in each modulation region 17a. Since the SLM 14 in the present embodiment is the phase modulation type, the intensity modulation is realized by the phase pattern (phase image) presented on the modulation surface 17.

Each wavelength component of the modulated light P2 modulated by the SLM 14 is focused at a point on the diffraction grating 16 by the lens 15. At this time, the lens 15 functions as a focusing optical system for focusing the modulated light P2. The lens 15 may be a convex lens made of a light transmitting member or a concave mirror having a concave light reflection surface. The diffraction grating 16 functions as a combining optical system and combines the modulated wavelength components. That is, the plurality of wavelength components of the modulated light P2 are focused and combined with each other by the lens 15 and the diffraction grating 16 to obtain a band-controlled multi-pulse (optical pulse train Pb).

Figure 4:
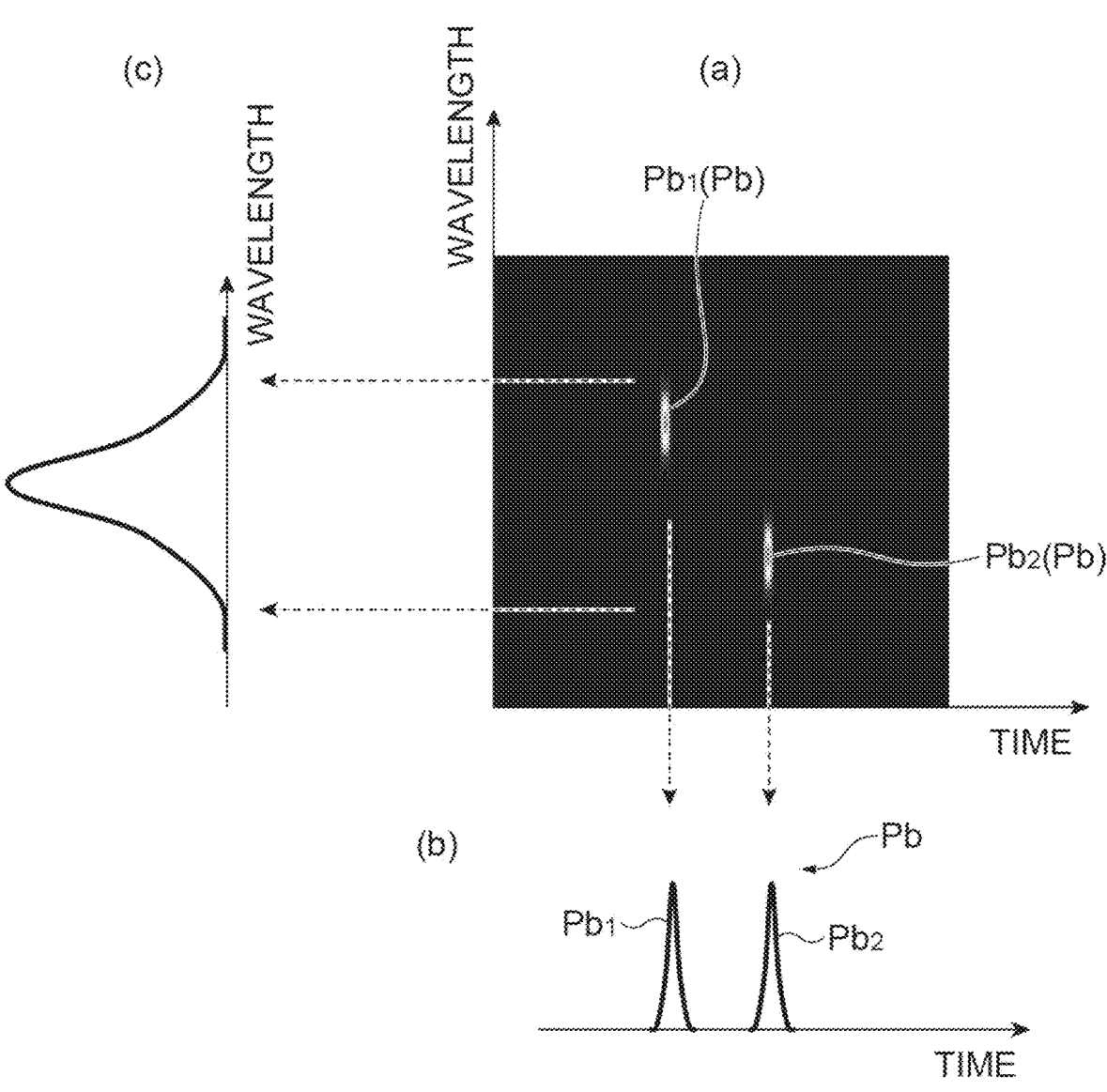
FIG. 4 is a diagram illustrating an example of a band-controlled multi-pulse. (a) of FIG. 4 is a spectrogram. (b) of FIG. 4 shows a temporal waveform of an optical pulse train. (c) of FIG. 4 shows a spectrum obtained by combining two optical pulses.

FIG. 4 is a diagram illustrating an example of a band-controlled multi-pulse. In this example, the optical pulse train Pb including the optical pulses $Pb_1$ and $Pb_2$ is illustrated. FIG. 4(*a*) is a spectrogram, in which the horizontal axis indicates the time and the vertical axis indicates the wavelength, and light intensity is represented by color gradation. FIG. 4(*b*) illustrates the temporal waveform of the optical pulse train Pb. The temporal waveform of each of the optical pulses $Pb_1$ and $Pb_2$ has, for example, a Gaussian function shape. As illustrated in FIGS. 4(*a*) and 4(*b*), peaks of the optical pulses $Pb_1$ and $Pb_2$ are temporally separated from each other, and propagation timings of the optical pulses $Pb_1$ and $Pb_2$ are shifted from each other. In other words, with respect to one optical pulse $Pb_2$, another optical pulse $Pb_1$ has a time delay, and the optical pulses $Pb_1$ and $Pb_2$ have a time difference from each other. The center wavelengths of the optical pulses $Pb_1$ and $Pb_2$ are different from each other. The center wavelength of the optical pulse $Pb_1$ is, for example, 1560 nm. The center wavelength of the optical pulse $Pb_2$ is, for example, 1540 nm. The time interval (peak interval) between the optical pulses $Pb_1$ and $Pb_2$ is, for example, in a range of 10 fs to 10,000 fs, and is 2000 fs in an example. The FWHM of the optical pulses $Pb_1$ and $Pb_2$ is, for example, in a range of 10 fs to 5000 fs, and is 300 fs in an example.

FIG. 4(*c*) illustrates a spectrum obtained by combining two optical pulses $Pb_1$ and $Pb_2$. As illustrated in FIG. 4(*c*), the spectrum obtained by combining the two optical pulses $Pb_1$ and $Pb_2$ has a single peak. However, referring to FIG. 4(*a*), the center wavelengths of the two optical pulses $Pb_1$ and $Pb_2$ are shifted from each other. The single peak illustrated in FIG. 4(*c*) substantially corresponds to the spectrum of the optical pulse Pa. The peak wavelength interval between the adjacent optical pulses $Pb_1$ and $Pb_2$ is determined by the spectral bandwidth of the optical pulse Pa and is approximately in a range of twice the full width at half maximum. In an example, in a case where the full width at half maximum (FWHM), which is the spectral bandwidth of the optical pulse Pa, is 10 nm, the peak wavelength interval is 10 nm. As a specific example, in a case where the center wavelength of the optical pulse Pa is 800 nm, the peak wavelengths of the optical pulses $Pb_1$ and $Pb_2$ can be 805 nm and 795 nm, respectively.

Figure 5:
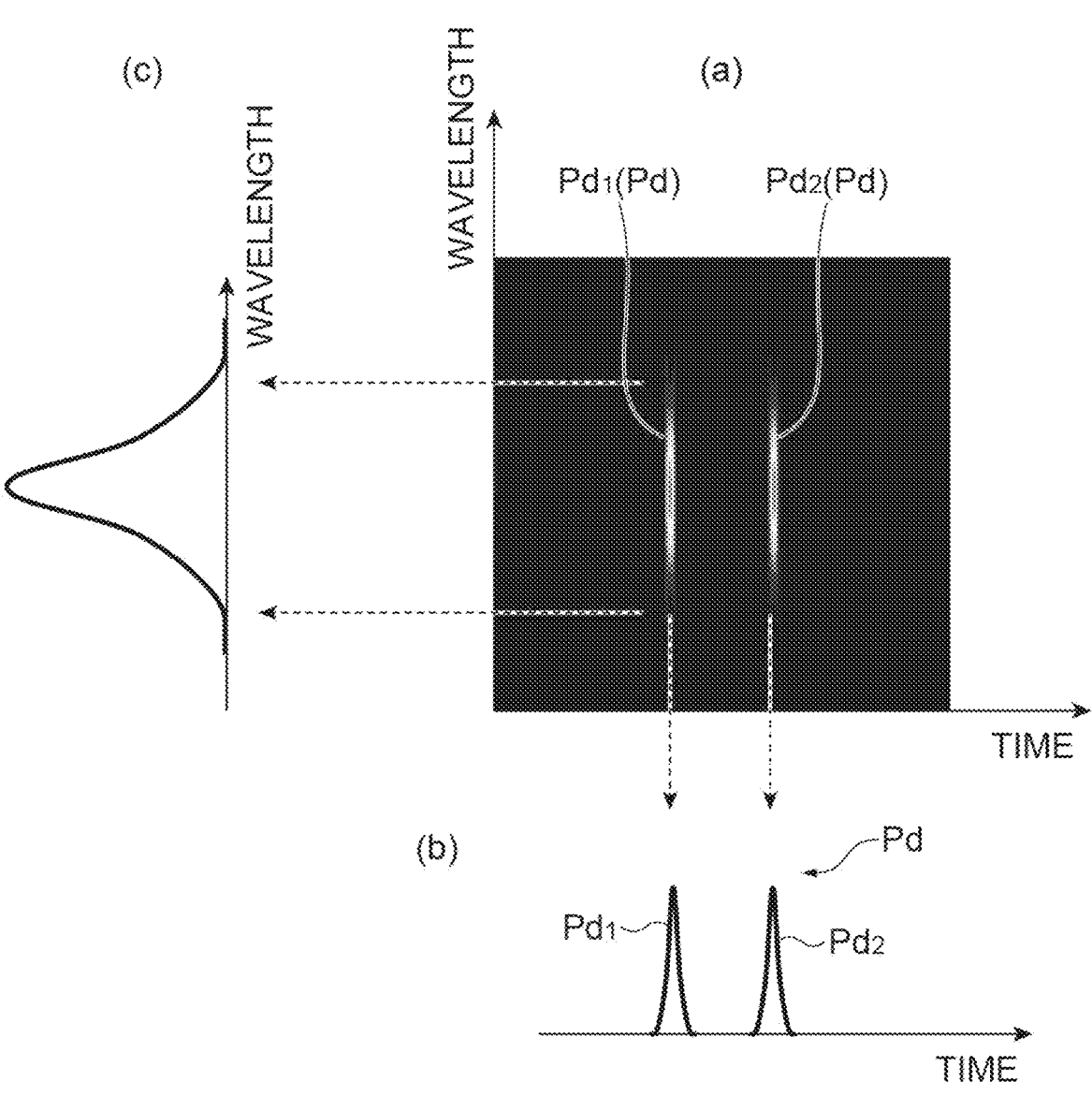
FIG. 5 is a diagram illustrating an example of a multi-pulse of which a band is not controlled, as a comparative example. (a) of FIG. 5 is a spectrogram. (b) of FIG. 5 shows a temporal waveform of an optical pulse train. (c) of FIG. 5 shows a spectrum obtained by combining two optical pulses.

FIG. 5 is a diagram illustrating an example of a multi-pulse of which a band is not controlled, as a comparative example. In this example, an optical pulse train Pd including two optical pulses $Pd_1$ and $Pd_2$ is illustrated. Similarly to FIG. 4(*a*), FIG. 5(*a*) is a spectrogram, in which the horizontal axis indicates the time and the vertical axis indicates the wavelength, and the light intensity is represented by color gradation. FIG. 5(*b*) illustrates the temporal waveform of the optical pulse train Pd. FIG. 5(*c*) illustrates a spectrum obtained by combining the two optical pulses $Pd_1$ and $Pd_2$. As illustrated in FIGS. 5(*a*) to 5(*c*), the peaks of the two optical pulses $Pd_1$ and $Pd_2$ are temporally separated from each other, but the center wavelengths of the two optical pulses $Pd_1$ and $Pd_2$ coincide with each other. The pulse forming unit 3 in the present embodiment does not generate such an optical pulse train Pd, but generates an optical pulse train Pb having different center wavelengths as illustrated in FIG. 4.

Reference is again made to FIG. 1. The optical component 7 receives the optical pulse train Pb output from the pulse forming unit 3. The optical component 7 has a positive (normal) or negative (anomalous) group delay dispersion (GDD). In the present embodiment, it is assumed that the magnitude of the group delay dispersion of the optical component 7 to be measured is unknown before the measurement, but a sign of the group delay dispersion of the optical component 7 is apparent before the measurement. The sign of the group delay dispersion is the same as the sign of group velocity dispersion, which is the group delay dispersion per unit length. The light pulse train Pb transmitted through the optical component 7 is output from the light output end 7*b*.

The optical component 7 is, for example, a light guide member such as an optical fiber or an optical waveguide. Examples of the optical fiber include a single mode fiber, a multi-mode fiber, a rare-earth-doped fiber, a photonic crystal fiber, a dispersion shifted fiber, and a double clad fiber. Examples of the optical waveguide include semiconductor micro-waveguides of SiN, InP, and the like. The optical component 7 may be, for example, a semiconductor or a dielectric optical crystal. In this case, the optical component 7 may be diamond, $SiO_2$, $LiNbO_3$, $LiTaO_3$, PLZT, Si, Ge, fullerene, graphite, graphene, carbon nanotube, GaN, GaAs, a magnetic body, an organic material, a polymer material, or the like.

The phase pattern presented on the modulation surface 17 of the SLM 14 is obtained by superimposing another phase pattern on the phase pattern for generating the optical pulse train Pb. The another phase pattern is a phase pattern for giving the optical pulse Pa a group delay dispersion having a sign opposite to that of the group delay dispersion of the optical component 7. That is, the another phase pattern is a phase pattern for making the optical pulse train Pb have a group delay dispersion having a sign opposite to that of the group delay dispersion of the optical component 7. Specifically, when the optical component 7 has a positive group delay dispersion, the another phase pattern provides a negative group delay dispersion to the optical pulse Pa. If the optical component 7 has a negative group delay dispersion, the another phase pattern provides a positive group delay dispersion to the light pulse Pa.

Figure 6:
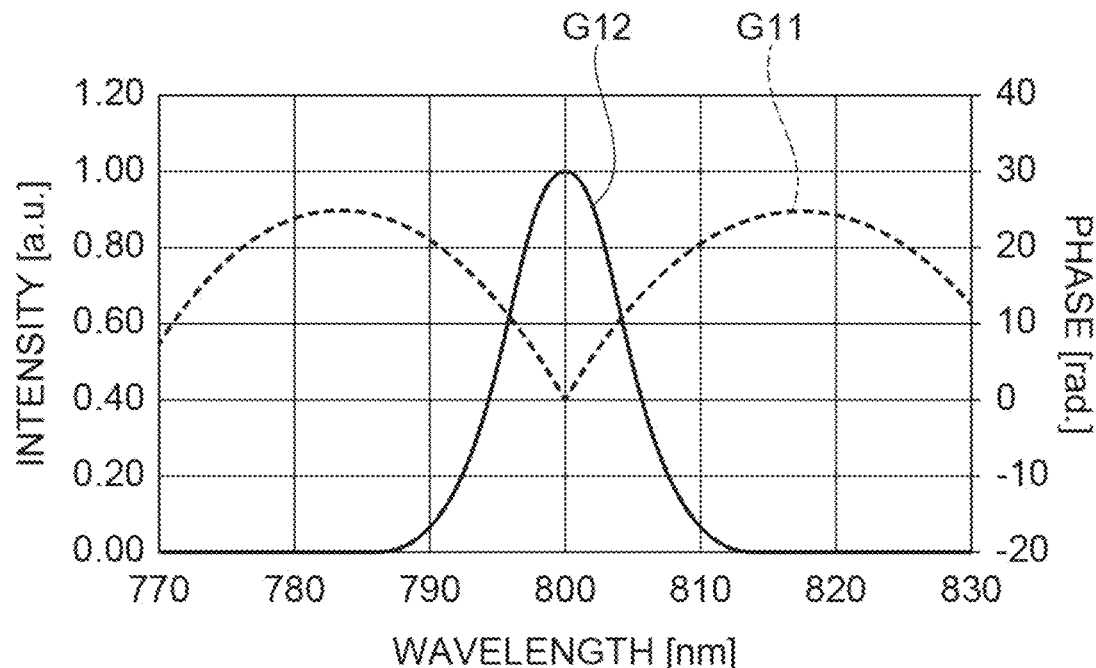
FIG. 6 is a diagram illustrating a spectral waveform given to an optical pulse by a phase pattern in a case where negative group delay dispersion is given to the optical pulse.
Figure 7:
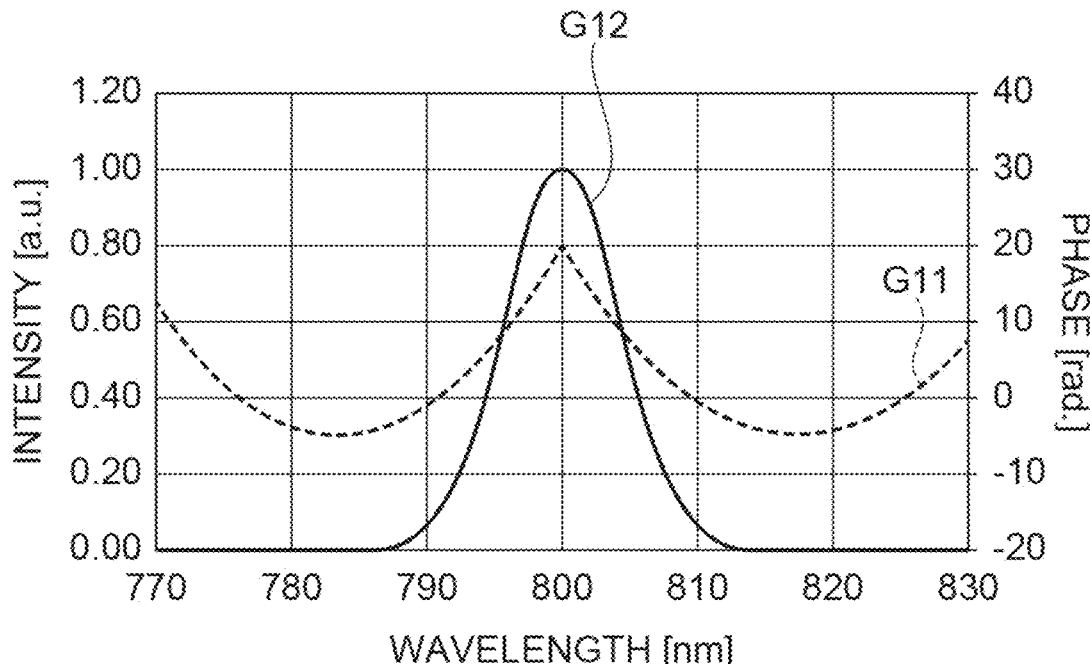
FIG. 7 is a diagram illustrating a spectral waveform given to an optical pulse by a phase pattern in a case where positive group delay dispersion is applied to the optical pulse.

FIGS. 6 and 7 show examples of spectral waveforms (spectral phase G11 and spectral intensity G12) given to the optical pulse Pa by the phase pattern. In FIGS. 6 and 7, the horizontal axis represents wavelength (nm), the left vertical axis represents spectral intensity value (arbitrary unit), and the right vertical axis represents spectral phase value (rad). The spectrum waveform shown in FIG. 6 shows a case where negative group delay dispersion is given to the optical pulse Pa. The spectrum waveform shown in FIG. 7 shows a case where positive group delay dispersion is given to the optical pulse Pa.

In the spectral waveform shown in FIG. 6, a wavelength characteristic of the spectral phase G11 is symmetric with respect to a center wavelength of the optical pulse Pa, and has a characteristic in which the spectral phase smoothly increases and then decreases with increasing distance from the center wavelength. The slope of the spectral phase G11 is discontinuous at the center wavelength and continuous at other wavelengths. In the illustrated example, the center wavelength of the spectral phase G11 is 800 nm, and the spectral phase G11 takes a local maximum value near 783 nm and near 817 nm. For example, by presenting such a phase pattern on the modulation surface 17, the optical pulse Pa can be converted into the optical pulse train Pb, and at the same time, negative group delay dispersion can be suitably given to the optical pulse Pa.

In the spectral waveform shown in FIG. 7, a wavelength characteristic of the spectral phase G11 is symmetric with respect to a center wavelength of the optical pulse Pa, and has a characteristic in which the spectral phase smoothly decreases and then increases with increasing distance from the center wavelength. The slope of the spectral phase G11 is discontinuous at the center wavelength and continuous at other wavelengths. In the illustrated example, the center wavelength of the spectral phase G11 is 800 nm, and the spectral phase G11 takes a local minimum value near 783 nm and near 817 nm. For example, by presenting such a phase pattern on the modulation surface 17, the optical pulse Pa can be converted into the optical pulse train Pb, and at the same time, positive group delay dispersion can be suitably given to the optical pulse Pa.

The control unit 5a may store a first phase pattern for applying positive group delay dispersion to the optical pulse Pa and a second phase pattern for applying negative group delay dispersion to the optical pulse Pa, and selectively output the first phase pattern and the second phase pattern to the SLM 14. In this case, the control unit 5a may acquire information concerning the sign of the group delay dispersion of the optical component 7 through the input unit 5c.

The absolute value of the group delay dispersion given to the optical pulse Pa by the phase pattern is preferably close to the absolute value of the group delay dispersion of the optical component 7. For example, the absolute value of the group delay dispersion given to the optical pulse Pa by the phase pattern may be within a predicted range (for example, within an allowable error) of the absolute value of the group delay dispersion of the optical component 7. Alternatively, the absolute value of the group delay dispersion given to the optical pulse Pa by the phase pattern may be equal to the absolute value of the group delay dispersion on design of the optical component 7.

Figure 8:
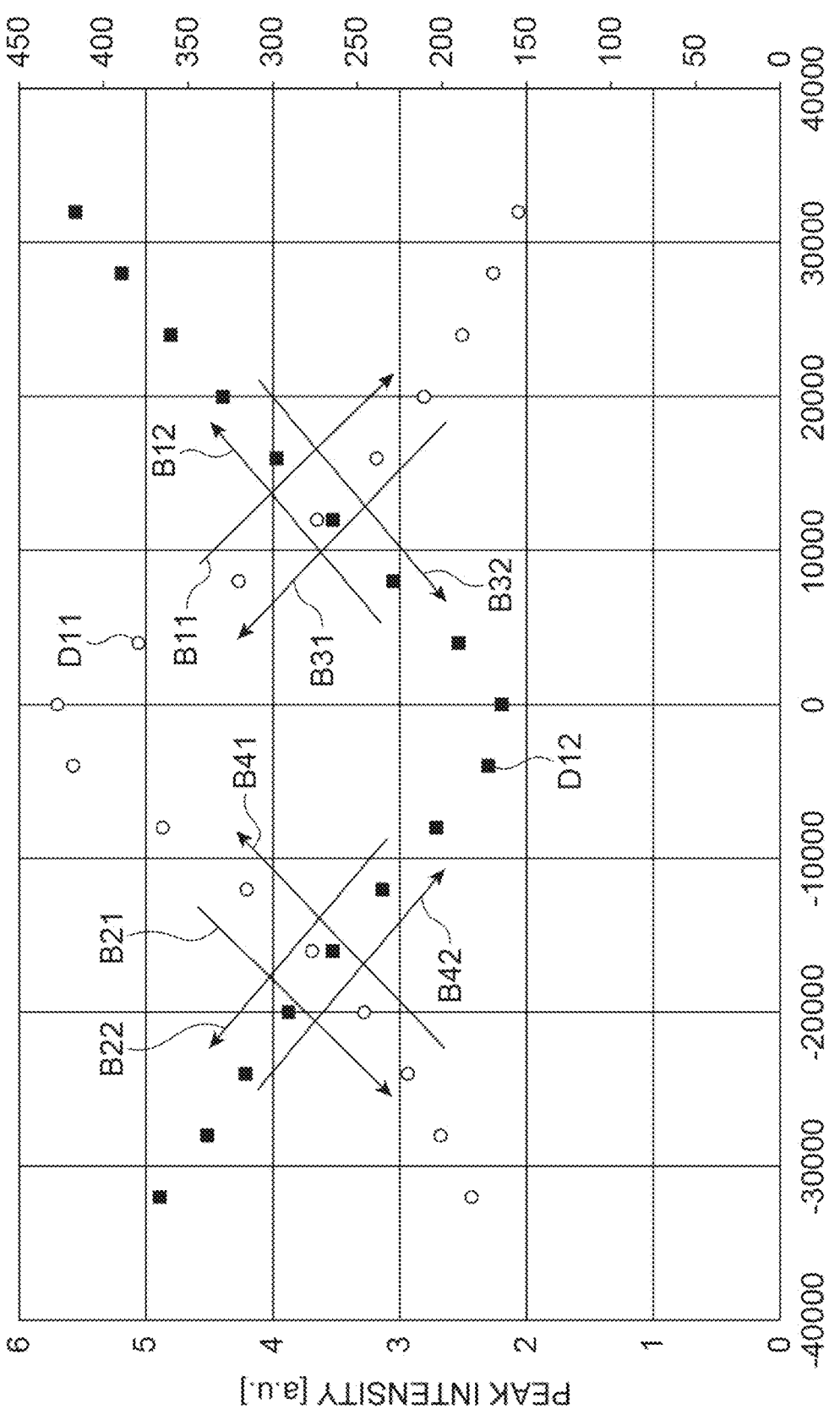
FIG. 8 is a graph illustrating an example of the relationship between the group delay dispersion of the optical pulse train and both the peak intensity and the pulse half-width in the temporal waveform of the optical pulse.

A change in a temporal waveform of the optical pulse train Pb caused by the group delay dispersion will be described. FIG. 8 is a graph illustrating an example of the relationship between the group delay dispersion of the optical pulse train Pb and both the peak intensity and the pulse width of the temporal waveform of the optical pulses $Pb_1$ and $Pb_2$. In FIG. 8, the left vertical axis represents the peak intensity (arbitrary unit) of the optical pulses $Pb_1$ and $Pb_2$, and the right vertical axis represents the pulse half width (unit: fs) of the optical pulses $Pb_1$ and $Pb_2$. The horizontal axis represents the group delay dispersion (unit: $fs^2$) of the optical pulse train Pb. White circle plots D11 in the figure indicate a peak intensities of the light pulses $Pb_1$ and $Pb_2$. Black square plots D12 in the figure indicates the pulse half width of the optical pulses $Pb_1$ and $Pb_2$. In the description of the present embodiment, the "peak intensity of an optical pulse" and the "pulse width of an optical pulse" mean the peak intensity and the pulse width of an optical pulse in the time domain, unless otherwise specified.

As shown in FIG. 8, the peak intensities and the pulse widths of the optical pulses $Pb_1$ and $Pb_2$ depend on the group delay dispersion. That is, when the group delay dispersion is zero, the peak intensities of the optical pulses $Pb_1$ and $Pb_2$ become maximum, and the pulse widths of the optical pulses $Pb_1$ and $Pb_2$ become minimum. As the absolute value of the group delay dispersion become larger, the peak intensities of the optical pulses $Pb_1$ and $Pb_2$ become smaller and the pulse widths of the optical pulses $Pb_1$ and $Pb_2$ become larger.

In the present embodiment, first, a positive or negative group delay dispersion is given to the optical pulse Pa by the SLM 14. When the positive group delay dispersion is given to the optical pulse Pa, the optical pulse train Pb has the positive group delay dispersion. Therefore, the peak intensities of the optical pulses $Pb_1$ and $Pb_2$ change in direction of the arrow B11 shown in FIG. 8, and the pulse widths of the optical pulses $Pb_1$ and $Pb_2$ change in the direction of the arrow B12. When the negative group delay dispersion is given to the optical pulse Pa, the optical pulse train Pb has the negative group delay dispersion. Therefore, the peak intensities of the optical pulses $Pb_1$ and $Pb_2$ change in the direction of the arrow B21 shown in FIG. 8, and the pulse widths of the optical pulses $Pb_1$ and $Pb_2$ change in the direction of the arrow B22. Therefore, in either case, the peak intensities of the optical pulses $Pb_1$ and $Pb_2$ decrease and the pulse widths of the optical pulses $Pb_1$ and $Pb_2$ increase.

When the group delay dispersion is applied to the optical pulse Pa by the SLM 14, the peak intensities of the optical pulses $Pb_1$ and $Pb_2$ in the time domain are reduced while the intensity of the optical pulses Pb and $Pb_2$ in the spectrum domain are maintained.

Next, when the optical pulse train Pb is transmitted through the optical component 7, the optical component 7 provides the optical pulse train Pb with a group delay dispersion having a sign opposite to that of the group delay dispersion provided to the optical pulse Pa by the SLM 14. When a negative group delay dispersion is applied to the optical pulse train Pb by the optical component 7, the peak intensities of the optical pulses $Pb_1$ and $Pb_2$ change in the direction of the arrow B31 shown in FIG. 8, and the pulse widths of the optical pulses $Pb_1$ and $Pb_2$ change in the direction of the arrow B32. When a positive group delay dispersion is applied to the optical pulse train Pb in the optical component 7, the peak intensities of the optical pulses $Pb_1$ and $Pb_2$ change in the direction of the arrow B41 shown in FIG. 8, and the pulse widths of the optical pulses $Pb_1$ and $Pb_2$ change in the direction of the arrow B42. Therefore, in either case, the peak intensities of the optical pulses $Pb_1$ and $Pb_2$ become high, and the pulse widths of the optical pulses $Pb_1$ and $Pb_2$ become narrow.

As the absolute value of the group delay dispersion given to the optical pulses Pa by the SLM 14 are closer to the absolute value of the group delay dispersion given to the optical pulse train Pb by the optical component 7, the group delay dispersion of the optical pulse train Pb after being transmitted through the optical component 7 approaches zero. When the absolute group delay dispersion given to the optical pulse Pa by the SLM 14 is equal to the absolute group delay dispersion given to the optical pulse train Pb by the optical component 7, the group delay dispersion of the optical pulse train Pb after being transmitted through the optical component 7 becomes zero, so that the peak intensities of the optical pulses $Pb_1$ and $Pb_2$ become maximum and the pulse widths of the optical pulses $Pb_1$ and $Pb_2$ become minimum.

Figure 9:
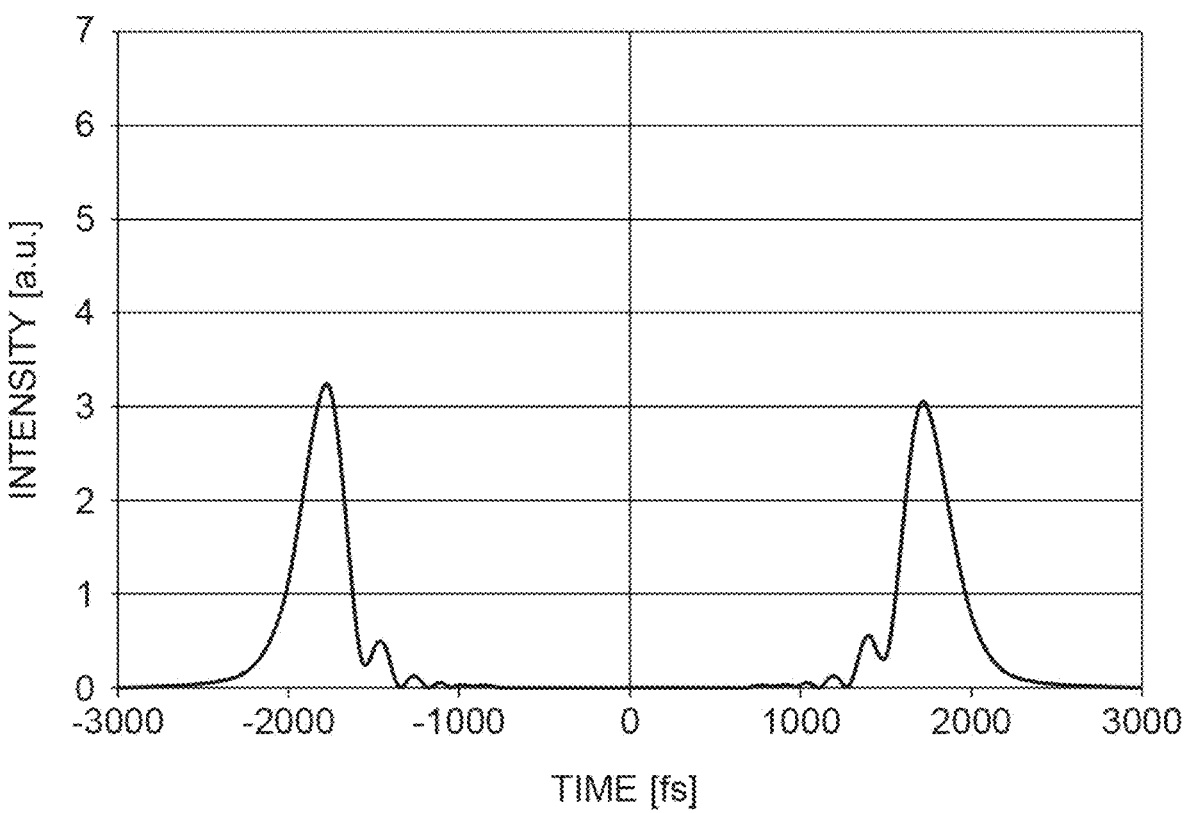
FIG. 9 is a graph illustrating an example of a temporal waveform of a pulse train output from a pulse forming unit according to an embodiment.
Figure 10:
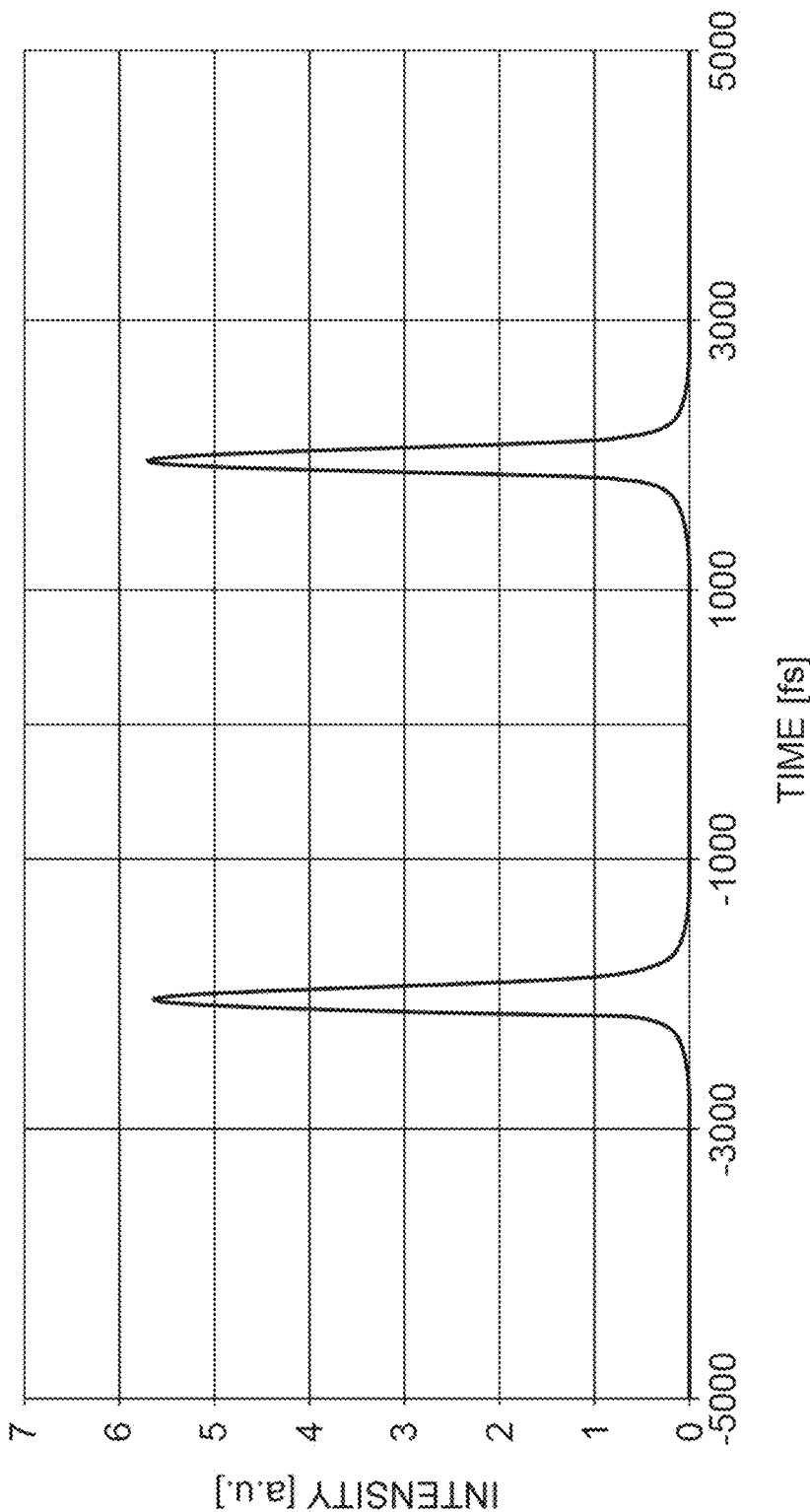
FIG. 10 is a graph illustrating, as a comparative example, an example of a temporal waveform of a pulse train output from a pulse forming unit when a group delay dispersion is not given to an optical pulse in a spatial light modulator.

FIG. 9 is a graph illustrating an example of a temporal waveform of the optical pulse train Pb output from the pulse forming unit 3 according to the present embodiment. FIG. 10 is a graph illustrating an example of a temporal waveform of the optical pulse train Pb output from the pulse forming unit 3 in a case where the group delay dispersion is not applied to the optical pulse Pa by the SLM 14 as a comparative example. As shown in FIGS. 9 and 10, when the group delay dispersion is applied to the optical pulse Pa by the SLM 14, the peak intensities of the optical pulses $Pb_1$ and $Pb_2$ are lower and the pulse widths of the optical pulses $Pb_1$ and $Pb_2$ are larger than when the group delay dispersion is not applied to the optical pulse Pa by the SLM 14.

Figure 11:
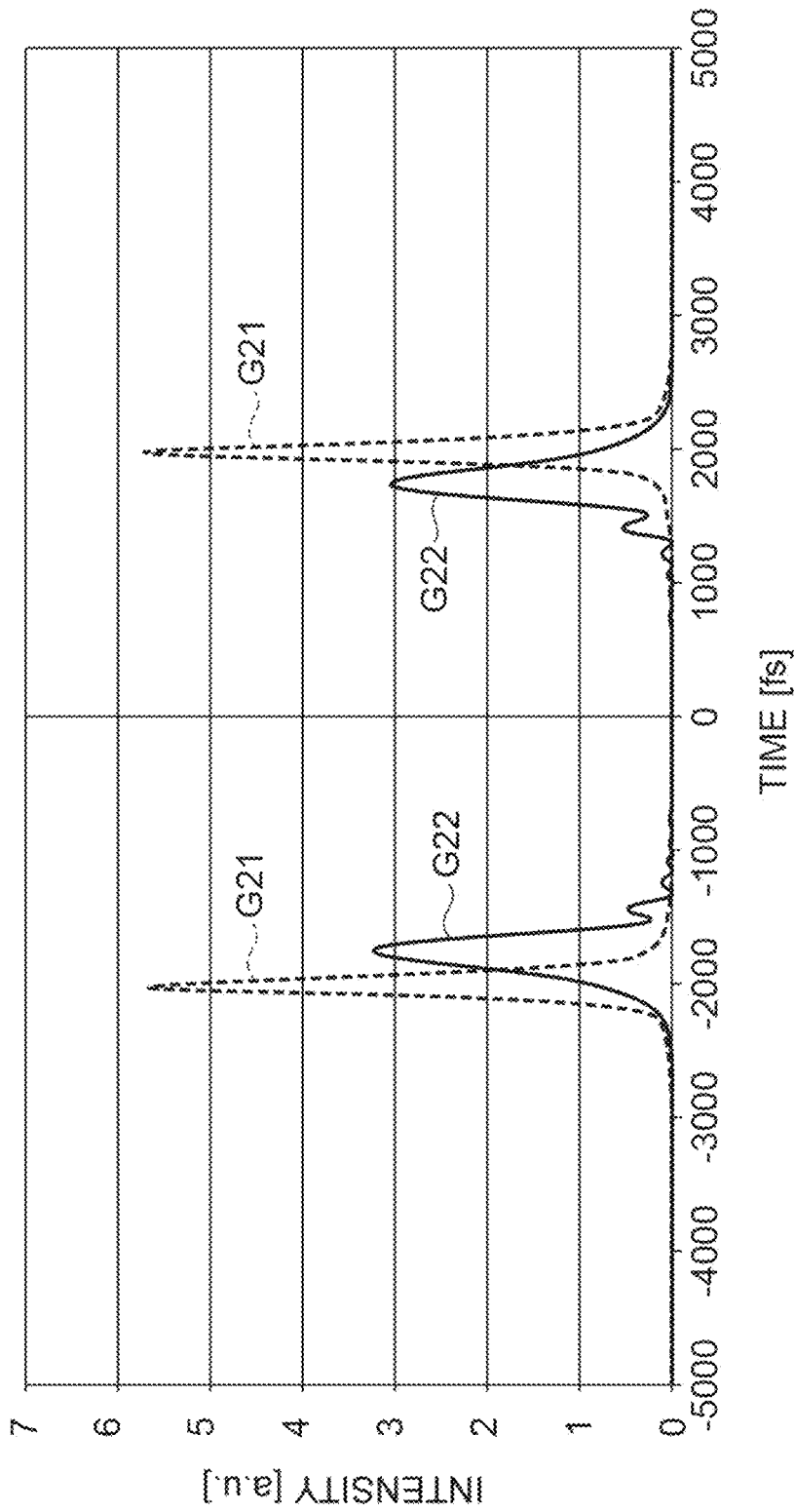
FIG. 11 is a graph illustrating an example of a temporal waveform of a pulse train after being transmitted through an optical component.

FIG. 11 is a graph illustrating an example of a temporal waveform (curve G21) of the optical pulse train Pb after being transmitted through the optical component 7. FIG. 11 also shows the temporal waveform (curve G22) of the optical pulse train Pb shown in FIG. 9. As shown in FIG. 11, after being transmitted through the optical component 7, it can be seen that the peak intensities of the light pulses $Pb_1$ and $Pb_2$ become higher and the pulse widths of the light pulses $Pb_1$ and $Pb_2$ become smaller than before being transmitted through the optical component 7.

Figure 12:
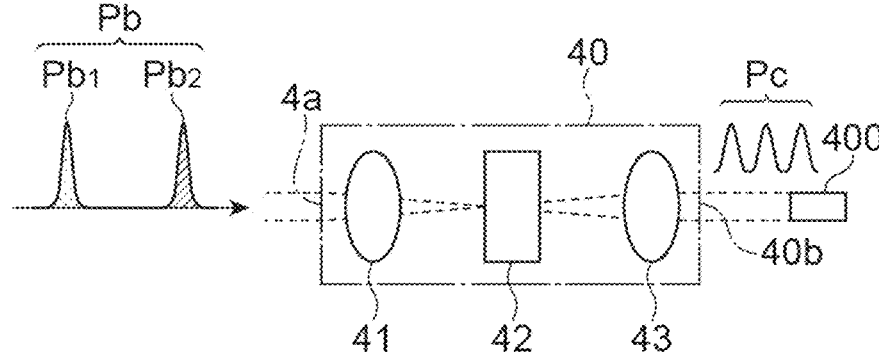
FIG. 12 is a diagram illustrating a configuration example of a correlation optical system.

The correlation optical system 40 shown in FIG. 1 receives the optical pulse train Pb transmitted through the optical component 7, and outputs correlated light Pc which is cross-correlation or autocorrelation of the optical pulse train Pb. FIG. 12 is a diagram illustrating a configuration example of the correlation optical system 40. The correlation optical system 40 may include a lens 41, an optical element 42, and a lens 43. The lens 41 is provided on an optical path between the pulse forming unit 3 (see FIG. 1) and the optical element 42, and focuses the optical pulse train Pb output from the pulse forming unit 3 on the optical element 42. The optical element 42 is, for example, a light-emitting object including at least one of a phosphor and a non-linear optical crystal that generates a second harmonic wave (SHG). Examples of the non-linear optical crystal include a KTP ($KTiOPO_4$) crystal, an LBO ($LiB_3O_5$) crystal, a BBO ($\beta$-$BaB_2O_4$) crystal, and the like. Examples of the phosphor include coumarin, stilbene, rhodamine, and the like. The optical element 42 generates correlated light Pc including cross-correlation or autocorrelation of the optical pulse train Pb by receiving an input of the optical pulse train Pb. The lens 43 collimates or focuses the correlated light Pc output from the optical element 42. The correlated light Pc is light generated to more accurately detect the temporal waveform of the optical pulse train Pb.

Figure 13:
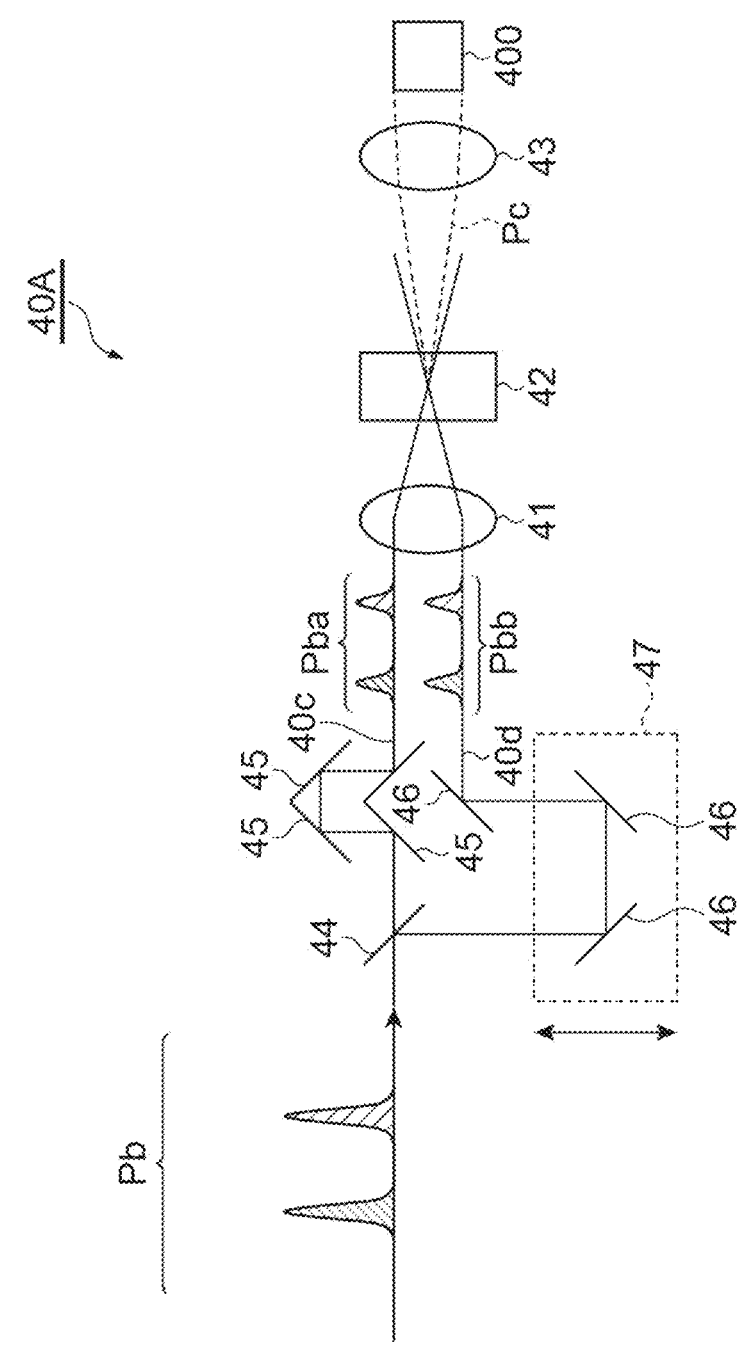
FIG. 13 is a diagram schematically illustrating, as an example of the configuration of the correlation optical system, a correlation optical system for generating correlated light including autocorrelation of an optical pulse train.

Here, a configuration example of the correlation optical system 40 will be described in detail. FIG. 13 is a schematic diagram illustrating a correlation optical system 40A for generating correlated light Pc including autocorrelation of the optical pulse train Pb, as the configuration example of the correlation optical system 40. The correlation optical system 40A includes a beam splitter 44 as an optical branching component that branches the optical pulse train Pb into two pieces. The beam splitter 44 is optically coupled to the pulse forming unit 3 illustrated in FIG. 1, and transmits a part of the optical pulse train Pb input from the pulse forming unit 3, and reflects the remaining part. The branching ratio of the beam splitter 44 is, for example, 1:1. One optical pulse train Pba branched by the beam splitter 44 reaches the lens 41 through an optical path 40c including a plurality of mirrors 45. The other optical pulse train Pbb branched by the beam splitter 44 reaches the lens 41 through an optical path 40d including a plurality of mirrors 46. The optical length of the optical path 40c is different from the optical length of the optical path 40d. Therefore, the plurality of mirrors 45 and the plurality of mirrors 46 constitute a delay optical system that applies a time difference to one optical pulse train Pba and the other optical pulse train Pbb branched by the beam splitter 44. Further, at least some of the plurality of mirrors 46 are mounted on a moving stage 47, and thus the optical length of the optical path 40d becomes variable. Therefore, in this configuration, it is possible to make the time difference between the optical pulse train Pba and the optical pulse train Pbb variable.

In this example, the optical element 42 includes a non-linear optical crystal. The lens 41 focuses each of the optical pulse trains Pba and Pbb toward the optical element 42, and causes the optical axes of the optical pulse trains Pba and Pbb to intersect each other at a predetermined angle in the optical element 42. As a result, in the optical element 42 which is a non-linear optical crystal, a second harmonic wave is generated starting from the intersection of the optical pulse trains Pba and Pbb. The second harmonic wave is the correlated light Pc and includes autocorrelation of the optical pulse train Pb. The correlated light Pc is collimated or focused by the lens 43 and then input to the detector 400.

Figure 14:
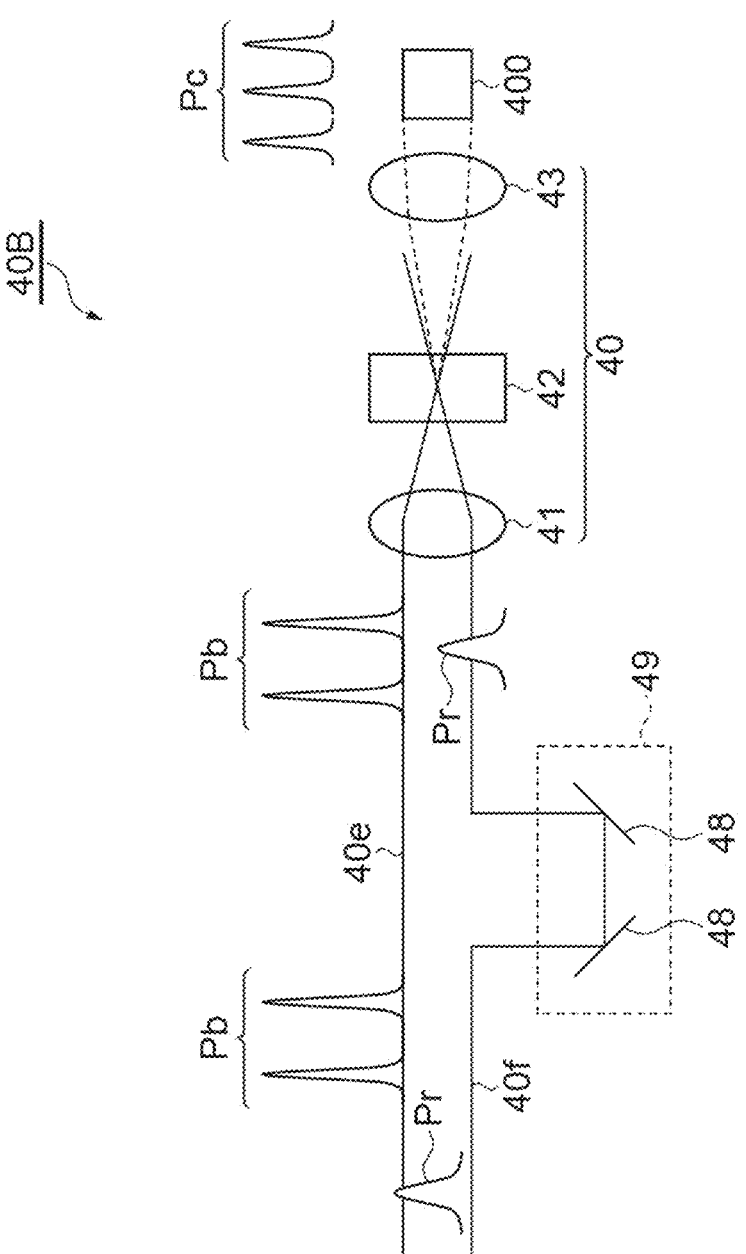
FIG. 14 is a diagram schematically illustrating, as another example of the configuration of the correlation optical system, a correlation optical system for generating correlated light including cross-correlation of an optical pulse train.

FIG. 14 is a schematic diagram illustrating a correlation optical system 40B for generating correlated light Pc including cross-correlation of the optical pulse train Pb, as another configuration example of the correlation optical system 40. In the correlation optical system 40B, the optical pulse train Pb reaches the lens 41 through an optical path 40e, and a reference optical pulse Pr, which is a single pulse, reaches the lens 41 through an optical path 40f. The optical path 40f includes a plurality of mirrors 48 and is bent in a U shape. Further, at least some of the plurality of mirrors 48 are mounted on a moving stage 49, and thus the optical length of the optical path 40f becomes variable. Therefore, in this configuration, it is possible to make the time difference between the optical pulse train Pb and the reference optical pulse Pr (timing difference to reach the lens 41) variable.

Also in this example, the optical element 42 includes a non-linear optical crystal. The lens 41 focuses the optical pulse train Pb and the reference optical pulse Pr toward the optical element 42, and causes the optical axis of the optical pulse train Pb to intersect the optical axis of the reference optical pulse Pr at a predetermined angle in the optical element 42. As a result, in the optical element 42 which is a non-linear optical crystal, a second harmonic wave is generated starting from the intersection of the optical pulse train Pb and the reference optical pulse Pr. The second harmonic wave is the correlated light Pc and includes cross-correlation of the optical pulse train Pb. The correlated light Pc is collimated or focused by the lens 43 and then input to the detector 400.

Figure 15:
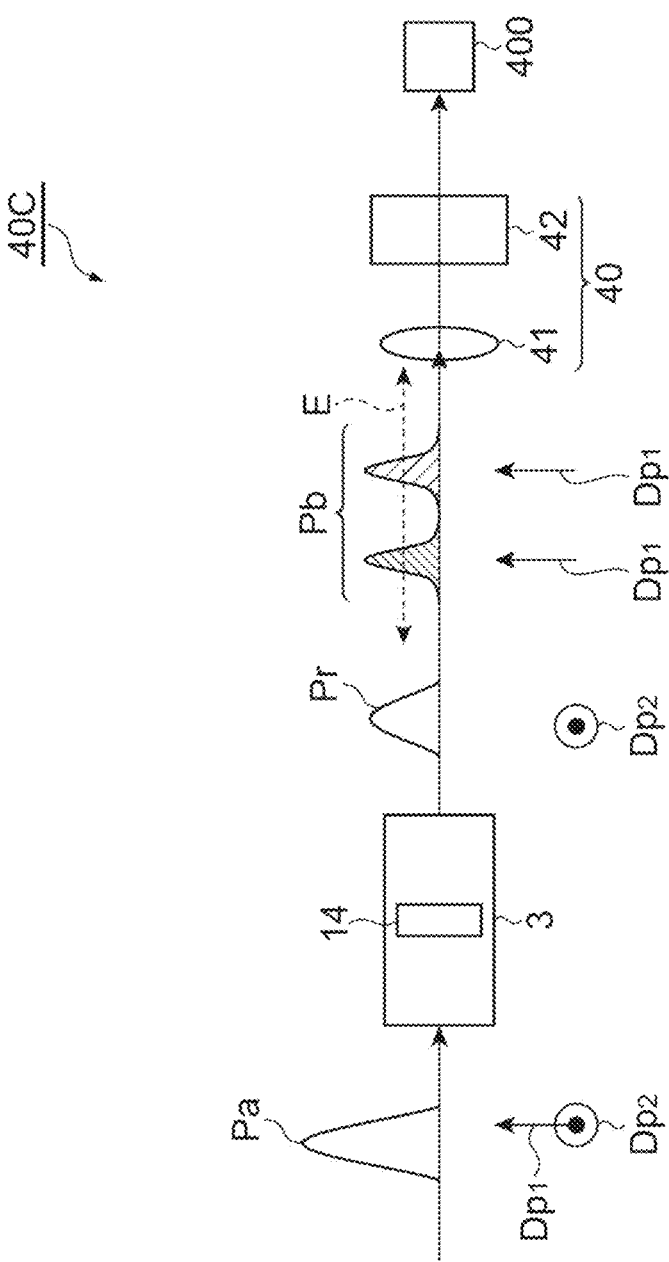
FIG. 15 is a diagram schematically illustrating, as yet another configuration example of the correlation optical system, a correlation optical system for generating correlated light including cross-correlation of an optical pulse train.

FIG. 15 is a schematic diagram illustrating a correlation optical system 40C for generating correlated light Pc including cross-correlation of the optical pulse train Pb, as still another configuration example of the correlation optical system 40. In this example, the SLM 14 of the pulse forming unit 3 is a polarization-dependent spatial light modulator having a modulation effect in a first polarization direction. Regarding this, the deflection plane of the optical pulse Pa input to the pulse forming unit 3 is inclined with respect to the polarization direction in which the SLM 14 has a modulation function. The optical pulse Pa includes a polarization component (arrow $Dp_1$ in Figure) in the first polarization direction and a polarization component (symbol $Dp_2$ in Figure) in a second polarization direction perpendicular to the first polarization direction. The polarization of the optical pulse Pa is not limited to the above-described polarization (inclined linear polarization), and may be elliptically polarized light.

The polarization component of the optical pulse Pa in the first polarization direction is modulated in the SLM 14 and output from the pulse forming unit 3 as the optical pulse train Pb. On the other hand, the polarization component of the optical pulse Pa in the second polarization direction is output from the pulse forming unit 3 as it is without being modulated in the SLM 14. The unmodulated polarization component is provided to the correlation optical system 40 coaxially with the optical pulse train Pb as the reference optical pulse Pr that is a single pulse. The correlation optical system 40 generates correlated light Pc including cross-correlation of the optical pulse train Pb from the optical pulse train Pb and the reference optical pulse Pr. In this configuration example, since a delay is applied to the optical pulse train Pb in the SLM 14 and a delay time is made variable (arrow E in Figure), it is possible to make the time difference between the optical pulse train Pb and the reference optical pulse Pr (timing difference to reach the lens 41) variable. Therefore, it is possible to suitably generate the correlated light Pc including the cross-correlation of the optical pulse train Pb in the correlation optical system 40.

As illustrated in FIGS. 13 to 15, the correlation optical system 40 is an optical system that spatially and temporally superimposes the optical pulse train Pb with the optical pulse train Pb itself or another pulse train. Specifically, by temporally sweeping one pulse train, a correlation waveform conforming to the temporal waveform shape of the optical pulse train Pb is detected. Here, in general, since the pulse is swept by spatially changing the optical path length by a driving stage or the like, the movement amount of the stage corresponds to the time delay amount of the correlation waveform. At this time, the time delay amount with respect to the stage movement amount is very small. Therefore, by adopting the correlation optical system 40, it is possible to observe the pulse shape on a high time-resolved scale reaching the femtosecond order in the detector 400 (described later). As a result, it is possible to more accurately measure a feature amount of the temporal waveform of the optical pulse train Pb.

In a case where the wavelength dispersion of the optical component 7 is not zero, the feature amounts (peak intensity, full width at half maximum, and peak time interval) of a temporal waveform of the plurality of optical pulses included in the correlated light Pc greatly change as compared with a case where the wavelength dispersion amount of the optical component 7 is zero. The amount of change depends on the wavelength dispersion amount of the optical component 7. Thus, by observing the change in the feature amount of the temporal waveform of the correlated light Pc, it is possible to accurately and easily known the wavelength dispersion amount of the optical component 7. However, in the above observation, the wavelength dispersion amount of the optical component 7 may be corrected by using a known wavelength dispersion amount of the pulsed laser light source 2.

Figure 16:
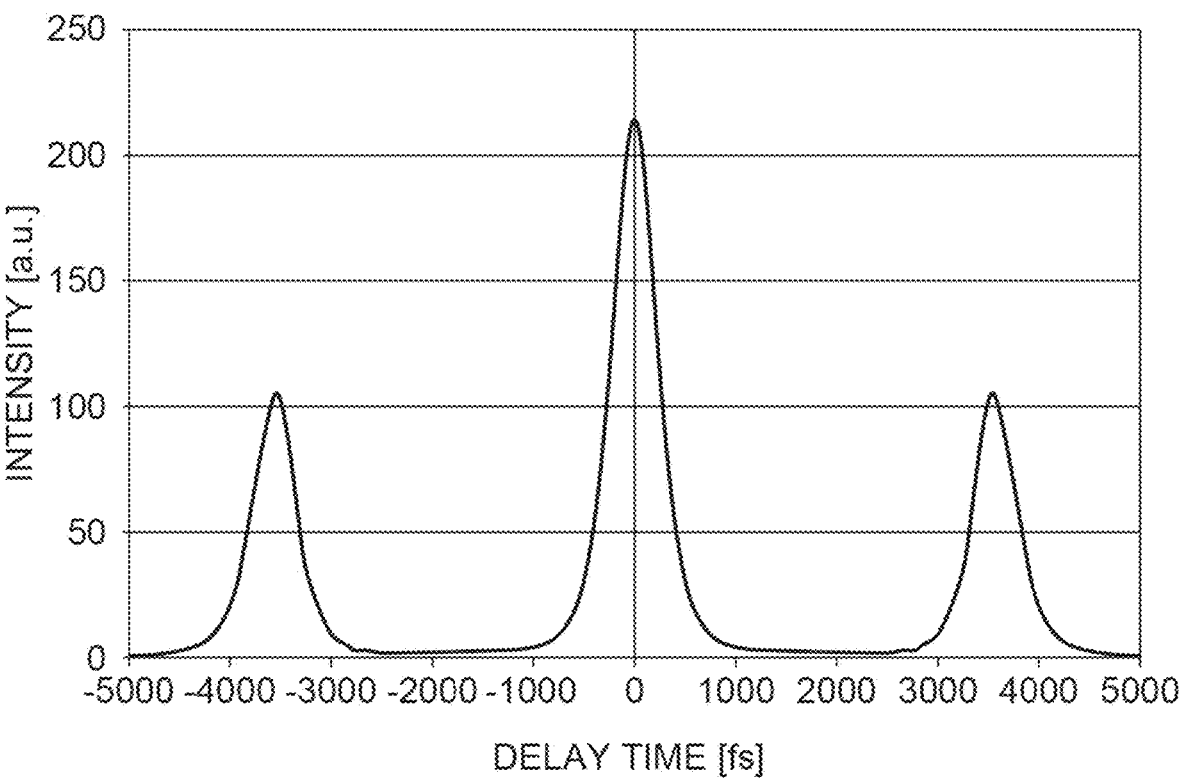
FIG. 16 is a graph illustrating an example of a temporal waveform of correlated light output from the correlation optical system in a state in which no optical component is arranged in an embodiment.
Figure 17:
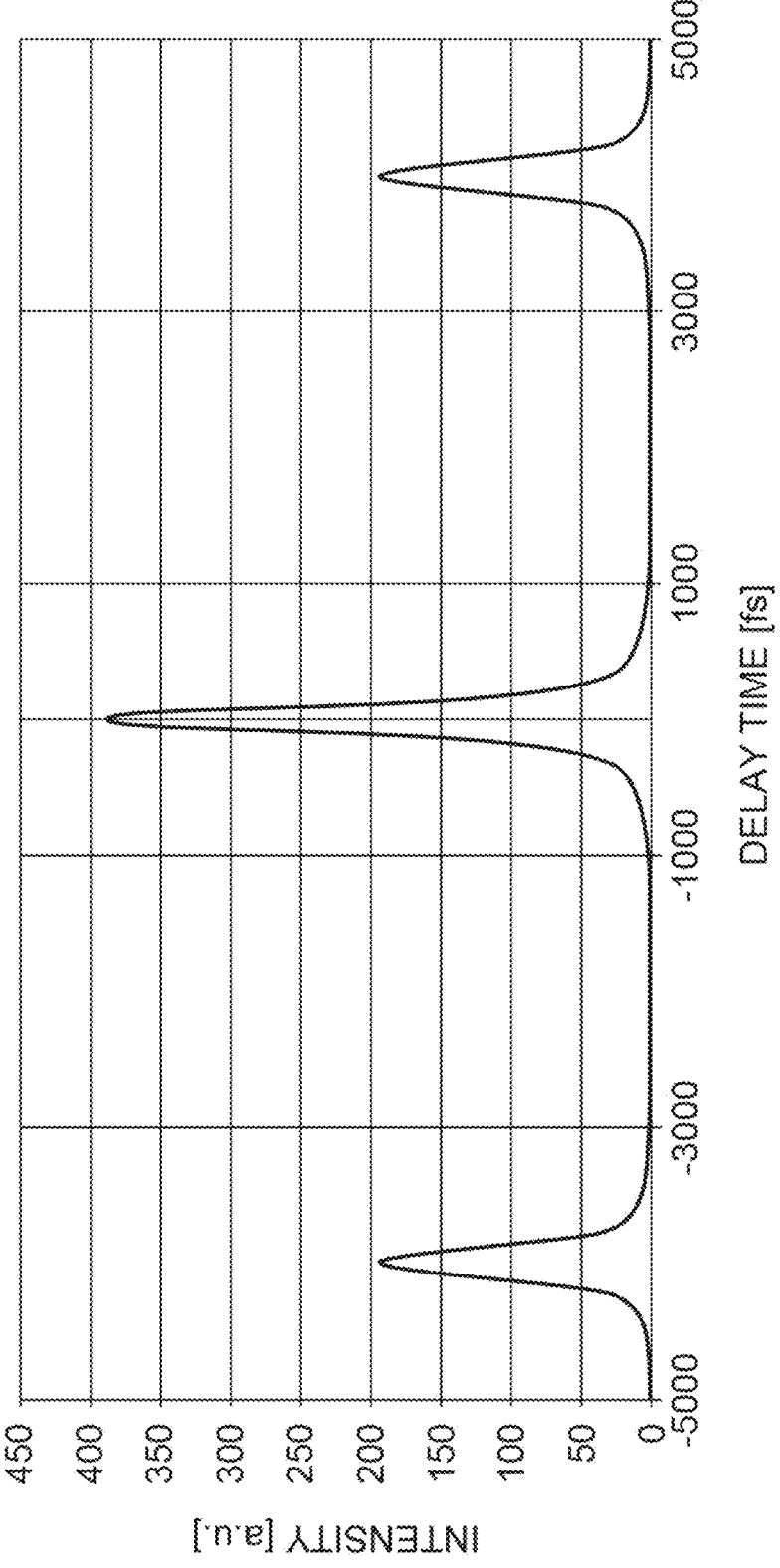
FIG. 17 is a graph illustrating, as a comparative example, an example of the temporal waveform of the correlated light output from the correlation optical system in a state where optical components are not arranged when the group delay dispersion is not given to the optical pulse in the spatial light modulator.

As described above, in the present embodiment, the positive or negative group delay dispersion is applied to the optical pulse Pa by the SLM 14. FIG. 16 is a graph illustrating an example of a temporal waveform of the correlated light Pc output from the correlation optical system 40 in a state where the optical component 7 is not disposed in the present embodiment. FIG. 17 is a graph illustrating, as a comparative example, an example of a temporal waveform of the correlated light Pc output from the correlation optical system 40 in a state where the optical component 7 is not disposed in a case where the group delay dispersion is not applied to the optical pulse Pa by the SLM 14. As shown in FIGS. 16 and 17, in the case where the group delay dispersion is applied to the optical pulse Pa by the SLM 14, the peak intensity of the correlated light Pc in the state where the optical component 7 is not disposed decreases and the pulse width of the correlated light Pc increases compared to the case where the group delay dispersion is not applied to the optical pulse Pa by the SLM 14.

Figure 18:
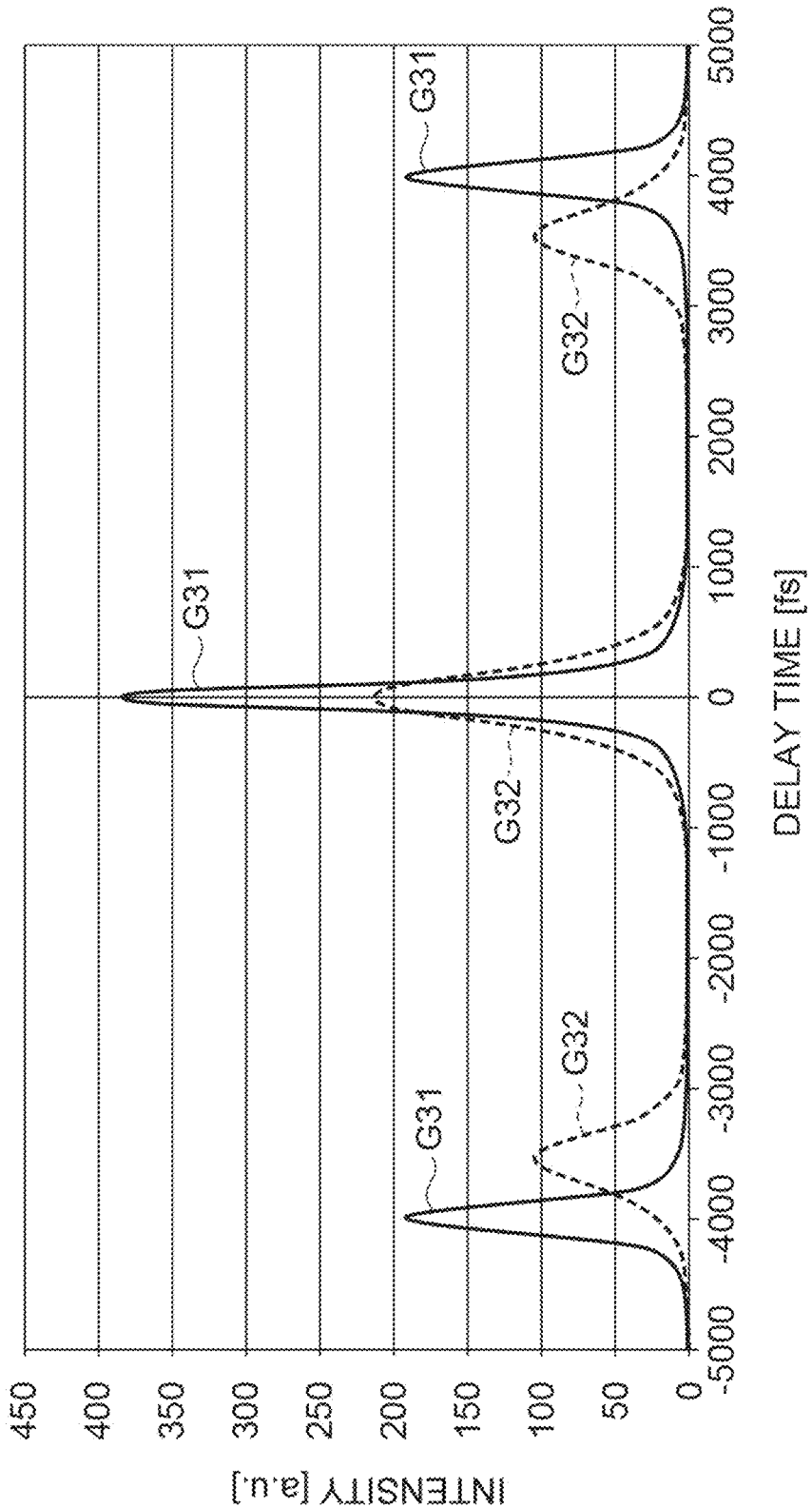
FIG. 18 is a graph illustrating an example of a temporal waveform of the correlated light when the optical component is arranged in an embodiment.

FIG. 18 is a graph illustrating an example of a temporal waveform (curve G31) of the correlated light Pc when the optical component 7 is disposed in the present embodiment. FIG. 18 also shows the temporal waveform (curve G32) of the correlated light Pc shown in FIG. 16. As shown in FIG. 18, in the case where the optical component 7 is disposed, it can be seen that the peak intensity of the correlated light Pc increases and the pulse width of the correlated light Pc decreases as compared with the case where the optical component 7 is not disposed.

Refer to FIG. 1 again. The detector 400 receives the correlated light Pc output from the correlation optical system 40. The detector 400 detects the temporal waveform of the correlated light Pc formed from the optical pulse train Pb having a peak intensity equal to or greater than the detection threshold value of the light detection unit 4. The detector 400 is configured to include, for example, a photodetector such as a photodiode. The detector 400 detects the temporal waveform of the correlated light Pc by converting the intensity of the correlated light Pe into an electrical signal. The electric signal that is the detection result is provided to the arithmetic operation unit 5b. In the present embodiment, the detection threshold value is a value determined based on the characteristics of the correlation optical system 40 and the detector 400. Since the optical pulse train Pb having a peak intensity equal to or greater than the detection threshold value enters into the correlation optical system 40, it is possible for the detector 400 to accurately detect the temporal waveform of the optical pulse train Pb.

The arithmetic operation unit 5b is electrically connected to the detector 400. The arithmetic operation unit 5b estimates the wavelength dispersion amount of the optical component 7 based on the feature amount of the temporal waveform provided from the detector 400. As described above, according to the knowledge of the present inventor, in a case where the correlated light Pc including the cross-correlation or the autocorrelation of the optical pulse train Pb is generated, various feature amounts (for example, peak interval, peak intensity, pulse width, and the like) in the temporal waveform of the correlated light Pc have a significant correlation with the wavelength dispersion amount of the measurement object. Therefore, the arithmetic operation unit 5b can accurately estimate the wavelength dispersion amount of the optical component 7 as the measurement object by evaluating the feature amount of the temporal waveform of the correlated light Pc.

The input unit 5c receives an input from a user of the dispersion measurement device 1A. The input unit 5c acquires information about the sign of the group delay dispersion of the optical component 7. The information regarding the sign of the group delay dispersion of the optical component 7 is information indicating that the group delay dispersion of the optical component 7 is positive or information indicating that the group delay dispersion of the optical component 7 is negative.

The output unit 5d outputs an estimation result of the wavelength dispersion amount in the arithmetic operation unit 5b. The output unit 5d is, for example, a display device that displays an estimation result of the wavelength dispersion amount.

Figure 19:
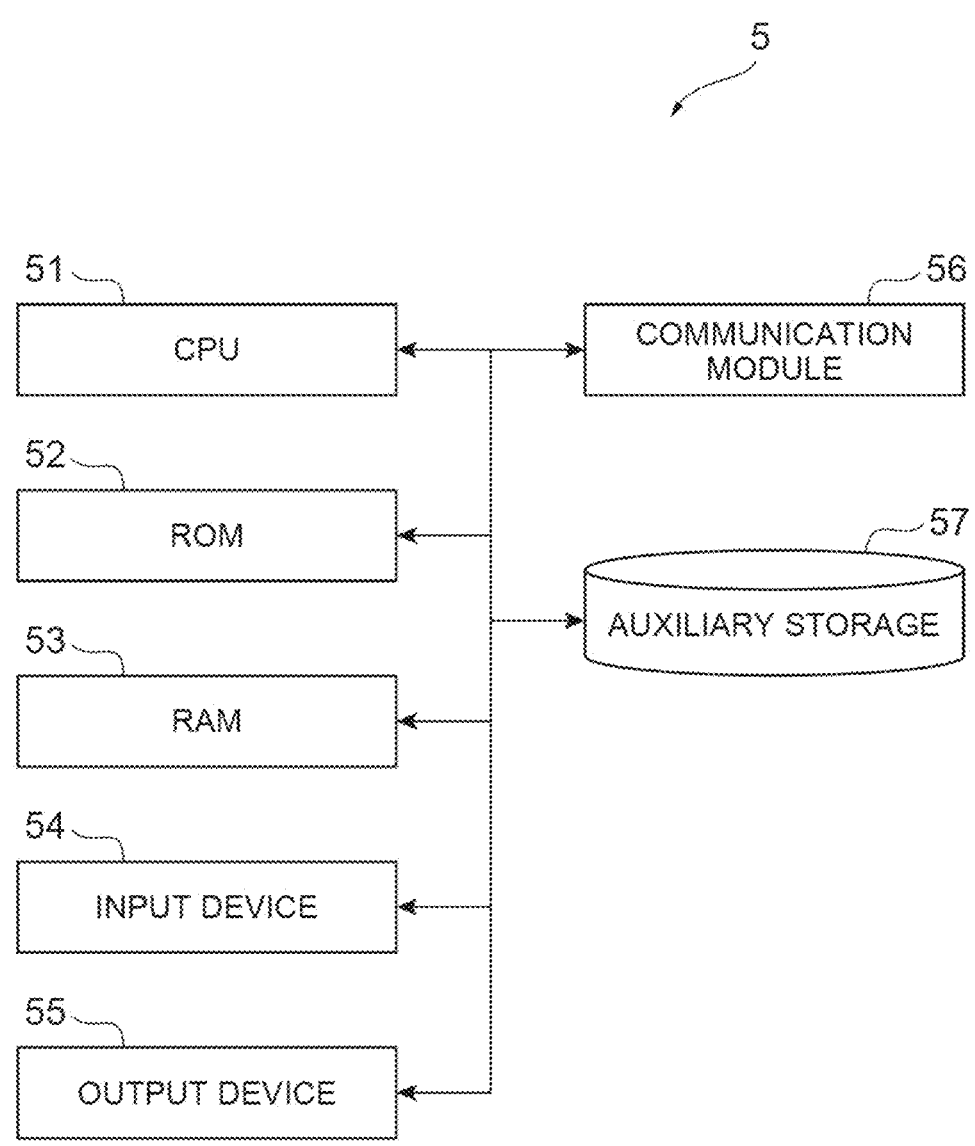
FIG. 19 is a diagram schematically illustrating a configuration example of hardware of a control device.

FIG. 19 is a schematic diagram illustrating a configuration example of hardware of the control device 5. As illustrated in FIG. 19, the control device 5 may be physically configured as a normal computer including a processor (CPU) 51, a main storage device such as a ROM 52 and a RAM 53, an input device 54 such as a keyboard, a mouse, and a touch screen, an output device 55 such as a display (including a touch screen), a communication module 56 (such as a network card) for transmitting and receiving data to and from other devices, an auxiliary storage device 57 such as a hard disk, and the like.

The processor 51 of the computer can realize the function of the arithmetic operation unit 5b by a wavelength dispersion amount calculation program. In other words, the wavelength dispersion amount calculation program causes the processor 51 of the computer to operate as the arithmetic operation unit 5b. The wavelength dispersion amount calculation program is stored in a storage device (storage medium) inside or outside the computer, for example, the auxiliary storage device 57. The storage device may be a non-transitory recording medium. Examples of the recording medium include a recording medium such as a flexible disk, a CD, and a DVD, a recording medium such as a ROM, a semiconductor memory, and a cloud server. The output device 55 such as a display (including a touch screen) operates as the output unit 5d.

The auxiliary storage device 57 stores the feature amount of the temporal waveform of the correlated light Pc theoretically calculated in advance (or measured in advance) on the assumption that the wavelength dispersion amount of the optical component 7 is zero. By comparing the stored feature amount with the feature amount of the temporal waveform of the correlated light Pc detected by the detector 400, it can be seen how much the feature amount of the correlated light Pc has changed due to the wavelength dispersion amount of the optical component 7. Therefore, the arithmetic operation unit 5b can estimate the wavelength dispersion amount of the optical component 7 by comparing the feature amount stored in the auxiliary storage device 57 with the feature amount of the temporal waveform of the correlated light Pc detected by the detector 400.

Figure 20:
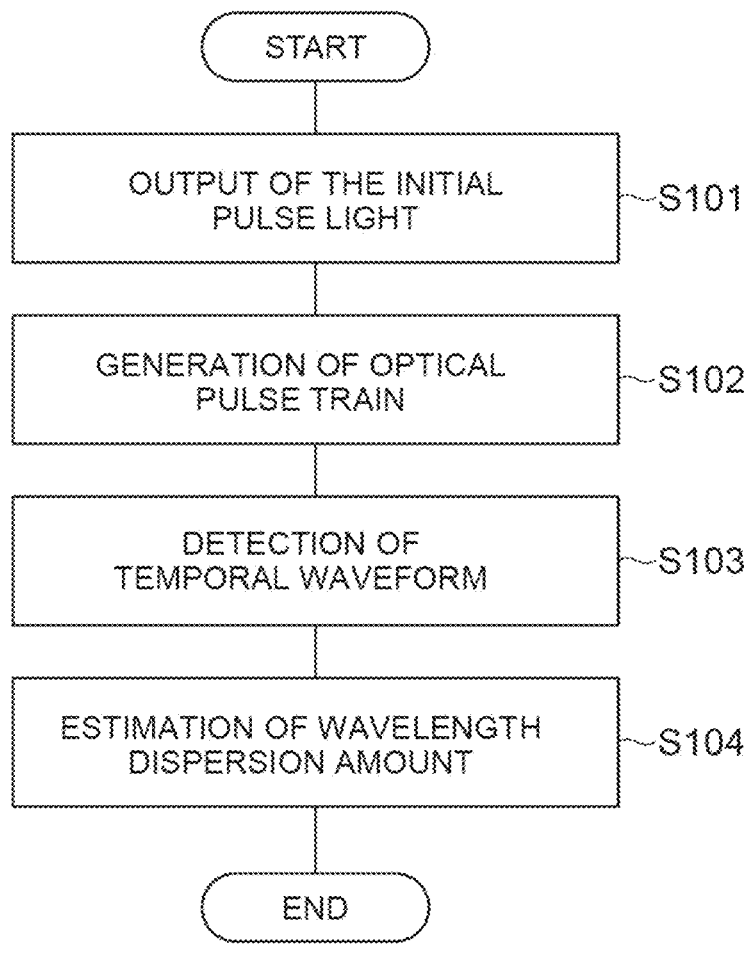
FIG. 20 is a flowchart illustrating a dispersion measurement method.

FIG. 20 is a flowchart illustrating a dispersion measurement method using the dispersion measurement device 1A having the above configuration. First, in an output step S101, the pulsed laser light source 2 outputs an optical pulse Pa.

Then, in a pulse forming step S102, the pulse forming unit 3 receives the optical pulse Pa and generates an optical pulse train Pb. Specifically, the pulse forming unit 3 forms the optical pulse train Pb, which is modulated light including a plurality of optical pulses Pb₁ and Pb₂ having a time difference from each other and having different center wavelengths from each other, from the optical pulse Pa output from the pulsed laser light source 2. For example, a plurality of wavelength components included in the optical pulse Pa are spatially separated for each wavelength, and the phases of the plurality of wavelength components are shifted from each other by using the SLM 14. Then, the plurality of wavelength components are focused. Thus, it is possible to easily generate the optical pulse train Pb. In addition, in the pulse forming step S102, a phase pattern presented to the SLM 14 gives a positive or negative group delay dispersion to the optical pulse Pa.

Subsequently, in a detection step S103, the temporal waveform of the correlated light Pc is detected. Specifically, after the optical pulse train Pb output from the pulse forming unit 3 is transmitted through the optical component 7, the correlation optical system 40 receives the optical pulse train Pb output from the optical component 7, and outputs correlated light Pc that is cross-correlation or autocorrelation of the optical pulse train Pb. Then, the detector 400 detects the temporal waveform of the correlated light Pc. As an example, the correlation optical system 40 uses the optical element 42 including at least one of the non-linear optical crystal and the phosphor to generate the correlated light Pc including cross-correlation or autocorrelation of the optical pulse train Pb.

For example, as illustrated in FIG. 13, the optical pulse train Pb is branched into two pieces, and one branched optical pulse train Pbb is time-delayed with respect to the other optical pulse train Pba. Then, correlated light Pc including autocorrelation of the optical pulse train Pb is generated from one optical pulse train Pbb that is time-delayed and the other optical pulse train Pba. For example, as illustrated in FIG. 14, the optical pulse train Pb and the reference optical pulse Pr are input, the reference optical pulse Pr is time-delayed with respect to the optical pulse train Pb. Then, correlated light Pc including cross-correlation of the optical pulse train Pb is generated from the reference optical pulse Pr that is time-delayed and the optical pulse train Pb. For example, as illustrated in FIG. 15, the optical pulse train Pb is generated by modulating only the polarization component of the optical pulse Pa in the first polarization direction in the SLM 14. The polarization component in the second polarization direction is used as the reference optical pulse Pr. Then, in the SLM 14, the optical pulse train Pb is time-delayed with respect to the reference optical pulse Pr. The correlated light Pc including cross-correlation of the optical pulse train Pb is generated from the optical pulse train Pb that is time-delayed and the reference optical pulse Pr.

Subsequently, in an arithmetic operation step S104, the arithmetic operation unit 5b estimates the wavelength dispersion amount of the optical component 7 based on the feature amount of the temporal waveform of the correlated light Pc. Specifically, first, the arithmetic operation unit 5b acquires the feature amount of the temporal waveform of the correlated light Pc theoretically calculated in advance (or measured in advance) on the assumption that the wavelength dispersion of the optical component 7 is zero. Then, the arithmetic operation unit 5b acquires the feature amount of the temporal waveform of the correlated light Pc detected in the detection step S103. Here, the feature amount is, for example, at least one of a peak intensity, a full width at half maximum, and a peak time interval of a plurality of optical pulses included in the correlated light Pc. Subsequently, the arithmetic operation unit 5b estimates the wavelength dispersion amount of the optical component 7 by comparing the acquired feature amounts of the two temporal waveforms.

Here, phase modulation for generating a band-controlled multi-pulse in the SLM 14 of the pulse forming unit 3 illustrated in FIG. 2 will be described in detail. A domain before the lens 15 (spectral domain) and a domain behind the diffraction grating 16 (time domain) are in a Fourier transform relationship with each other. The phase modulation in the spectral domain has an influence on a temporal intensity waveform in the time domain. Therefore, the output light from the pulse forming unit 3 can have various temporal intensity waveforms different from the optical pulse Pa, in accordance with a modulation pattern of the SLM 14. FIG. 21(a) illustrates a spectral waveform (spectrum intensity G41 and spectrum phase G42) of the single-pulsed optical pulse Pa as an example. FIG. 21(b) illustrates a temporal intensity waveform of the optical pulse Pa. FIG. 22(a) illustrates a spectral waveform (spectrum intensity G51 and spectrum phase G52) of the output light from the pulse forming unit 3 when rectangular wave-shaped phase spectrum modulation is applied in the SLM 14, as an example. FIG. 22(b) illustrates a temporal intensity waveform of the output light. In FIGS. 21(a) and 22(a), the horizontal axis indicates the wavelength (nm), the left vertical axis indicates the intensity value (arbitrary unit) of an intensity spectrum, and the right vertical axis indicates the phase value (rad) of a phase spectrum. In FIGS. 21(b) and 22(b), the horizontal axis indicates the time (femtosecond), and the vertical axis indicates the light intensity (arbitrary unit). In this example, the single pulse of the optical pulse Pa is converted into a double pulse by giving a triangular wave-shaped phase spectral waveform to the output light. The spectrum and the waveform illustrated in FIG. 22 are one example. By combining various phase spectra and intensity spectra, it is possible to shape the temporal intensity waveform of the output light from the pulse forming unit 3 into various shapes.

FIG. 23 is a diagram illustrating a configuration of a modulation pattern calculation apparatus 20 that performs an arithmetic operation of the SLM 14. The modulation pattern calculation apparatus 20 is, for example, a personal computer; a smart device such as a smartphone and a tablet terminal; or a computer such as a cloud server, that includes a processor. The arithmetic operation unit 5b illustrated in FIG. 1 may also serve as the modulation pattern calculation apparatus 20. The modulation pattern calculation apparatus 20 is electrically connected to the SLM 14. The modulation pattern calculation apparatus 20 calculates a phase modulation pattern for bringing the temporal intensity waveform of the output light of the pulse forming unit 3 close to a desired waveform, and provides a control signal including the calculated phase modulation pattern to the SLM 14. The modulation pattern is data for controlling the SLM 14, and is data including a table of intensity of complex amplitude distribution or intensity of phase distribution. The modulation pattern is, for example, a computer-generated hologram (CGH).

The modulation pattern calculation apparatus 20 in the present embodiment causes the control unit 5a to store a phase pattern including a phase pattern for phase modulation that gives a phase spectrum for obtaining a desired waveform to output light and a phase pattern for intensity modulation that gives an intensity spectrum for obtaining a desired waveform to output light. Therefore, as illustrated in FIG. 23, the modulation pattern calculation apparatus 20 includes an arbitrary waveform input unit 21, a phase spectrum design unit 22, an intensity spectrum design unit 23, and a modulation pattern generation unit 24. That is, the processor of a computer provided in the modulation pattern calculation apparatus 20 realizes the function of the arbitrary waveform input unit 21, the function of the phase spectrum design unit 22, the function of the intensity spectrum design unit 23, and the function of the modulation pattern generation unit 24. The respective functions may be realized by the same processor or may be realized by different processors.

The processor of the computer can implement the above functions by a modulation pattern calculation program. Thus, the modulation pattern calculation program causes the processor of the computer to operate as the arbitrary waveform input unit 21, the phase spectrum design unit 22, the intensity spectrum design unit 23, and the modulation pattern generation unit 24 in the modulation pattern calculation apparatus 20. The modulation pattern calculation program is stored in a storage device (storage medium) inside or outside the computer. The storage device may be a non-transitory recording medium. Examples of the recording medium include a recording medium such as a flexible disk, a CD, and a DVD, a recording medium such as a ROM, a semiconductor memory, a cloud server, and the like.

The arbitrary waveform input unit 21 receives the desired temporal intensity waveform input from an operator. The operator inputs information on the desired temporal intensity waveform (for example, a peak interval, a pulse width, the number of pulses, and the like) to the arbitrary waveform input unit 21. The information on the desired temporal intensity waveform is provided to the phase spectrum design unit 22 and the intensity spectrum design unit 23. The phase spectrum design unit 22 calculates a phase spectrum of the output light of the pulse forming unit 3, which is suitable for realizing the given desired temporal intensity waveform. The intensity spectrum design unit 23 calculates an intensity spectrum of the output light of the pulse forming unit 3, which is suitable for realizing the given desired temporal intensity waveform. The modulation pattern generation unit 24 calculates a phase modulation pattern (for example, a computer-generated hologram) for applying the phase spectrum obtained in the phase spectrum design unit 22 and the intensity spectrum obtained in the intensity spectrum design unit 23 to the output light of the pulse forming unit 3. Then, a control signal SC including the calculated phase modulation pattern is provided to the SLM 14. The SLM 14 is controlled based on the control signal SC.

FIG. 24 is a block diagram illustrating an internal configuration of the phase spectrum design unit 22 and the intensity spectrum design unit 23. As illustrated in FIG. 24, the phase spectrum design unit 22 and the intensity spectrum design unit 23 include a Fourier transform unit 25, a function replacement unit 26, a waveform function modification unit 27, an inverse Fourier transform unit 28, and a target generation unit 29. The target generation unit 29 includes a Fourier transform unit 29a and a spectrogram modification unit 29b. The functions of each of the components will be described in detail later.

Here, the desired temporal intensity waveform is expressed as a function in the time domain and the phase spectrum is expressed as a function in the frequency domain. Therefore, the phase spectrum corresponding to the desired temporal intensity waveform is obtained, for example, by an iterative Fourier transform based on the desired temporal intensity waveform. FIG. 25 is a diagram illustrating a calculation procedure of the phase spectrum using the iterative Fourier transform method. First, an initial intensity spectrum function $A_0(\omega)$ and an initial phase spectrum function $\Psi_0(\omega)$, which are functions of the frequency $\omega$, are prepared (process number (1) in Figure). In an example, the intensity spectrum function $A_0(\omega)$ and the phase spectrum function $\Psi_0(\omega)$ represent the spectrum intensity and the spectrum phase of the input light, respectively. Then, a waveform function (a) in the frequency domain, which includes the intensity spectrum function $A_0(\omega)$ and the phase spectrum function $\Psi_n(\omega)$, is prepared (process number (2) in Figure).

[Formula 1]

$$\sqrt{A_0(\omega)}\exp\{i\Psi_n(\omega)\} \qquad (a)$$

The subscript n indicates after the n-th Fourier transform process. Before a first Fourier transform process, the initial phase spectrum function $\Psi_0(\omega)$ described above is used as the phase spectrum function $\Psi_n(\omega)$. i is an imaginary number.

Then, Fourier transform from the frequency domain to the time domain is performed on the function (a) (arrow A1 in Figure). As a result, a waveform function (b) in the time domain, which includes a temporal intensity waveform function $b_n(t)$ and a time-phase waveform function $\Theta_n(t)$, is obtained (process number (3) in Figure).

[Formula 2]

$$\sqrt{b_n(t)}\exp\{i\Theta_n(t)\} \qquad \text{(b)}$$

Subsequently, the temporal intensity waveform function $b_n(t)$ included in the function (b) is replaced with a temporal intensity waveform function $\text{Target}_0(t)$ based on a desired waveform (process numbers (4) and (5) in Figure).

[Formula 3]

$$b_n(t) := \text{Target}_0(t) \qquad \text{(c)}$$

[Formula 4]

$$\sqrt{\text{Target}_0(t)}\exp\{i\Theta_n(t)\} \qquad \text{(d)}$$

Subsequently, inverse Fourier transform from the time domain to the frequency domain is performed on a function (d) (arrow A2 in Figure). As a result, a waveform function (e) in the frequency domain, which includes an intensity spectrum function $B_n(\omega)$ and the phase spectrum function $\Psi_n(\omega)$, is obtained (process number (6) in Figure).

[Formula 5]

$$\sqrt{B_n(\omega)}\exp\{i\Psi(\omega)\} \qquad \text{(e)}$$

Subsequently, in order to restrain the intensity spectrum function $B_n(\omega)$ included in the function (e), the intensity spectrum function $B_n(\omega)$ is replaced with the initial intensity spectrum function $A_0(\omega)$ (process number (7) in Figure).

[Formula 6]

$$B_n(\omega) := A_0(\omega) \qquad \text{(f)}$$

Thereafter, by repeatedly performing the above processes (2) to (7) a plurality of times, the phase spectrum shape represented by the phase spectrum function $\Psi_n(\omega)$ in the waveform function can be brought close to the phase spectrum shape corresponding to the desired temporal intensity waveform. The finally obtained phase spectrum function $\Psi_{IFTA}(\omega)$ is the basis of the modulation pattern for obtaining the desired temporal intensity waveform.

However, the iterative Fourier method as described above has a problem that, although the temporal intensity waveform can be controlled, it is not possible to control the frequency component (band wavelength) constituting the temporal intensity waveform. Therefore, the modulation pattern calculation apparatus 20 in the present embodiment calculates the phase spectrum function and the intensity spectrum function that are the basis of the modulation pattern, by using a calculation method described below. FIG. 26 is a diagram illustrating a calculation procedure of the phase spectrum function in the phase spectrum design unit 22. First, an initial intensity spectrum function $A_0(\omega)$ and an initial phase spectrum function $\Phi_0(\omega)$, which are functions of the frequency $\omega$, are prepared (process number (11) in Figure). In an example, the intensity spectrum function $A_0(\omega)$ and the phase spectrum function $\Phi_0(\omega)$ represent the spectrum intensity and the spectrum phase of input light, respectively. Then, a first waveform function (g) in the frequency domain, which includes the intensity spectrum function $A_0(\omega)$ and the phase spectrum function $\Phi_0(\omega)$, is prepared (process number (12)). Where i is an imaginary number.

[Formula 7]

$$\sqrt{A_0(\omega)}\exp\{i\Phi_0(\omega)\} \qquad \text{(g)}$$

Subsequently, the Fourier transform unit 25 of the phase spectrum design unit 22 performs the Fourier transform on the function (g) from the frequency domain to the time domain (arrow A3 in Figure). As a result, a second waveform function (h) in the time domain, which includes the temporal intensity waveform function $a_0(t)$ and the time-phase waveform function $\varphi_0(t)$, is obtained (Fourier transform step, process number (13)).

[Formula 8]

$$\sqrt{a_0(t)}\exp\{i\phi_0(t)\} \qquad \text{(h)}$$

Subsequently, the function replacement unit 26 of the phase spectrum design unit 22 substitutes the temporal intensity waveform function $\text{Target}_0(t)$ based on the desired waveform input by the arbitrary waveform input unit 21 into a temporal intensity waveform function $b_0(t)$ as illustrated in the following formula (i) (process number (14)).

[Formula 9]

$$b_0(t) = \text{Target}_0(t) \qquad \text{(i)}$$

Subsequently, the function replacement unit 26 of the phase spectrum design unit 22 substitutes the temporal intensity waveform function $a_0(t)$ with the temporal intensity waveform function $b_0(t)$, as represented by the following formula (j). That is, the temporal intensity waveform function $a_0(t)$ included in the function (h) is replaced with the temporal intensity waveform function $\text{Target}_0(t)$ based on the desired waveform (function replacement step, process number (15)).

[Formula 10]

$$\sqrt{b_0(t)}\exp\{i\phi_0(t)\} \qquad \text{(j)}$$

Subsequently, the waveform function modification unit 27 of the phase spectrum design unit 22 corrects the second waveform function such that the spectrogram of the second waveform function (j) after the replacement is close to the target spectrogram generated in advance in accordance with a desired wavelength band. First, by performing time-frequency transform on the second waveform function (j) after the replacement, the second waveform function (j) is converted into a spectrogram $SG_{0,k}(\omega, t)$ (process number (15a) in Figure). The subscript k indicates k-th conversion processing.

Here, the time-frequency transform refers to performing frequency filter processing or numerical arithmetic operation processing (processing of obtaining a spectrum for each time by performing multiplication while shifting a window function) on a composite signal such as a temporal waveform to convert the composite signal into three-dimensional information including time, frequency, and intensity (spectrum intensity) of a signal component. In the present embodiment, the transform result (time, frequency, and spectrum intensity) is defined as a "spectrogram".

Examples of the time-frequency transform include short-time Fourier transform (STFT), wavelet transform (Halle wavelet transform, Gabor wavelet transform, Mexican-hat wavelet transform, Morley wavelet transform), and the like.

The target spectrogram $TargetSG_0(\omega, t)$ generated in advance in accordance with the desired wavelength band is read from the target generation unit 29. The target spectrogram $TargetSG_0(\omega, t)$ has substantially the same value as the target temporal waveform (the temporal intensity waveform and the frequency component constituting the temporal intensity waveform), and is generated in the target spectrogram function of the process number (15b).

Then, the waveform function modification unit 27 of the phase spectrum design unit 22 performs pattern matching between the spectrogram $SG_{0,k}(\omega, t)$ and the target spectrogram $TargetSG_0(\omega, t)$, and examines the similarity (how much the spectrogram $SG_{0,k}(\omega, t)$ and the target spectrogram $TargetSG_0(\omega, t)$ match with each other). In the present embodiment, an evaluation value is calculated as an index representing the similarity. Then, in the subsequent process number (15c), it is determined whether or not the obtained evaluation value satisfies a predetermined end condition. When the condition is satisfied, the process proceeds to a process number (16). When the condition is not satisfied, the process proceeds to a process number (15d). In the process number (15d), the time-phase waveform function $\varphi_0(t)$ included in the second waveform function is changed to a certain time-phase waveform function $\varphi_{0,k}(t)$. The second waveform function after changing the time-phase waveform function is converted into a spectrogram again by time-frequency transform such as STFT. Thereafter, the above-described process numbers (15a) to (15d) are repeatedly performed. In this manner, the second waveform function is corrected such that the spectrogram $SG_{0,k}(\omega, t)$ is gradually brought close to the target spectrogram $TargetSG_0(\omega, t)$ (waveform function correction step).

Then, the inverse Fourier transform unit 28 of the phase spectrum design unit 22 performs an inverse Fourier transform on the corrected second waveform function (arrow A4 in Figure) and generates a third waveform function (k) in the frequency domain (inverse Fourier transform step, process number (16)).

[Formula 11]

$$\sqrt{B_{0,k}(\omega)}\exp\{i\Phi_{0,k}(\omega)\} \qquad (k)$$

The phase spectrum function $\varphi_{0,k}(\omega)$ included in the third waveform function (k) becomes a desired phase spectrum function $\Phi_{TWC\text{-}TFD}(\omega)$ to be finally obtained. The phase spectrum function $\Phi_{TWC\text{-}TFD}(\omega)$ is provided to the modulation pattern generation unit 24.

FIG. 27 is a diagram illustrating a calculation procedure of the intensity spectrum function in the intensity spectrum design unit 23. Since the process numbers (11) to (15c) are similar to the above-described spectrum phase calculation procedure in the phase spectrum design unit 22, the description thereof is omitted. In a case where the evaluation value indicating the similarity between the spectrogram $SG_{0,k}(\omega, t)$ and the target spectrogram $TargetSG_0(\omega, t)$ does not satisfy the predetermined end condition, the waveform function modification unit 27 of the intensity spectrum design unit 23 changes the temporal intensity waveform function $b_0(t)$ to a certain temporal intensity waveform function $b_{0,k}(t)$ while restraining the time-phase waveform function $\varphi_0(t)$ included in the second waveform function with the initial value (process number (15e)). The second waveform function after changing the temporal intensity waveform function is converted into a spectrogram again by time-frequency transform such as STFT. Thereafter, the process numbers (15a) to (15e) are repeatedly performed. In this manner, the second waveform function is corrected such that the spectrogram $SG_{0,k}(\omega, t)$ is gradually brought close to the target spectrogram $TargetSG_0(\omega, t)$ (waveform function correction step).

Then, the inverse Fourier transform unit 28 of the intensity spectrum design unit 23 performs an inverse Fourier transform on the corrected second waveform function (arrow A4 in Figure) and generates a third waveform function (m) in the frequency domain (inverse Fourier transform step, process number (16)).

[Formula 12]

$$\sqrt{B_{0,k}(\omega)}\exp\{i\Phi_{0,k}(\omega)\} \qquad (m)$$

Subsequently, in the process number (17), a filter processing unit of the intensity spectrum design unit 23 performs filter processing based on the intensity spectrum of the input light, on the intensity spectrum function $B_{0,k}(\omega)$ included in the third waveform function (m) (filter processing step). Specifically, in the intensity spectrum obtained by multiplying the intensity spectrum function $B_{0,k}(\omega)$ by a coefficient $\alpha$, a portion exceeding the cutoff intensity for each wavelength determined based on the intensity spectrum of the input light is cut. This is performed in order to prevent an occurrence of a situation in which an intensity spectrum function $\alpha B_{0,k}(\omega)$ does not exceed the spectrum intensity of the input light in all the wavelength ranges. In an example, the cutoff intensity for each wavelength is set to coincide with the intensity spectrum of the input light (the initial intensity spectrum function $A_0(\omega)$ in the present embodiment). In this case, as represented in the following formula (n), at frequencies where the intensity spectrum function $\alpha B_{0,k}(\omega)$ is larger than the intensity spectrum function $A_0(\omega)$, the value of the intensity spectrum function $A_0(\omega)$ is taken as the value of the intensity spectrum function $A_{TWC\text{-}TFD}(\omega)$. At frequencies where the intensity spectrum function $\alpha B_{0,k}(w)$ is equal to or smaller than the intensity spectrum function $A_0(\omega)$, the value of the intensity spectrum function $\alpha B_{0,k}(\omega)$ is taken as the value of the intensity spectrum function $A_{TWC\text{-}TFD}(\omega)$ (process number (17) in Figure).

[Formula 13]

$$A_{TWC\text{-}TFD}(\omega) = \begin{cases} A_0(\omega) & A_0(\omega) < \alpha B_{0,k}(\omega) \\ \alpha B_{0,k}(\omega) & A_0(\omega) \geq \alpha B_{0,k}(\omega) \end{cases} \qquad (n)$$

The intensity spectrum function $A_{TWC\text{-}TFD}(\omega)$ is provided to the modulation pattern generation unit 24 as the desired spectrum intensity to be finally obtained.

The modulation pattern generation unit 24 calculates a phase modulation pattern (for example, a computer-generated hologram) for giving, to the output light, the spectrum phase represented by the phase spectrum function $\Phi_{TWC\text{-}TFD}(\omega)$ calculated in the phase spectrum design unit 22 and the spectrum intensity represented by the intensity spectrum function $A_{TWC\text{-}TFD}(\omega)$ calculated in the intensity spectrum design unit 23 (data generation step).

FIG. 28 is a diagram illustrating an example of a generation procedure of the target spectrogram $\text{TargetSG}_0(\omega, t)$ in the target generation unit 29. The target spectrogram $\text{TargetSG}_0(\omega, t)$ indicates a target temporal waveform. The temporal waveform is a temporal intensity waveform and a frequency component (wavelength band component) constituting the temporal intensity waveform. Therefore, the creation of the target spectrogram is a critical step for controlling the frequency component (wavelength band component). As illustrated in FIG. 28, the target generation unit 29 first receives inputs of the spectral waveform (initial intensity spectrum function $A_0(\omega)$ and initial phase spectrum function $\Phi_0(\omega)$) and the desired temporal intensity waveform function $\text{Target}_0(t)$. In addition, the target generation unit 29 receives an input of a time function $p_0(t)$ including desired frequency (wavelength) band information (process number (21)).

Then, the target generation unit 29 calculates a phase spectrum function $\Phi_{IFTA}(\omega)$ for realizing the temporal intensity waveform function $\text{Target}_0(t)$, for example, by using the iterative Fourier transform method illustrated in FIG. 25 (process number (22)).

Subsequently, the target generation unit 29 calculates an intensity spectrum function $A_{IFTA}(\omega)$ for realizing the temporal intensity waveform function $\text{Target}_0(t)$ by an iterative Fourier transform method using the previously obtained phase spectrum function $\Phi_{IFTA}(\omega)$ (process number (23)). FIG. 29 is a diagram illustrating an example of a procedure for calculating the intensity spectrum function $A_{IFTA}(\omega)$.

Referring to FIG. 29, first, an initial intensity spectrum function $A_{k=0}(\omega)$ and an initial phase spectrum function $\Psi_0(\omega)$ are prepared (process number (31) in Figure). Then, a waveform function (o) in the frequency domain, which includes the intensity spectrum function $A_k(\omega)$ and the phase spectrum function $\Psi_0(\omega)$, is prepared (process number (32) in Figure).

[Formula 14]

$$\sqrt{A_k(\omega)}\exp\{i\Psi_0(\omega)\} \tag{o}$$

The subscript k indicates after the k-th Fourier transform processing. Before the first Fourier transform processing, the intensity spectrum function $A_{k=0}(\omega)$ described above is used as the intensity spectrum function $A_k(\omega)$. i is an imaginary number.

Then, Fourier transform from the frequency domain to the time domain is performed on the function (o) (arrow A5 in Figure). As a result, a waveform function (p) in the time domain, which includes the temporal intensity waveform function $b_k(t)$, is obtained (process number (33) in Figure).

[Formula 15]

$$\sqrt{b_k(t)}\exp\{i\Theta_k(t)\} \tag{p}$$

Subsequently, the temporal intensity waveform function $b_k(t)$ included in the function (p) is replaced with the temporal intensity waveform function $\text{Target}_0(t)$ based on a desired waveform (process numbers (34) and (35) in Figure).

[Formula 16]

$$b_k(t) := \text{Target}_0(t) \tag{q}$$

[Formula 17]

$$\sqrt{\text{Target}_0(t)}\exp\{i\Theta_k(t)\} \tag{r}$$

Subsequently, inverse Fourier transform from the time domain to the frequency domain is performed on a function (r) (arrow A6 in Figure). As a result, a waveform function(s) in the frequency domain, which includes an intensity spectrum function $C_k(\omega)$ and the phase spectrum function $\Psi_k(\omega)$, is obtained (process number (36) in Figure).

[Formula 18]

$$\sqrt{C_k(\omega)}\exp\{i\Psi_k(\omega)\} \tag{s}$$

Subsequently, in order to restrain the phase spectrum function $\Psi_k(\omega)$ included in the function(s), the phase spectrum function $\Psi_k(\omega)$ is replaced with the initial phase spectrum function $\Psi_0(\omega)$ (process number (37a) in Figure).

[Formula 19]

$$\Psi_k(\omega) := \Psi_0(\omega) \tag{t}$$

In addition, filter processing based on the intensity spectrum of the input light is performed on the intensity spectrum function $C_k(\omega)$ in the frequency domain after the inverse Fourier transform. Specifically, in the intensity spectrum represented by the intensity spectrum function $C_k(\omega)$, a portion exceeding a cutoff intensity for each wavelength determined based on the intensity spectrum of the input light is cut. In an example, the cutoff intensity for each wavelength is set to coincide with the intensity spectrum (for example, the initial intensity spectrum function $A_{k=0}(\omega)$) of the input light. In this case, as represented in the following formula (u), at frequencies where the intensity spectrum function $C_k(\omega)$ is larger than the intensity spectrum function $A_{k=0}(\omega)$, the value of the intensity spectrum function $A_{k=0}(\omega)$ is taken as the value of the intensity spectrum function $A_k(\omega)$. At frequencies where the intensity spectrum function $C_k(\omega)$ is equal to or smaller than the intensity spectrum function $A_{k=0}(\omega)$, the value of the intensity spectrum function $C_k(\omega)$ is taken as the value of the intensity spectrum function $A_k(\omega)$ (process number (37b) in Figure).

[Formula 20]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \qquad (u)$$

The intensity spectrum function $C_k(\omega)$ included in the function(s) is replaced with the intensity spectrum function $A_k(\omega)$ after the filter processing in accordance with the above formula (u).

Thereafter, by repeatedly performing the above processes (32) to (37b), the phase spectrum shape represented by the intensity spectrum function $A_k(\omega)$ in the waveform function can be brought close to the intensity spectrum shape corresponding to the desired temporal intensity waveform. Finally, the intensity spectrum function $A_{IFTA}(\omega)$ is obtained.

Refer to FIG. 28 again. By calculating the phase spectrum function $\Phi_{IFTA}(\omega)$ and the intensity spectrum function $A_{IFTA}(\omega)$ in the process numbers (22) and (23) described above, a third waveform function (v) in the frequency domain, which includes the above functions, is obtained (process number (24)).

[Formula 21]

$$\sqrt{A_{IFTA}(\omega)} \exp\{i\Phi_{ITTA}(\omega)\} \qquad (v)$$

The Fourier transform unit 29a of the target generation unit 29 performs the Fourier transform on the waveform function (v). As a result, a fourth waveform function (w) in the time domain is obtained (process number (25)).

[Formula 22]

$$\sqrt{a_{IFTA}(t)} \exp\{i\,\phi_{IFTA}(t)\} \qquad (w)$$

The spectrogram modification unit 29b of the target generation unit 29 converts the fourth waveform function (w) into a spectrogram $SG_{IFTA}(\omega, t)$ by time-frequency transform (process number (26)). Then, in the process number (27), the target spectrogram $TargetSG_0(\omega, t)$ is generated by correcting the spectrogram $SG_{IFTA}(\omega, t)$ based on the time function $p_0(t)$ including the desired frequency (wavelength) band information. For example, a characteristic pattern appearing in the spectrogram $SG_{IFTA}(\omega, t)$ configured by two-dimensional data is partially cut out, and a frequency component of this portion is operated based on the time function $p_0(t)$. Specific examples thereof will be described below in detail.

For example, consider a case where a triple pulse having a time interval of 2 picoseconds is set as the desired temporal intensity waveform function $Target_0(t)$. In that case, the spectrogram $SG_{IFTA}(\omega, t)$ has a result as illustrated in FIG. 30(a). In FIG. 30(a), the horizontal axis indicates the time (unit: femtosecond), and the vertical axis indicates the wavelength (unit: nm). The value of the spectrogram is indicated by the brightness and darkness in Figure, and the higher the brightness, the larger the value of the spectrogram. In this spectrogram $SG_{IFTA}(\omega, t)$, triple pulses appear as domains $D_1$, $D_2$, and $D_3$ separated on the time axis at intervals of 2 picoseconds. The center (peak) wavelengths of the domains $D_1$, $D_2$, and $D_3$ are 800 nm.

In a case where it is desired to control only the temporal intensity waveform of the output light (to simply obtain a triple pulse), it is not necessary to operate the domains $D_1$, $D_2$, and $D_3$. However, in a case where it is desired to control the frequency (wavelength) band of each pulse, it is necessary to operate the domains $D_1$, $D_2$, and $D_3$. That is, as illustrated in FIG. 30(b), moving the domains $D_1$, $D_2$, and $D_3$ independently of each other in a direction along the wavelength axis (vertical axis) means changing the constituent frequency (wavelength band) of each pulse. Such a change in the constituent frequency (wavelength band) of each pulse is performed based on the time function $p_0(t)$.

For example, when the time function $p_0(t)$ is described such that the peak wavelength of the domain $D_2$ is kept at 800 nm and the peak wavelengths of the domains $D_1$ and $D_3$ are translated by −2 nm and +2 nm, respectively, the spectrogram $SG_{IFTA}(\omega, t)$ changes to the target spectrogram $TargetSG_0(\omega, t)$ illustrated in FIG. 30(b). For example, by performing such processing on the spectrogram, it is possible to create the target spectrogram in which the constituent frequency (wavelength band) of each pulse is freely controlled without changing the shape of the temporal intensity waveform.

Effects obtained by the dispersion measurement device 1A and the dispersion measurement method in the present embodiment described above will be described.

When the wavelength dispersion amount of the optical component 7 is measured, optical pulses $Pb_1$ and $Pb_2$ having a time difference and having center wavelengths different from each other are transmitted through the optical component 7. Then, the wavelength dispersion amount of the optical component 7 can be estimated based on the temporal waveform (for example, peak interval) of the correlated light $Pc$ obtained from the optical pulses $Pb_1$ and $Pb_2$. However, in the conventional dispersion measurement device, when the optical pulses $Pb_1$ and $Pb_2$ are transmitted through the optical component 7, the pulse widths of the optical pulses $Pb_1$ and $Pb_2$ gradually increase and the peak intensities of the optical pulses $Pb_1$ and $Pb_2$ gradually decrease due to the wavelength dispersion of the optical component 7. FIG. 31 is a graph illustrating an example of such a phenomenon. FIG. 31 shows a temporal waveform of the light pulses $Pb_1$ and $Pb_2$ before being incident on the optical component 7 (graph G61) and a temporal waveform of the light pulses $Pb_1$ and $Pb_2$ transmitted through the optical component 7 (graph G62). FIG. 32 shows a temporal waveform of the correlated light $Pc$ when the optical component 7 is not disposed (graph G71) and a temporal waveform of the correlated light $Pc$ when the optical component 7 is disposed (graph G72). As described above, as the pulse widths of the light pulses $Pb_1$ and $Pb_2$ increase in the optical component 7, the detection accuracy of the peak interval of the light pulses $Pb_1$ and $Pb_2$ (or the peak interval of a plurality of light pulses included in the correlated light $Pc$) decreases. As the peak intensities of the light pulses $Pb_1$ and $Pb_2$ decrease in the optical component 7, the detection accuracy of the temporal waveform of the light pulses $Pb_1$ and $Pb_2$ (or the temporal waveform of a plurality of light pulses included in the correlated light $Pc$) decreases. Therefore, there is a possibility that the wavelength dispersion amount of the optical component 7 cannot be accurately measured.

In the dispersion measurement device 1A and the dispersion measurement method of the present embodiment, in the pulse forming unit 3 (pulse forming step S102), a group delay dispersion having a sign opposite to that of the group delay dispersion of the optical component 7 is given to the optical pulse Pa. As a result, the peak intensities of the light pulses $Pb_1$ and $Pb_2$ incident on the optical component 7 temporarily decrease and the pulse widths of the light pulses $Pb_1$ and $Pb_2$ incident on the optical component 7 temporarily increase. However, during a period from when the optical pulses $Pb_1$ and $Pb_2$ enter the optical component 7 to when the optical pulses $Pb_1$ and $Pb_2$ exit the optical component 7, the peak intensity of each of the optical pulses $Pb_1$ and $Pb_2$ increases and the pulse width of each of the optical pulses $Pb_1$ and $Pb_2$ decreases due to the group delay dispersion of the optical component 7. As described above, according to the present embodiment, since the pulse widths of the light pulses $Pb_1$ and $Pb_2$ emitted from the optical component 7 are reduced, it is possible to suppress a decrease in the detection accuracy of the peak interval of the light pulses $Pb_1$ and $Pb_2$ (in the present embodiment, the peak interval of the plurality of light pulses included in the correlated light Pc). Since the peak intensities of the light pulses $Pb_1$ and $Pb_2$ emitted from the optical component 7 increase, it is possible to suppress a decrease in the detection accuracy of the temporal waveform of the light pulse train Pb (in the present embodiment, the temporal waveform of the correlated light Pc). Therefore, it is possible to accurately measure the wavelength dispersion amount of the optical component 7.

Effects of the dispersion measurement device 1A and the dispersion measurement method according to the present embodiment will be described in detail. FIG. 33 is a graph illustrating an example of the relationship between the group delay dispersion ($fs^2$) of the optical component 7 and the pulse half width (arbitrary unit) of the correlated light Pc. In FIG. 33, black square plots D21 indicate a case where the group delay dispersion of $-20000$ $fs^2$ is given to the optical pulse Pa. White circle plots D22 indicate a case where the group delay dispersion is not applied to the optical pulse Pa. Referring to the plots D22, when the group delay dispersion is not given to the optical pulse Pa, the pulse width of the correlated light Pc becomes minimum when the group delay dispersion of the optical component 7 is zero, and increases as the absolute value of the group delay dispersion of the optical component 7 increases. On the other hand, referring to the plots D21, when a group delay dispersion of $-20000$ $fs^2$ is given to the optical pulse Pa, this relationship is shifted by 20000 $fs^2$. That is, when the group delay dispersion of $-20000$ $fs^2$ is given to the optical pulse Pa, the pulse width of the correlated light Pc becomes minimum when the group delay dispersion of the optical component 7 is 20000 $fs^2$, and increases as the group delay dispersion of the optical component 7 becomes farther from 20000 $fs^2$. In a range where the group delay dispersion of the optical component 7 is larger than 10000 $fs^2$, the pulse width of the correlated light Pc becomes smaller than that in the case where the group delay dispersion is not given to the optical pulse Pa. In other words, when the group delay dispersion of $-A$ ($fs^2$) is given to the optical pulse Pa, the pulse width of the correlated light Pc becomes smaller than that when the group delay dispersion is not given to the optical pulse Pa in a range where the group delay dispersion of the optical component 7 is larger than A/2. Therefore, when the group delay dispersion of the optical component 7 is larger than A/2, it is possible to reduce the pulse width of the correlated light Pc and suppress a decrease in the detection accuracy of the peak interval of the correlated light Pc.

FIG. 34 is a graph illustrating an example of the relationship between the group delay dispersion of the optical component 7 and the peak intensity of the correlated light Pc. In FIG. 34, black square plots D31 indicate a case where the group delay dispersion of $-20000$ $fs^2$ is given to the optical pulse Pa. White circle plots D32 indicate a case where the group delay dispersion is not applied to the optical pulse Pa. Referring to the plots D32, in the case where the group delay dispersion is not given to the optical pulse Pa, the peak intensity of the correlated light Pc becomes maximum when the group delay dispersion of the optical component 7 is zero, and decreases as the absolute value of the group delay dispersion of the optical component 7 increases. On the other hand, referring to the plots D31, when a group delay dispersion of $-20000$ $fs^2$ is given to the optical pulse Pa, that relationship is shifted by 20000 $fs^2$. That is, in a case where the group delay dispersion of $-20000$ $fs^2$ is given to the optical pulse Pa, the peak intensity of the correlated light Pc becomes maximum when the group delay dispersion of the optical component 7 is 20000 $fs^2$, and decreases as the group delay dispersion of the optical component 7 becomes farther from 20000 $fs^2$. In a range where the group delay dispersion of the optical component 7 is larger than 10000 $fs^2$, the peak intensity of the correlated light Pc becomes larger than that in the case where the group delay dispersion is not given to the optical pulse Pa. In other words, when the group delay dispersion of $-A$ ($fs^2$) is given to the optical pulse Pa, the peak intensity of the correlated light Pc becomes larger than that when the group delay dispersion is not given to the optical pulse Pa in a range where the group delay dispersion of the optical component 7 is larger than A/2. Therefore, when the group delay dispersion of the optical component 7 is larger than A/2, it is possible to increase the peak intensity of the correlated light Pc and suppress a decrease in the detection accuracy of the temporal waveform of the correlated light Pc.

The magnitude of the group delay dispersion of the optical component 7 also affects a change rate of the peak interval of the correlated light Pc with respect to the change of the group delay dispersion of the optical component 7. White circle plots D41 in FIG. 35 show an example of a relationship between the group delay dispersion of the optical component 7 and a change amount of the peak interval of the correlated light Pc in a case where the optical pulses $Pb_1$ and $Pb_2$ incident on the optical component 7 do not have the group delay dispersion (that is, the group delay dispersion of the optical pulses $Pb_1$ and $Pb_2$ is zero). In FIG. 35, the vertical axis represents the change amount (unit: fs) of the peak interval of the correlated light Pc, and the horizontal axis represents the group delay dispersion (unit: $fs^2$) of the optical component 7. FIG. 36 is a graph illustrating the relationship between the absolute value of the group delay dispersion of the optical component 7 and the change rate of the peak interval of the correlated light Pc with respect to the group delay dispersion of the optical component 7. As shown in FIGS. 35 and 36, the closer the group delay dispersion of the optical component 7 is to zero, the change rate of the peak interval of the correlated light Pc with respect to the change of the group delay dispersion of the optical component 7 becomes larger. As the absolute value of the group delay dispersion of the optical component 7 increases, the change rate of the peak interval of the correlated light Pc with respect to the change in the group delay dispersion of the optical component 7 decreases. In other words, the closer the group delay dispersion of the optical component 7 is to zero, the higher the measurement sensitivity of the wavelength dispersion amount becomes, and the larger the absolute value of the group delay dispersion of the optical component 7 is, the lower the measurement sensitivity of the wavelength dispersion amount becomes.

On the other hand, when the group delay dispersion of $-20000$ $fs^2$, for example, is given to the optical pulse Pa, the relationship between the group delay dispersion of the optical component 7 and the change amount of the peak interval of the correlated light Pc is shifted by 20000 $fs^2$ as indicated by the black square plots $D_{42}$ in FIG. 37. That is, when the group delay dispersion of $-20000$ $fs^2$ is given to the optical pulse Pa, the change rate of the peak interval of the correlated light Pc with respect to the change of the group delay dispersion of the optical component 7 becomes maximum when the group delay dispersion of the optical component 7 is 20000 $fs^2$, and decreases as the group delay dispersion of the optical component 7 becomes farther from 20000 $fs^2$. Therefore, the closer the group delay dispersion of the optical component 7 is to the 20000 $fs^2$, the higher the measurement sensitivity of the wavelength dispersion amount becomes. In other words, as the absolute value of the group delay dispersion applied to the optical pulse Pa becomes closer to the absolute value of the group delay dispersion of the optical component 7, the measurement sensitivity of the wavelength dispersion amount can be increased.

As in the present embodiment, the light detection unit 4 may include a correlation optical system 40 that receives the optical pulse train Pb and outputs correlated light Pc including cross-correlation or autocorrelation of the optical pulse train Pb, and may detect the temporal waveform of the correlated light Pc as the temporal waveform of the optical pulse train Pb. Then, the arithmetic operation unit 5b may estimate the wavelength dispersion amount of the optical component 7 based on the feature amount of the temporal waveform of the correlated light Pc. Similarly, in the detection step S103, the correlated light Pc including cross-correlation or autocorrelation of the optical pulse train Pb may be generated, and the temporal waveform of the correlated light Pc may be detected as the temporal waveform of the optical pulse train Pb. In the arithmetic operation step S104, the wavelength dispersion amount of the optical component 7 may be estimated based on the feature amount of the temporal waveform of the correlated light Pc. In this case, for example, even when the optical pulses $Pb_1$ and $Pb_2$ are ultrashort pulses on the order of femtoseconds, the temporal waveform of the optical pulse train Pb can be measured. Therefore, it is possible to more accurately measure the wavelength dispersion amount of the optical component 7 by using the ultrashort pulse.

As described above, the absolute value of the group delay dispersion given to the optical pulse Pa by the phase pattern may be within the predicted range of the absolute value of the group delay dispersion of the optical component 7. In this case, the absolute value of the group delay dispersion given to the optical pulse Pa by the phase pattern can be brought close to the absolute value of the group delay dispersion of the optical component 7. Therefore, in the optical component 7, it is possible to further reduce the pulse widths of the light pulses $Pb_1$ and $Pb_2$, and it is possible to further suppress a decrease in detection accuracy of the peak interval of the light pulses $Pb_1$ and $Pb_2$ (in the present embodiment, the peak interval of the plurality of light pulses included in the correlated light Pc). The peak intensities of the light pulses $Pb_1$ and $Pb_2$ in the optical component 7 can be further increased, and a decrease in the detection accuracy of the temporal waveform of the light pulse train Pb (in the present embodiment, the temporal waveform of the correlated light Pc) can be further suppressed.

As in the present embodiment, the absolute value of the group delay dispersion given to the optical pulse Pa by the phase pattern may be equal to the absolute value of the group delay dispersion in the design of the optical component 7.

Also in this case, the absolute value of the group delay dispersion given to the optical pulse Pa by the phase pattern can be brought close to the absolute value of the group delay dispersion of the optical component 7. Therefore, it is possible to further reduce the pulse widths of the light pulses $Pb_1$ and $Pb_2$ in the optical component 7, and it is possible to further suppress a decrease in detection accuracy of the peak interval of the light pulses $Pb_1$ and $Pb_2$ (in the present embodiment, the peak interval of the plurality of light pulses included in the correlated light Pc). The peak intensities of the light pulses $Pb_1$ and $Pb_2$ in the optical component 7 can be further increased, and a decrease in the detection accuracy of the temporal waveform of the light pulse train Pb (in the present embodiment, the temporal waveform of the correlated light Pc) can be further suppressed.

As in the present embodiment, the optical component 7 may be arranged on the optical path between the pulse forming unit 3 and the light detection unit 4. In the detection step S103, the temporal waveform of the optical pulse train Pb transmitted through the optical component 7 (in the present embodiment, the temporal waveform of the correlated light Pc) may be detected. According to the present embodiment, like this, for example, the optical component 7 to be measured can be arranged at an arbitrary position on the optical path. Therefore, the degree of freedom in spatial design of the device is high, and it is possible to design the device so as to reduce the size of the device and improve convenience such as ease of attachment and ease of removal of the optical component 7.

As in the present embodiment, the dispersion measurement device 1A may include a control unit 5a that stores the first phase pattern for applying positive group delay dispersion to the optical pulse Pa and the second phase pattern for applying negative group delay dispersion to the optical pulse Pa, and selectively outputs the first phase pattern and the second phase pattern to the SLM 14. In this case, the phase pattern can be easily switched between the case where the optical component 7 has positive group delay dispersion and the case where the optical component 7 has negative group delay dispersion.

(First Modification)

According to the inventors' findings, various feature amounts (for example, a pulse interval of the optical pulses $Pb_1$ and $Pb_2$, a peak intensities of the optical pulses $Pb_1$ and $Pb_2$, pulse widths of the optical pulses $Pb_1$ and $Pb_2$, and the like) of the temporal waveform of the optical pulse train Pb also have a significant correlation with the wavelength dispersion amount of the optical component 7. Therefore, the wavelength dispersion amount of the optical component 7 can be estimated by evaluating the temporal waveform of the optical pulse train Pb instead of the correlated light Pc.

FIG. 38 is a diagram illustrating a configuration of a dispersion measurement device 1B according to a first modification of the above embodiment. The dispersion measurement device 1B of the present modification is different from the above-described embodiment in that the dispersion measurement device 1B includes a light detection unit 4A instead of the light detection unit 4 of the above-described embodiment, and is identical to the above-described embodiment in other respects. The light detection unit 4A includes the detector 400, but does not include the correlation optical system 40 of the above-described embodiment. At present, there already exists a detector capable of directly detecting a temporal waveform of an optical pulse having a time width on the order of nanoseconds. Therefore, by using such a detector, the light detection unit 4A can accurately detect the temporal waveform of the optical pulse train Pb even without the correlation optical system 40. However, when the response speed of the detector 400 is not sufficient, for example, when the time width of the optical pulse train Pb is on the order of femtoseconds, the correlation optical system 40 may be used as in the embodiment described above.

In a case where the light detection unit 4A does not include the correlation optical system 40 as in the present modification, in the detection step S103 illustrated in FIG. 20, the light detection unit 4A detects the temporal waveform of the light pulse train Pb instead of the correlated light Pc. Specifically, the detector 400 receives the optical pulse train Pb transmitted through the optical component 7 and detects the temporal waveform of the optical pulse train Pb. The detector 400 detects the temporal waveform of the optical pulse train Pb by converting the intensity of the optical pulse train Pb into an electric signal. The electric signal is provided to the arithmetic operation unit 5b.

In this modification, in the arithmetic operation step S104 shown in FIG. 20, the arithmetic operation unit 5b estimates the wavelength dispersion amount of the optical component 7 from the temporal waveform of the optical pulse train Pb. To be specific, the arithmetic operation unit 5b first acquires the feature amount of the temporal waveform of the optical pulse train Pb theoretically calculated in advance (or measured in advance) on the assumption that the wavelength dispersion amount of the optical component 7 is zero. This feature amount may be stored in advance in the auxiliary storage device 57 (see FIG. 19). The arithmetic operation unit 5b acquires the feature amount of the temporal waveform of the optical pulse train Pb detected in the detection step S103. This feature amount is, for example, at least one of the peak intensity, the full width at half maximum, and the peak time interval of the optical pulses $Pb_1$ and $Pb_2$. Subsequently, the arithmetic operation unit 5b compares the feature amount of the temporal waveform of the optical pulse train Pb theoretically calculated in advance (or measured in advance) on the assumption that the wavelength dispersion amount of the optical component 7 is zero with the feature amount of the temporal waveform of the optical pulse train Pb detected in the detection step S103 to estimate the wavelength dispersion amount of the optical component 7.

In the present modification, as the above-described embodiment, since the pulse widths of the light pulses $Pb_1$ and $Pb_2$ emitted from the optical component 7 are reduced, it is possible to suppress a decrease in the detection accuracy of the peak interval of the light pulses $Pb_1$ and $Pb_2$. Since the peak intensities of the optical pulses $Pb_1$ and $Pb_2$ emitted from the optical component 7 increase, it is possible to suppress a decrease in the detection accuracy of the temporal waveform of the optical pulse train Pb. Therefore, it is possible to accurately measure the wavelength dispersion amount of the optical component 7.

Second Modification

FIG. 39 is a diagram illustrating a configuration of a dispersion measurement device 1C according to a second modification of the above embodiment. This modification is different from the above-described embodiment in that the optical component 7 to be measured is arranged not on the optical path between the pulse forming unit 3 and the light detection unit 4 but on the optical path between the pulsed laser light source 2 and the pulse forming unit 3. This modification is identical to the above-described embodiment in other respects. In this modification, the optical pulse Pa output from the pulsed laser light source 2 is transmitted through the optical component 7 and then enters the pulse forming unit 3.

In the present modification, after the optical pulse Pa is transmitted through the optical component 7, the pulse forming unit 3 forms the optical pulse train Pb from the optical pulse Pa in the pulse forming step S102. At this time, a group delay dispersion having a sign opposite to that of the group delay dispersion of the optical component 7 is given to the optical pulse Pa. Then, in the detection step S103, the correlation optical system 40 generates the correlated light Pc from the optical pulse train Pb, and the detector 400 detects the temporal waveform of the correlated light Pc. Alternatively, as in the first modification, the correlation optical system 40 may not be provided, and the temporal waveform of the optical pulse train Pb may be detected by the detector 400. The arithmetic operation unit 5b estimates the wavelength dispersion amount of the optical component 7 from the temporal waveform of the correlated light Pc or the optical pulse train Pb.

As in the present modification, the optical component 7 to be measured may be arranged on the optical path between the pulsed laser light source 2 and the pulse forming unit 3. Even in this case, as in the above-described embodiment, since the pulse widths of the light pulses $Pb_1$ and $Pb_2$ emitted from the optical component 7 are reduced, it is possible to suppress a decrease in detection accuracy of the peak interval of the light pulses $Pb_1$ and $Pb_2$ (or the peak interval of the plurality of light pulses included in the correlated light Pc). Since the peak intensities of the light pulses $Pb_1$ and $Pb_2$ emitted from the optical component 7 increase, it is possible to suppress a decrease in the detection accuracy of the temporal waveform of the light pulse train Pb (or the temporal waveform of the correlated light Pc). Therefore, it is possible to accurately measure the wavelength dispersion amount of the optical component 7.

INDUSTRIAL APPLICABILITY

The embodiment can be used as a dispersion measurement device and a dispersion measurement method capable of more accurately measuring a wavelength dispersion amount of a measurement object.

REFERENCE SIGNS LIST 1A, 1B: dispersion measurement device, 2: pulsed laser light source, 3: pulse forming unit, 3a: light input end, 3b: light output end, 4, 4A: light detecting unit, 4a: light input end, 5: control device, 5a: control unit, 5b: arithmetic operation unit, 5c: input unit, 5d: output unit, 7: optical component, 7a: light input end, 7b: light output end, 12: diffraction grating, 13: lens, 14: spatial light modulator (SLM), 15: lens, 16: diffraction grating, 17: modulation surface, 17a: modulation region, 20: modulation pattern calculation apparatus, 21: arbitrary waveform input unit, 22: phase spectrum design unit, 23: intensity spectrum design unit, 24: modulation pattern generation unit, 25: fourier transform unit, 26: function replacement unit, 27: waveform function modification unit, 28: inverse fourier transform unit, 29: target generation unit, 29a: fourier transform unit, 29b: spectrogram modification unit, 40, 40A, 40B, 40C: correlation optical system, 40b: light output end, 40c to 40f: optical path, 41: lens, 42: optical element, 43: lens, 44: beam splitter, 45, 46: mirror, 47, 49: moving stage, 48: mirror, 51: processor (CPU), 52:

ROM, 53: RAM, 54: input device, 55: output device, 56: communication module, 57: auxiliary storage device, 400: detector, A, B: direction, P1: light, P2: modulated light, Pa: optical pulse (first optical pulse), Pb, Pba, Pbb: optical pulse train, $Pb_1$, $Pb_2$: optical pulse (second optical pulse), Pc: correlated light, Pd: optical pulse train, $Pd_1$, $Pd_2$: optical pulse, Pr: reference optical pulse, S101: output step, S102: forming step, S103: detection step, S104: arithmetic operation step, SC: control signal.

The invention claimed is:

1. A dispersion measurement device measuring a wavelength dispersion amount of a measurement object having positive or negative group delay dispersion, the dispersion measurement device comprising:

a light source configured to output a first optical pulse;

a pulse converter including a spatial light modulator configured to present a phase pattern for generating modulated light by applying a predetermined phase shift for each wavelength to the first optical pulse, the pulse converter forming an optical pulse train from the first optical pulse, and the optical pulse train being the modulated light including a plurality of second optical pulses having a time difference from each other and having center wavelengths different from each other, the phase pattern including a pattern for giving a group delay dispersion having a sign opposite to the group delay dispersion of the measurement object to the first optical pulse;

an optical detector configured to detect a temporal waveform of the optical pulse train;

an arithmetic processor electrically connected to the optical detector; and a controller storing a first phase pattern that is the phase pattern for giving a positive group delay dispersion to the first optical pulse and a second phase pattern that is the phase pattern for giving a negative group delay dispersion to the first optical pulse, the controller configured to selectively output the first phase pattern and the second phase pattern to the spatial light modulator, wherein the controller is configured to:

store the first phase pattern for imparting the positive group delay dispersion and the second phase pattern for imparting the negative group delay dispersion;

receive information indicative of whether the group delay dispersion of the measurement object is negative or positive; and selectively output the first phase pattern when the group delay dispersion of the measurement object is negative, and selectively output the second phase pattern when the group delay dispersion of the measurement object is positive;

the measurement object is arranged on an optical path between the light source and the pulse converter, or an optical path between the pulse converter and the optical detector, and the arithmetic processor is configured to estimate the wavelength dispersion amount of the measurement object based on a feature amount of the temporal waveform.

2. The dispersion measurement device according to claim 1, wherein the optical detector includes a correlation optical system configured to receive the optical pulse train and output correlated light including cross-correlation or autocorrelation of the optical pulse train, the optical detector being configured to detect a temporal waveform of the correlated light as the temporal waveform of the optical pulse train, and the arithmetic processor is configured to estimate the wavelength dispersion amount of the measurement object based on a feature amount of the temporal waveform of the correlated light.

3. The dispersion measurement device according to claim 1, wherein an absolute value of the group delay dispersion given to the first optical pulse by the phase pattern is within a predicted range of an absolute value of the group delay dispersion of the measurement object.

4. The dispersion measurement device according to claim 1, wherein an absolute value of the group delay dispersion given to the first optical pulse by the phase pattern is equal to an absolute value of the group delay dispersion on design of the measurement object.

5. The dispersion measurement device according to claim 1, wherein the measurement object is arranged on the optical path between the pulse converter and the optical detector.

6. The dispersion measurement device according to claim 1, wherein a wavelength characteristic of a spectral phase given to the first optical pulse by the phase pattern is symmetric with respect to a center wavelength of the first optical pulse, and has a characteristic in which the spectral phase increases and then decreases with increasing distance from the center wavelength.

7. The dispersion measurement device according to claim 1, wherein a wavelength characteristic of a spectral phase given to the first optical pulse by the phase pattern is symmetric with respect to a center wavelength of the first optical pulse, and has a characteristic in which the spectral phase decreases and then increases with increasing distance from the center wavelength.

8. A dispersion measurement method for measuring a wavelength dispersion amount of a measurement object having positive or negative group delay dispersion, the dispersion measurement method comprising:

outputting a first optical pulse;

forming an optical pulse train from the first optical pulse, the optical pulse train being modulated light including a plurality of second optical pulses having a time difference from each other and having center wavelengths different from each other, by using a spatial light modulator configured to present a phase pattern for generating the modulated light by applying a predetermined phase shift for each wavelength to the first optical pulse, the phase pattern including a pattern for giving a group delay dispersion having a sign opposite to the group delay dispersion of the measurement object to the first optical pulse;

detecting a temporal waveform of the optical pulse train;

estimating the wavelength dispersion amount of the measurement object; and in a controller storing a first phase pattern that is the phase pattern for giving a positive group delay dispersion to the first optical pulse and a second phase pattern that is the phase pattern for giving a negative group delay dispersion to the first optical pulse, and with the controller selectively outputting the first phase pattern and the second phase pattern to the spatial light modulator, wherein the controller is configured to:

store the first phase pattern for imparting the positive group delay dispersion and the second phase pattern for imparting the negative group delay dispersion;

receive information indicative of whether the group delay dispersion of the measurement object is negative or positive; and selectively output the first phase pattern when the group delay dispersion of the measurement object is negative, and selectively output the second phase pattern when the group delay dispersion of the measurement object is positive;

the optical pulse train is formed from the first optical pulse transmitted through the measurement object in the forming, or the temporal waveform of the optical pulse train transmitted through the measurement object is detected in the detecting, and in the estimating, the wavelength dispersion amount of the measurement object is estimated based on a feature amount of the temporal waveform.

9. The dispersion measurement method according to claim 8, wherein in the detecting, correlated light including cross-correlation or autocorrelation of the optical pulse train is generated, and a temporal waveform of the correlated light is detected as the temporal waveform of the optical pulse train, and in the estimating, the wavelength dispersion amount of the measurement object is estimated based on a feature amount of the temporal waveform of the correlated light.

10. The dispersion measurement method according to claim 8, wherein an absolute value of the group delay dispersion given to the first optical pulse by the phase pattern is within a predicted range of an absolute value of the group delay dispersion of the measurement object.

11. The dispersion measurement method according to claim 8, wherein an absolute value of the group delay dispersion given to the first optical pulse by the phase pattern is equal to an absolute value of the group delay dispersion on design of the measurement object.

12. The dispersion measurement method according to claim 8, wherein a wavelength characteristic of a spectral phase given to the first optical pulse by the phase pattern is symmetric with respect to a center wavelength of the first optical pulse, and has a characteristic in which the spectral phase increases and then decreases with increasing distance from the center wavelength.

13. The dispersion measurement method according to claim 8, wherein a wavelength characteristic of a spectral phase given to the first optical pulse by the phase pattern is symmetric with respect to a center wavelength of the first optical pulse, and has a characteristic in which the spectral phase decreases and then increases with increasing distance from the center wavelength.

* * * * *